United States Patent
Zhang et al.

(10) Patent No.: US 11,963,160 B2
(45) Date of Patent: Apr. 16, 2024

(54) TERMINAL, BASE STATION AND METHOD PERFORMED BY THE SAME IN WIRELESS COMMUNICATION SYSTEM

(71) Applicant: Samsung Electronics Co., Ltd., Suwon-si (KR)

(72) Inventors: Sa Zhang, Beijing (CN); Yi Wang, Beijing (CN); Jingxing Fu, Beijing (CN); Feifei Sun, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 115 days.

(21) Appl. No.: 17/501,393

(22) Filed: Oct. 14, 2021

(65) Prior Publication Data
US 2022/0116962 A1 Apr. 14, 2022

(30) Foreign Application Priority Data

Oct. 14, 2020 (CN) .......................... 202011096161.7
Oct. 20, 2020 (CN) .......................... 202011124604.9
May 10, 2021 (CN) .......................... 202110507812.5

(51) Int. Cl.
*H04W 72/1263* (2023.01)
*H04L 1/1812* (2023.01)
(Continued)

(52) U.S. Cl.
CPC ....... *H04W 72/1263* (2013.01); *H04L 1/1819* (2013.01); *H04L 5/0053* (2013.01);
(Continued)

(58) Field of Classification Search
CPC . H04W 72/1263; H04W 72/23; H04W 24/08; H04L 27/26025; H04L 1/1819; H04L 5/0053
(Continued)

(56) References Cited

U.S. PATENT DOCUMENTS

2019/0379506 A1   12/2019  Cheng
2020/0196346 A1*   6/2020  Khoshnevisan .......... H04L 1/08
(Continued)

FOREIGN PATENT DOCUMENTS

EP    3 691 375 A1    8/2020
EP    3 927 060 A1   12/2021
(Continued)

OTHER PUBLICATIONS

CMCC, Enhancements on Multi-TRP for PDCCH, PUCCH and PUSCH, R1-2006201, 3GPP TSG RAN WG1 #102-e, Aug. 8, 2020, e-Meeting, sections 2-4; and figure 2.
(Continued)

*Primary Examiner* — Obaidul Huq
(74) *Attorney, Agent, or Firm* — Jefferson IP Law, LLP

(57) ABSTRACT

The present disclosure relates to a pre-5th generation (5G) or 5G communication system to be provided for supporting higher data rates beyond 4th generation (4G) communication system such as long term evolution (LTE). A method performed by the terminal in a wireless communication system is provided. The method includes receiving downlink signal including at least one of downlink data or downlink control information (DCI), determining an uplink signal to be transmitted based on the downlink signal, determining at least one of a time unit or an uplink physical channel for transmitting the uplink signal, the uplink physical channel including at least one of a physical uplink control channel (PUCCH) or a physical uplink shared channel (PUSCH), and transmitting the uplink signal in the determined at least one of the time unit or the uplink physical channel.

17 Claims, 19 Drawing Sheets

(51) Int. Cl.
- *H04L 5/00* (2006.01)
- *H04L 27/26* (2006.01)
- *H04W 24/08* (2009.01)
- *H04W 72/23* (2023.01)

(52) U.S. Cl.
CPC ....... *H04L 27/26025* (2021.01); *H04W 24/08* (2013.01); *H04W 72/23* (2023.01)

(58) Field of Classification Search
USPC ........................................ 370/310, 328, 329
See application file for complete search history.

(56) References Cited

U.S. PATENT DOCUMENTS

| | | | |
|---|---|---|---|
| 2020/0221429 A1 | 7/2020 | Li et al. | |
| 2022/0322326 A1* | 10/2022 | Wong | .................... H04L 1/1854 |

FOREIGN PATENT DOCUMENTS

| | | | | |
|---|---|---|---|---|
| WO | 2020/033785 A1 | 2/2020 | | |
| WO | WO-2020033884 A1 * | 2/2020 | ........... | H04L 1/0025 |
| WO | 2020/166696 A1 | 8/2020 | | |

OTHER PUBLICATIONS

ZTE, Multi-TRP enhancements for PDCCH, PUCCH and PUSCH, R1-2005455, 3GPP TSG RAN WG1 Meeting #102-e, Aug. 8, 2020, e-Meeting, sections 2-2.3; and figures 2.1-3.
VIVO, Discussion on enhancement on PDCCH, PUCCH, PUSCH in MTRP scenario, R1-2005364, 3GPP TSG RAN WG1 #102-e, Aug. 8, 2020, e-Meeting, sections 2-4.4; and figures 3-4.
International Search Report dated Jan. 20, 2022, issued in International Application No. PCT/KR2021/014263.
European Search Report dated Feb. 14, 2024, issued in European Application No. 21880549.7.

* cited by examiner

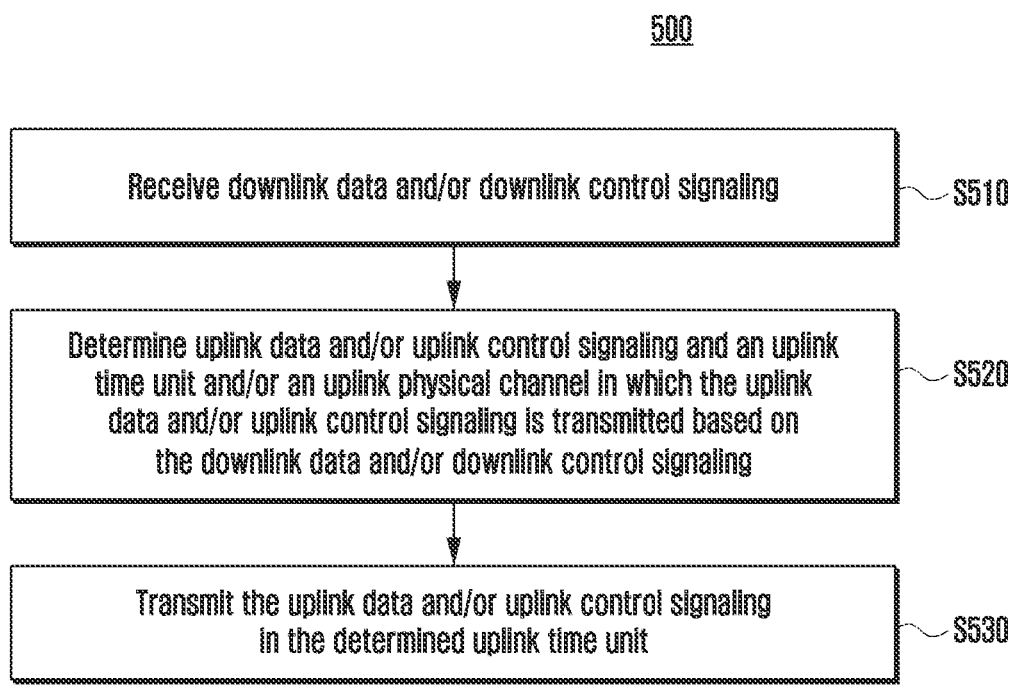

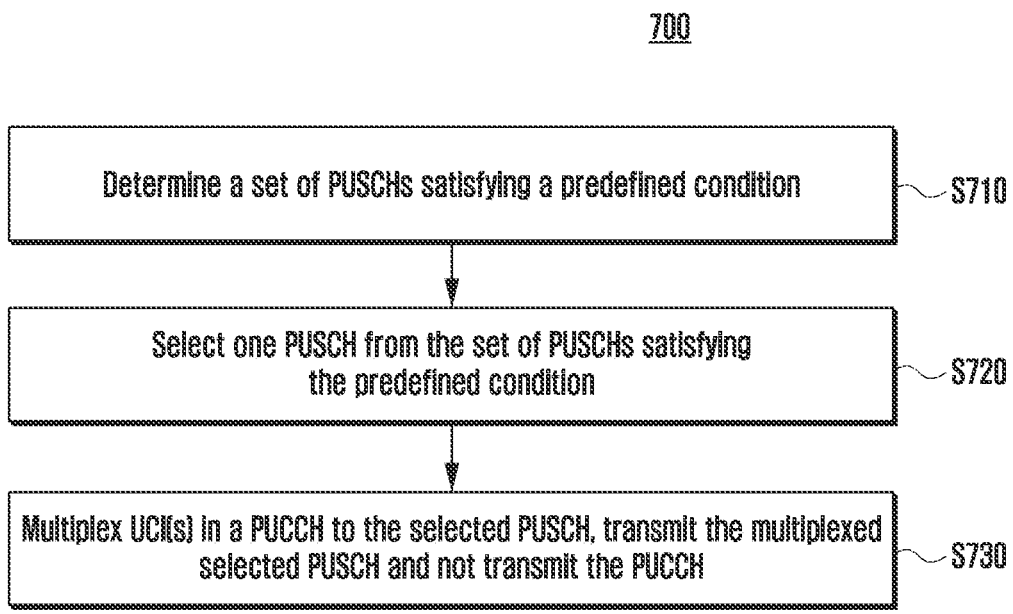

TERMINAL, BASE STATION AND METHOD PERFORMED BY THE SAME IN WIRELESS COMMUNICATION SYSTEM

CROSS-REFERENCE TO RELATED APPLICATION(S)

This application is based on and claims priority under 35 U.S.C. § 119(a) of a Chinese patent application number 202011096161.7, filed on Oct. 14, 2020, in the China National Intellectual Property Administration, of a Chinese patent application number 202011124604.9, filed on Oct. 20, 2020, in the China National Intellectual Property Administration, and of a Chinese patent application number 202110507812.5, filed on May 10, 2021, in the China National Intellectual Property Administration, the disclosure of each of which is incorporated by reference herein in its entirety.

BACKGROUND

1. Field

The disclosure relates to the field of wireless communication. More particularly, the disclosure relates to a terminal, a base station, a method performed by the terminal and a method performed by the base station in a wireless communication system, and a computer-readable storage medium.

2. Description of Related Art

In order to meet the increasing demand for wireless data communication services since the deployment of 4th generation (4G) communication systems, efforts have been made to develop improved 5th generation (5G) or pre-5G communication systems. Therefore, 5G or pre-5G communication systems are also called "Beyond 4G networks" or "Post-Long Term Evolution (LTE) systems".

In order to achieve a higher data rate, 5G communication systems are implemented in higher frequency (millimeter, mmWave) bands (e.g., 60 GHz bands). In order to reduce propagation loss of radio waves and increase a transmission distance, technologies such as beamforming, massive Multiple-Input Multiple-Output (MIMO), Full Dimensional MIMO (FD-MIMO), array antenna, analog beamforming and large-scale antenna are discussed in 5G communication systems.

In addition, in 5G communication systems, developments of system network improvement are underway based on advanced small cell, cloud Radio Access Network (RAN), ultra-dense network, device-to-device (D2D) communication, wireless backhaul, mobile network, cooperative communication, Coordinated Multi-Points (CoMP), reception-end interference cancellation, etc.

In 5G systems, hybrid frequency shift keying (FSK) and quadrature amplitude modulation (QAM) (FQAM) and Sliding Window Superposition Coding (SWSC) as Advanced Coding Modulation (ACM), and Filter Bank Multi Carrier (FBMC), Non-Orthogonal Multiple Access (NOMA) and Sparse Code Multiple Access (SCMA) as advanced access technologies have been developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a terminal, a base station, a method performed by the terminal and a method performed by the base station in a wireless communication system, and a computer-readable storage medium.

In accordance with an aspect of the disclosure, a method performed by a terminal in a wireless communication system is provided. The method includes receiving downlink signal(s) including at least one of downlink data or downlink control information (DCI), determining an uplink signal to be transmitted based on the downlink signal, determining at least one of a time unit or an uplink physical channel for transmitting the uplink signal, wherein the uplink physical channel includes at least one of a physical uplink control channel (PUCCH) or a physical uplink shared channel (PUSCH), and transmitting the uplink signal in the determined at least one of the time unit or the uplink physical channel.

In accordance with another of the disclosure, a method performed by a base station in a wireless communication system is provided. The method includes transmitting, to a terminal, downlink signal including at least one of downlink data or downlink control information (DCI), and receiving an uplink signal from the terminal in at least one of an uplink time unit or an uplink physical channel, wherein the uplink physical channel includes at least one of a physical uplink control channel (PUCCH) or a physical uplink shared channel (PUSCH), and wherein the at least one of the uplink time unit or the uplink physical channel and the uplink signal are determined based on the downlink signal.

In some implementations, for example, when there are multiple DCIs for the terminal each of which schedules a same physical downlink shared channel (PDSCH) or PUSCH, only one DCI of the multiple DCIs is received. For example, at least one of uplink transmission related to the uplink signal or downlink transmission related to the downlink signal is performed based on only the received one DCI.

In some implementations, for example, when there are multiple DCIs for the terminal or the multiple DCIs for the terminal are received, and each of the multiple DCIs schedules a same PDSCH or PUSCH, at least one of uplink transmission related to the uplink signal or downlink transmission related to the downlink signal is performed based on only one of the multiple DCIs.

In some implementations, for example, when there are multiple repetitions of a DCI transmission for the terminal for scheduling at least one of a PDSCH, a PUSCH or a PUCCH, each of the multiple repetitions of the DCI transmission is in a same downlink time unit.

In some implementations, for example, $$\left\lfloor n \cdot \frac{2^{\mu_{PDSCH}}}{2^{\mu_{PDCCH}}} \right\rfloor$$

is the same for each of the multiple repetitions of the DCI transmission, w ere n is an index of a slot where a corresponding repetition of the multiple repetitions of the DCI transmission is located, and $\mu_{PDSCH}$ and $\mu_{PDCCH}$ are configured subcarrier spacings for the PDSCH and a physical downlink control channel (PDCCH) respectively.

In some implementations, for example, when there are multiple repetitions of a DCI transmission for the terminal for scheduling at least one of ta PDSCH, a PUSCH or a PUCCH, the at least one of the PDSCH, the PUSCH or the PUCCH is determined based on the first repetition or the last repetition of the repetitions of the DCI transmission.

In some implementations, for example, determining the at least one of the PDSCH, the PUSCH or the PUCCH based on the first repetition or the last repetition of the repetitions of the DCI transmission includes determining the at least one of the PDSCH, the PUSCH or the PUCCH based on the first repetition or the last repetition of the repetitions of the DCI transmission when at least two repetitions of the multiple repetitions of the DCI transmission are not in a same downlink time unit.

In some implementations, for example, when there are multiple repetitions of a DCI transmission for the terminal for scheduling the PDSCH, the starting symbol of time domain resource allocation for the PDSCH is relative to the first repetition of multiple repetitions of the PDCCH transmission, or is relative to the last repetition of the multiple repetitions of the PDCCH transmission.

In some implementations, for example, the starting symbol of the time domain resource allocation for the PDSCH is relative to the starting symbol of a PDCCH monitoring occasion where the first repetition of the multiple repetitions of the PDCCH transmission is located, or is relative to the starting symbol of a PDCCH monitoring occasion where the last repetition of the multiple repetitions of the PDCCH transmission is located.

In some implementations, for example, when there are multiple repetitions of a DCI transmission for the terminal, a Downlink Assignment Indicator (DAI) counting occasion for counting DAIs in the multiple repetitions of the DCI transmission is determined as one of the start of the first repetition of the multiple repetitions of the DCI transmission, or a PDCCH monitoring occasion where the first repetition of the multiple repetitions of the DC transmission is located.

In some implementations, for example, when there are multiple repetitions of a DCI transmission for the terminal within a time unit, a DAI counting occasion for counting DAIs in the multiple repetitions of the DCI transmission is determined as one of the earliest PDCCH monitoring occasion within the time unit, the latest PDCCH monitoring occasion within the time unit, or the starting symbol of the time unit.

In some implementations, for example, when there are multiple transmissions of the DCI for the terminal, a DAI counting occasion for counting DAIs in the multiple transmissions of the DCI is determined as one of the start of a transmission occasion of the first transmission of the multiple transmissions, or a PDCCH monitoring occasion where the transmission occasion of the first transmission of the multiple transmissions of the DCI is located In some implementations, for example, the uplink signal includes a Hybrid Automatic Repeat request-Acknowledgement (HARQ-ACK) codebook including HARQ-ACK information for the downlink signal, and the bit positions in the HARQ-ACK codebook are determined based on the DAI counting occasion.

In some implementations, for example, when there are multiple transmissions of the DCI for the terminal within a time unit, a DAI counting occasion for counting DAIs in the multiple transmissions of the DCI is determined as one of the earliest PDCCH monitoring occasion within the time unit, the latest PDCCH monitoring occasion within the time unit, or the starting symbol of the time unit.

In some implementations, for example, when there are multiple transmissions of the DCI for the terminal, each DAI in the multiple transmissions of the DCI is counted independently.

In some implementations, for example, the PUSCH may include a dynamically scheduled PUSCH and/or a semi-statically configured PUSCH. In some examples, when a parameter or configuration information is configured for the PUSCH, the parameter or configuration information may be configured for the dynamically scheduled PUSCH and the semi-statically configured PUSCH uniformly. In some examples, when a parameter or configuration information is configured for the PUSCH, the parameter or configuration information may be configured for the dynamically scheduled PUSCH and the semi-statically configured PUSCH separately. For example, the parameters or configuration information may be used for different purposes depending on specific requirements. For example, the parameter or configuration information may be used to indicate whether to transmit the PUCCH and the PUSCH simultaneously. For another example, the parameter or configuration information may be used to indicate whether the PUSCH may be multiplexed with the PUCCH.

In some implementations, for example, when there are multiple transmissions of DCI for the terminal, each DAT in the multiple transmissions of the DCI is counted separately. According to at least one embodiment of the disclosure, a terminal in a wireless communication system is further provided. The terminal may include a transceiver configured to transmit and receive signals, and a controller coupled to the transceiver and configured to perform any of the methods described above.

In accordance with another aspect of the disclosure, a base station in a wireless communication system is provided. The base station includes a transceiver for transmitting and receiving signals, and a controller coupled to the transceiver and configured to perform one or more of operations in the methods described above.

In accordance with another aspect of the disclosure, a method performed by a terminal in a wireless communication system is provided. The method includes receiving, from a base station, downlink signal(s) including at least one of downlink data or downlink control information, and determining an uplink signal to be transmitted based on downlink signal(s), and determining at least one of a time unit or an uplink physical channel for transmitting the uplink signal, where the uplink physical channel includes at least one of a physical uplink control channel (PUCCH) or a physical uplink shared channel (PUSCH), and transmitting the uplink signal in the determined at least one of the time unit or the uplink physical channel.

In some implementations, for example, the determining of at least one of the time unit or the uplink physical channel for transmitting the uplink signal includes determining at least one of the PUCCH or the PUSCH for transmitting the uplink signal based on a predefined condition related to multiplexing of at least one of the PUCCH or the PUSCH, where, when the predefined condition is satisfied by the PUSCH, uplink control information(s) (UCI(s)) carried by the PUCCH is multiplexed in the PUSCH satisfying the predefined condition, and transmitting the multiplexed PUSCH and not transmitting the PUCCH.

In some implementations, for example, the predefined condition may include at least one of that a PUCCH and a PUSCH satisfy a scheduling restriction, that a PUSCH is not configured to be transmitted simultaneously with a PUCCH, a PUSCH with a lower priority and any PUSCH with a higher priority in a same serving cell do not overlap in time domain, that a PUSCH and a PUCCH are in a same sub-slot, that a PUSCH and a PUCCH overlap in time domain, that a PUSCH and a PUCCH satisfy a timing relationship, that a reliability requirement is satisfied after UCI(s) carried by a PUCCH is(are) multiplexed in a PUSCH, that a delay requirement is satisfied after UCI(s) carried by a PUCCH is(are) multiplexed in a PUSCH, a PUSCH is not indicated to be cancelled by an uplink cancellation indication (UL CI), or that in a case where a PUSCH is a configured grant (CG)-PUSCH, any symbol of the CG-PUSCH is not semi-statically indicated as a downlink symbol, and/or any symbol of the CG-PUSCH is not indicated as a downlink symbol by a dynamic slot format indication (SFI).

In some implementations, for example, the method further includes transmitting, to the base station, capability information indicating whether the terminal supports simultaneous transmission of a PUCCH and a PUSCH.

In some implementations, for example, the method further includes receiving, from the base station, configuration information determined based on the capability information, where the configuration information is used to configure whether the terminal is to transmit the PUCCH and the PUSCH simultaneously.

In some implementations, for example, the capability information may include a capability of the terminal to support simultaneous transmission of a PUCCH and a PUSCH, which is associated with one or more of a carrier, the priorities of the PUCCH and the PUSCH, a band, or a band combination.

In some implementations, for example, the capability information may correspond to at least one of a duplex mode or a frequency range.

In some implementations, for example, when the terminal is configured by the configuration information to transmit a PUCCH and a PUSCH simultaneously, the PUCCH and the PUSCH may be transmitted simultaneously when the scheduled PUCCH and the PUSCH overlap in time domain.

In some implementations, for example, when the terminal is not configured by the configuration information to transmit a PUCCH and a PUSCH simultaneously, or is configured by the configuration information not to transmit a PUCCH and a PUSCH simultaneously, at least one of the PUCCH or the PUSCH for transmitting the uplink signal may be determined based on a predefined condition related to multiplexing of at least one of the PUCCH or the PUSCH when the scheduled PUCCH and the PUSCH overlap in time domain. When the predefined condition is satisfied by the PUSCH, uplink control information (UCI) carried by the PUCCH is multiplexed in the PUSCH satisfying the predefined condition, and the multiplexed PUSCH is transmitted and the PUCCH is not transmitted.

In some implementations, for example, the predefined condition may include one or more of that a PUCCH and a PUSCH satisfy a scheduling restriction, that a PUSCH is not configured to be transmitted simultaneously with a PUCCH, that a PUSCH with a lower priority and any PUSCH with a higher priority in a same serving cell do not overlap in time domain, that a PUSCH and a PUCCH are in a same sub-slot, that a PUSCH and a PUCCH overlap in time domain, that a PUSCH and a PUCCH satisfy a timing relationship, that a reliability requirement is satisfied after UCI(s) carried by a PUCCH is(are) multiplexed in a PUSCH, that a delay requirement is satisfied after UCI(s) carried by a PUCCH is(are) multiplexed in a PUSCH, that a PUSCH is not indicated to be cancelled by an uplink cancellation indication (UL CI), or that in a case where a PUSCH is a configured grant (CG)-PUSCH, any symbol of the CG-PUSCH is not semi-statically indicated as a downlink symbol, and/or any symbol of the CG-PUSCH is not indicated as a downlink symbol by a dynamic slot format indication (SFI).

In some implementations, for example, the configuration information may be transmitted via at least one of a Radio Resource Control (RRC) message or a MAC CE.

In some implementations, for example, the PUSCH may include a dynamically scheduled PUSCH and/or a semi-statically configured PUSCH. In some examples, when a parameter or configuration information is configured for the PUSCH, the parameter or configuration information may be configured for the dynamically scheduled PUSCH and the semi-statically configured PUSCH uniformly. In some examples, when a parameter or configuration information is configured for the PUSCH, the parameter or configuration information may be configured for the dynamically scheduled PUSCH and the semi-statically configured PUSCH separately. For example, the parameters or configuration information may be used for different purposes depending on specific requirements. For example, the parameter or configuration information may be used to indicate whether to transmit the PUCCH and the PUSCH simultaneously. For another example, the parameter or configuration information may be used to indicate whether the PUSCH may be multiplexed with the PUCCH.

In some implementations, for example, the PUSCH may include a PUSCH with the higher priority and/or a PUSCH with the lower priority.

In some implementations, for example, the PUCCH may include a PUCCH with the higher priority and/or a PUCCH with the lower priority.

In some implementations, for example, the PUCCH may include a PUCCH obtained by multiplexing a PUCCH with the higher priority with a PUCCH with the lower priority.

In some implementations, for example, a type of UCI(s) carried by the PUCCH may include one or more of Hybrid Automatic Repeat request-Acknowledgement (HARQ-ACK) information, scheduling request (SR), link recovery request (LRR), channel state information (CSI), or configured grant (CG) UCI.

In some implementations, for example, the PUCCH may be configured with PUCCH repetition transmission.

In some implementations, for example, the PUSCH may be configured with PUSCH repetition transmission.

In accordance with another aspect of the disclosure, a method performed by a base station in a wireless communication system is provided. The method includes transmitting, to a terminal, downlink signal(s) including at least one of downlink data or downlink control information, and receiving an uplink signal from the terminal in at least one of an uplink time unit or an uplink physical channel. The uplink physical channel includes at least one of a physical uplink control channel (PUCCH) or a physical uplink shared channel (PUSCH). The at least one of the uplink time unit or the uplink physical channel and the uplink signal are determined based on the downlink signal.

In some implementations, for example, the uplink physical channel for receiving the uplink signal may be determined based on a predefined condition related to multiplexing of at least one of the PUCCH or the PUSCH. When the predefined condition is satisfied by the PUSCH, uplink control information(s) (UCI(s)) carried by the PUCCH is(are) multiplexed in the PUSCH satisfying the predefined condition, and the multiplexed PUSCH is transmitted and the PUCCH is not transmitted.

In some implementations, for example, the predefined condition may include one or more of that a PUCCH and a PUSCH satisfy a scheduling restriction, that a PUSCH is not configured to be transmitted simultaneously with a PUCCH, that a PUSCH with a lower priority and any PUSCH with a higher priority in a same serving cell do not overlap in time domain, that a PUSCH and a PUCCH are in a same sub-slot, that a PUSCH and a PUCCH overlap in time domain, that a PUSCH and a PUCCH satisfy a timing relationship, a reliability requirement is satisfied after UCI(s) carried by a PUCCH is(are) multiplexed in a PUSCH, that a delay requirement is satisfied after UCI(s) carried by a PUCCH is(are) multiplexed in a PUSCH, a PUSCH is not indicated to be cancelled by a UL CI, or that in a case where a PUSCH is a CG-PUSCH, any symbol of the CG-PUSCH is not semi-statically indicated as a downlink symbol, and/or any symbol of the CG-PUSCH is not indicated as a downlink symbol by a dynamic SFI.

In some implementations, for example, the method may further include receiving, from the terminal, capability information indicating whether the terminal supports simultaneous transmission of a PUCCH and a PUSCH.

In some implementations, for example, the method may further include transmitting, to the terminal, configuration information determined based on the capability information, which is used to configure whether the terminal is to transmit the PUCCH and the PUSCH simultaneously.

In some implementations, for example, the capability information may include a capability of the terminal to support simultaneous transmission of a PUCCH and a PUSCH, which is associated with one or more of a carrier, priorities of the PUCCH and the PUSCH, a band, or a band combination.

In some implementations, for example, the capability information may correspond to at least one of a duplex mode or a frequency range.

In some implementations, for example, when the terminal is configured by the configuration information to transmit the PUCCH and the PUSCH simultaneously, the PUCCH and the PUSCH are transmitted simultaneously when the scheduled PUCCH and the PUSCH overlap in time domain.

In some implementations, for example, when the terminal is not configured by the configuration information to transmit the PUCCH and the PUSCH simultaneously, or is configured by the configuration information not to transmit the PUCCH and the PUSCH simultaneously, uplink control information (UCI) carried by the PUCCH may be multiplexed in the PUSCH when a predefined condition is satisfied, when the scheduled PUCCH and the PUSCH overlap in time domain, and the multiplexed PUSCH is transmitted and the PUCCH is not transmitted.

In some implementations, for example, the predefined condition may include one or more of that a PUCCH and a PUSCH satisfy a scheduling restriction, that a PUSCH is not configured to be transmitted simultaneously with a PUCCH, that a PUSCH with a lower priority and any PUSCH with a higher priority in a same serving cell do not overlap in time domain, that a PUSCH and a PUCCH are in a same sub-slot, that a PUSCH and a PUCCH overlap in time domain, that a PUSCH and a PUCCH satisfy a timing relationship, that a reliability requirement is satisfied after UCI(s) carried by a PUCCH is(are) multiplexed in a PUSCH, that a delay requirement is satisfied after UCI(s) carried by a PUCCH is(are) multiplexed in a PUSCH, that a PUSCH is not indicated to be cancelled by a UL CI, or that in a case where a PUSCH is a CG-PUSCH, any symbol of the CG-PUSCH is not semi-statically indicated as a downlink symbol, and/or any symbol of the CG-PUSCH is not indicated as a downlink symbol by a dynamic SFI.

In some implementations, for example, the configuration information may be transmitted via at least one of an RRC message or a Medium Access Control (MAC CE).

In some implementations, for example, the PUSCH may include a dynamically scheduled PUSCH and/or a semi-statically configured PUSCH.

In some implementations, for example, the PUSCH may include a PUSCH with a higher priority and/or a PUSCH with a lower priority.

In some implementations, for example, the PUCCH may include a PUCCH with a higher priority and/or a PUCCH with a lower priority.

In some implementations, for example, the PUCCH may include a PUCCH obtained by multiplexing a PUCCH with a higher priority with a PUCCH with a lower priority.

In some implementations, for example, a type of the UCI(s) carried by the PUCCH may include one or more of HARQ-ACK information, SR, LRR, CSI, or CG UCI.

In some implementations, for example, the PUCCH may be configured with PUCCH repetition transmission.

In some implementations, for example, the PUSCH may be configured with PUSCH repetition transmission.

According to some embodiments of the disclosure, a terminal in a wireless communication system is further provided. The terminal may include a transceiver configured to transmit and receive signals, and a controller coupled to the transceiver and configured to perform any of the methods described above.

According to some embodiments of the disclosure, a base station in a wireless communication system is further provided. The base station may include a transceiver configured to transmit and receive signals, and a controller coupled to the transceiver and configured to perform any of the methods described above.

According to some embodiments of the disclosure, a computer-readable storage medium having one or more computer programs stored thereon is further provided, where the one or more computer programs, when executed by one or more processors, may implement one or more of operations in the methods described above.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates a flowchart of a method performed by a UE according to an embodiment of the disclosure;

FIG. 7 illustrates a flowchart of an example method for multiplexing of a PUCCH and a PUSCH according to an embodiment of the disclosure;

Throughout the drawings, it should be noted that like reference numbers are used to depict the same or similar elements, features, and structures.

DETAILED DESCRIPTION

Figure 1:
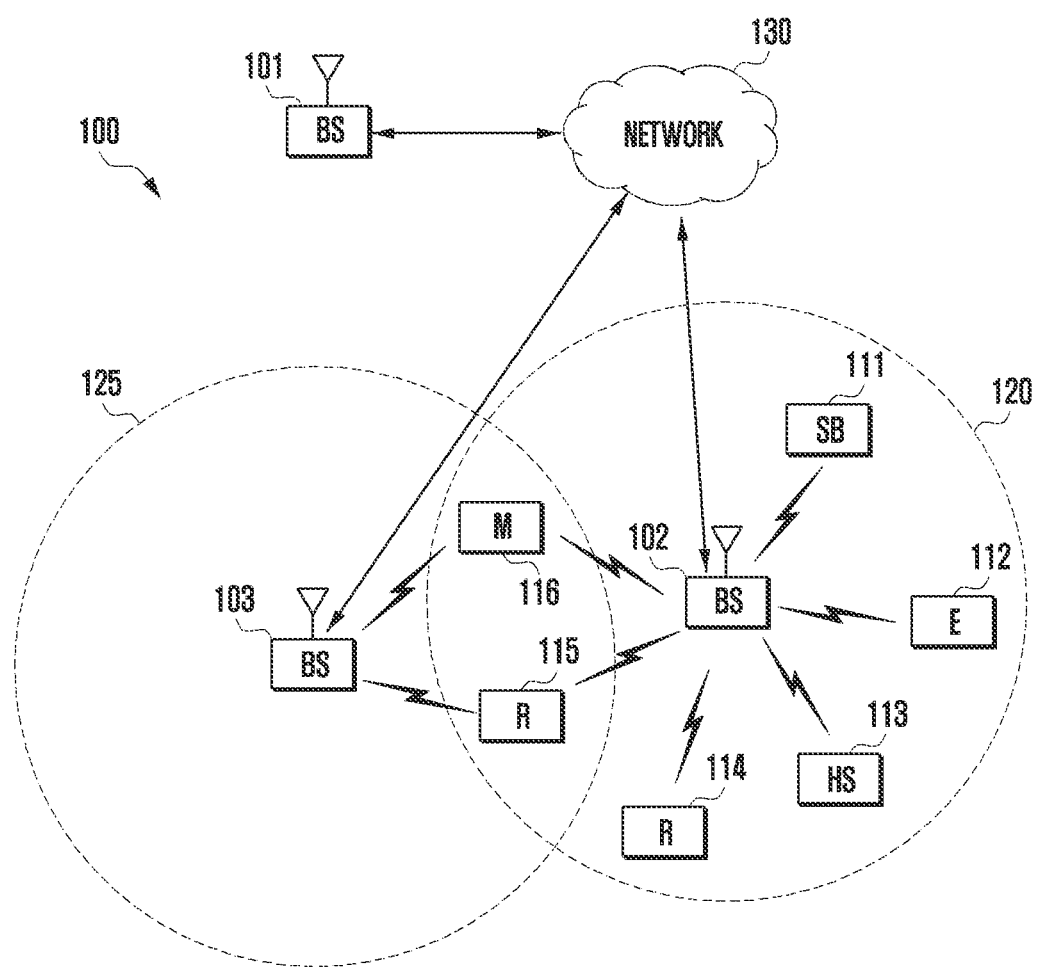
FIG. 1 illustrates a schematic diagram of an example wireless network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In order to make the purpose, technical schemes and advantages of the embodiments of the disclosure clearer, the technical schemes of the embodiments of the disclosure will be described clearly and completely with reference to the drawings of the embodiments of the disclosure. Apparently, the described embodiments are a part of the embodiments of the disclosure, but not all embodiments. Based on the described embodiments of the disclosure, all other embodiments obtained by those of ordinary skill in the art without creative labor belong to the protection scope of the disclosure.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A and B and C.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as Read-Only Memory (ROM), Random Access Memory (RAM), a hard disk drive, a Compact Disc (CD), a Digital Video Disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein to describe the embodiments of the disclosure are not intended to limit and/or define the scope of the disclosure. For example, unless otherwise defined, the technical terms or scientific terms used in the disclosure shall have the ordinary meaning understood by those with ordinary skills in the art to which the disclosure belongs.

It should be understood that "first", "second" and similar words used in the disclosure do not express any order, quantity or importance, but are only used to distinguish different components. Similar words such as singular forms "a", "an" or "the" do not express a limitation of quantity, but express the existence of at least one of the referenced item, unless the context clearly dictates otherwise. For example, reference to "a component surface" includes reference to one or more of such surfaces.

As used herein, any reference to "one example" or "example", "one implementation" or "implementation", "one embodiment" or "embodiment" means that particular elements, features, structures or characteristics described in connection with the embodiment is included in at least one embodiment. The phrases "in one embodiment" or "in one example" appearing in different places in the specification do not necessarily refer to the same embodiment.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper", "lower", "left" and "right" are only used to express a relative positional relationship, and when an absolute position of the described object changes, the relative positional relationship may change accordingly.

The various embodiments discussed below for describing the principles of the disclosure in the patent document are for illustration only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to LTE and/or 5G, those skilled in the art will understand that the main points of the disclosure can also be applied to other communication systems with similar technical backgrounds and channel formats with slight modifications without departing from the scope of the disclosure. For example, the technical schemes of the embodiments of the present application can be applied to various communication systems. For example, the communication systems may include global systems for mobile communications (GSM), code division multiple access (CDMA) systems, wideband code division multiple access (WCDMA) systems, general packet radio service (GPRS) systems, long term evolution (LTE) systems, LTE frequency division duplex (FDD) systems, LTE time division duplex (TDD) systems, universal mobile telecommunications system (UMTS), worldwide interoperability for microwave access (WiMAX) communication systems, 5th generation (5G) systems or new radio (NR) systems, etc. In addition, the technical schemes of the embodiments of the present application can be applied to future-oriented communication technologies. In addition, the technical schemes of the embodiments of the present application can be applied to future-oriented communication technologies.

In the description of the disclosure, when it is considered that some detailed explanations about functions or configurations may unnecessarily obscure the essence of the disclosure, these detailed explanations will be omitted. All terms (including descriptive or technical terms) used herein should be interpreted as having apparent meanings to those of ordinary skill in the art. However, these terms may have different meanings according to the intention of those of ordinary skill in the art, precedents or the emergence of new technologies, and therefore, the terms used herein must be defined based on the meanings of these terms together with the description throughout the specification. Hereinafter, for example, the base station may be at least one of a gNode B, an eNode B, a Node B, a radio access unit, a base station controller, and a node on a network. The terminal may include a user equipment (UE), a mobile station (MS), a mobile phone, a smart phone, a computer or multimedia system capable of performing communication functions. In some embodiments of the disclosure, the downlink (DL) is a wireless transmission path through which signals are transmitted from a base station to a terminal, and the uplink (UL) is a wireless transmission path through which signals are transmitted from a terminal to a base station. In addition, one or more embodiments of the disclosure may be applied to 5G wireless communication technologies (5G, or new radio (NR)) developed after LTE-A, or to new wireless communication technologies proposed on the basis of 4G or 5G (for example, B5G (Beyond 5G) or 6G).

Hereinafter, the embodiments of the disclosure will be described in detail with reference to the accompanying drawings. It should be noted that the same reference numerals in different drawings will be used to refer to the same elements already described.

The following FIGS. 1, 2A, 2B, 3A, and 3B describe various embodiments implemented by using orthogonal frequency division multiplexing (OFDM) or orthogonal frequency division multiple access (OFDMA) communication technologies in wireless communication systems. The descriptions of FIGS. 1, 2A, 2B, 3A, and 3B do not mean physical or architectural implications for the manner in which different embodiments may be implemented. Different embodiments of the disclosure may be implemented in any suitably arranged communication systems.

FIG. 1 illustrates an example wireless network 100 according to an embodiment of the disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station (BS)" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For example, the terms "terminal", "user equipment" and "UE" may be used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs)

within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
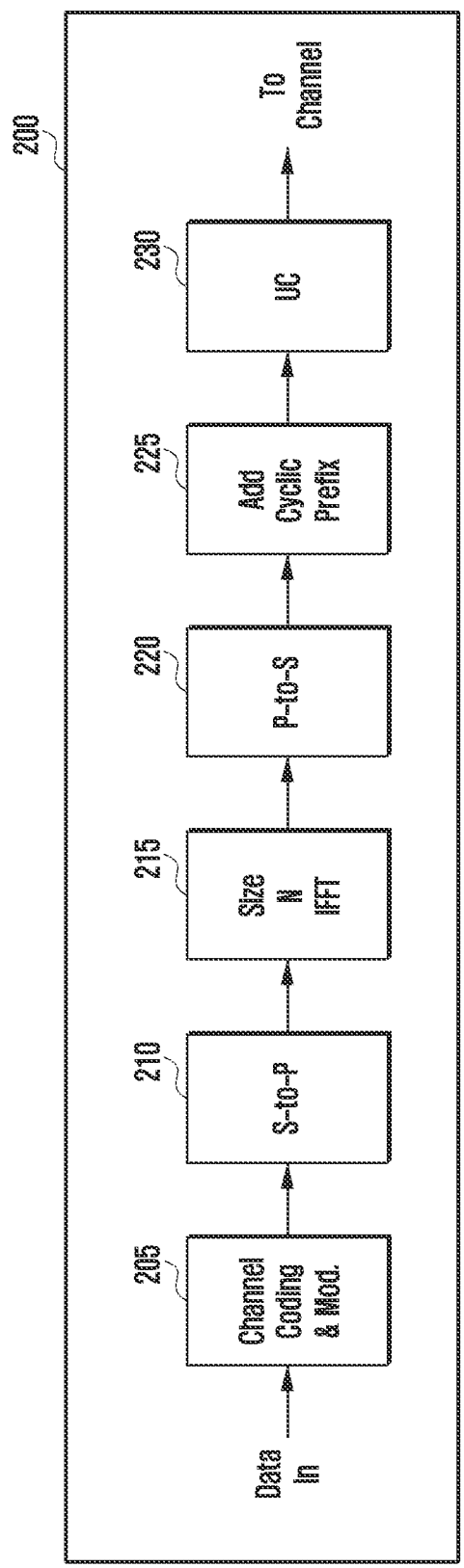
FIGS. 2A and 2B illustrate example wireless transmission and reception paths according to various embodiments of the disclosure.
Figure 2B:
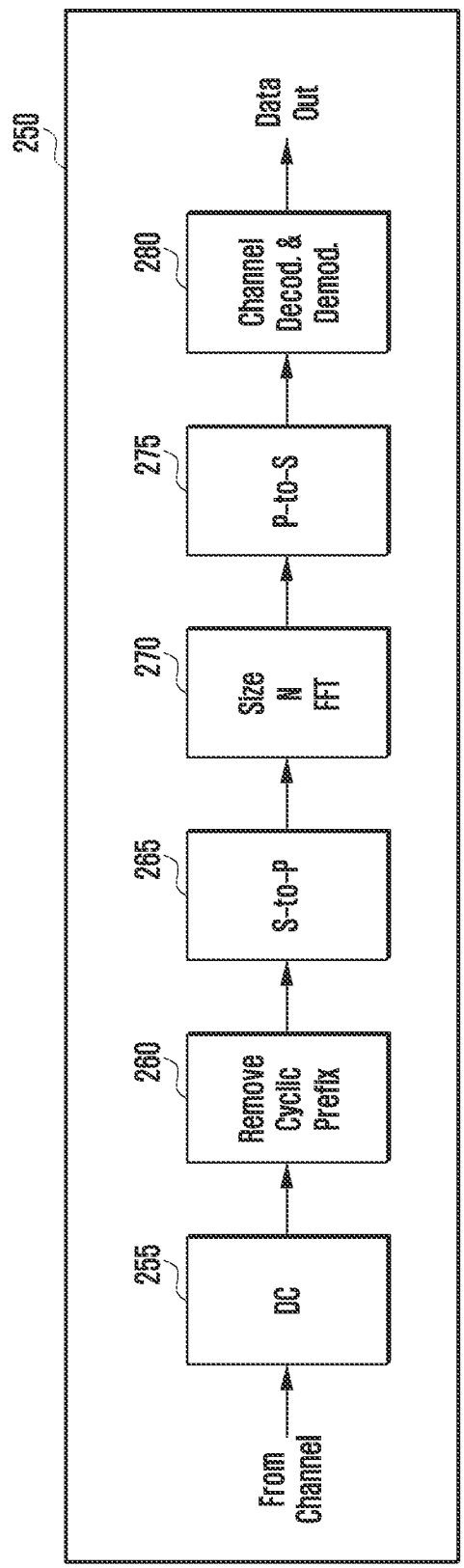

FIGS. 2A and 2B illustrate example wireless transmission and reception paths according to various embodiments of the disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time domain output signal. The Parallel-to-Serial block 220 converts (such as multiplexes) parallel time domain output symbols from the Size N IFFT block 215 to generate a serial time domain signal. The cyclic prefix addition block 225 inserts a cyclic prefix into the time domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time domain baseband signal. The Serial-to-Parallel block 265 converts the time domain baseband signal into a parallel time domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
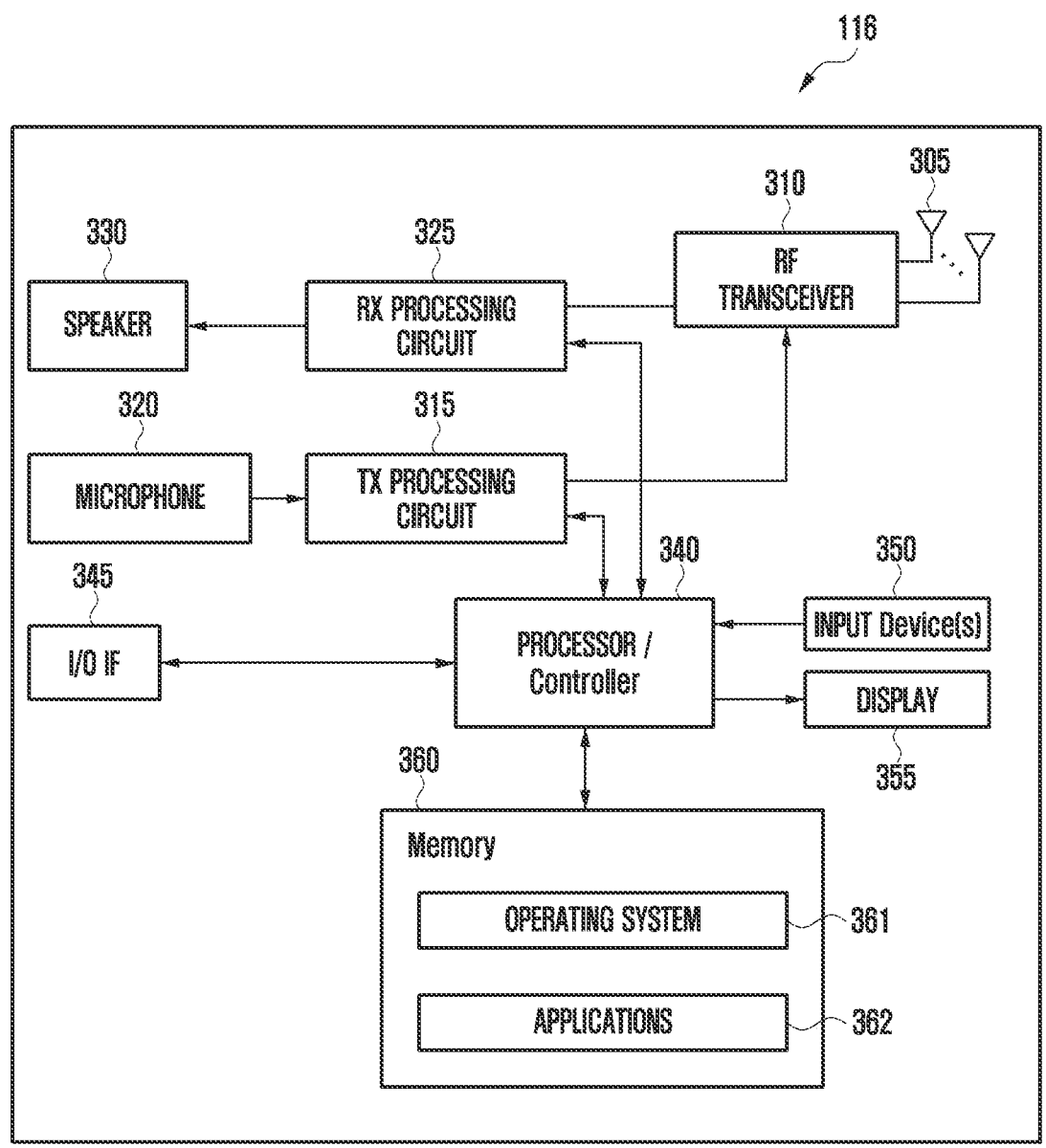
FIG. 3A illustrates an example user equipment (UE) according to an embodiment of the disclosure.

FIG. 3A illustrates an example UE 116 according to an embodiment of the disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
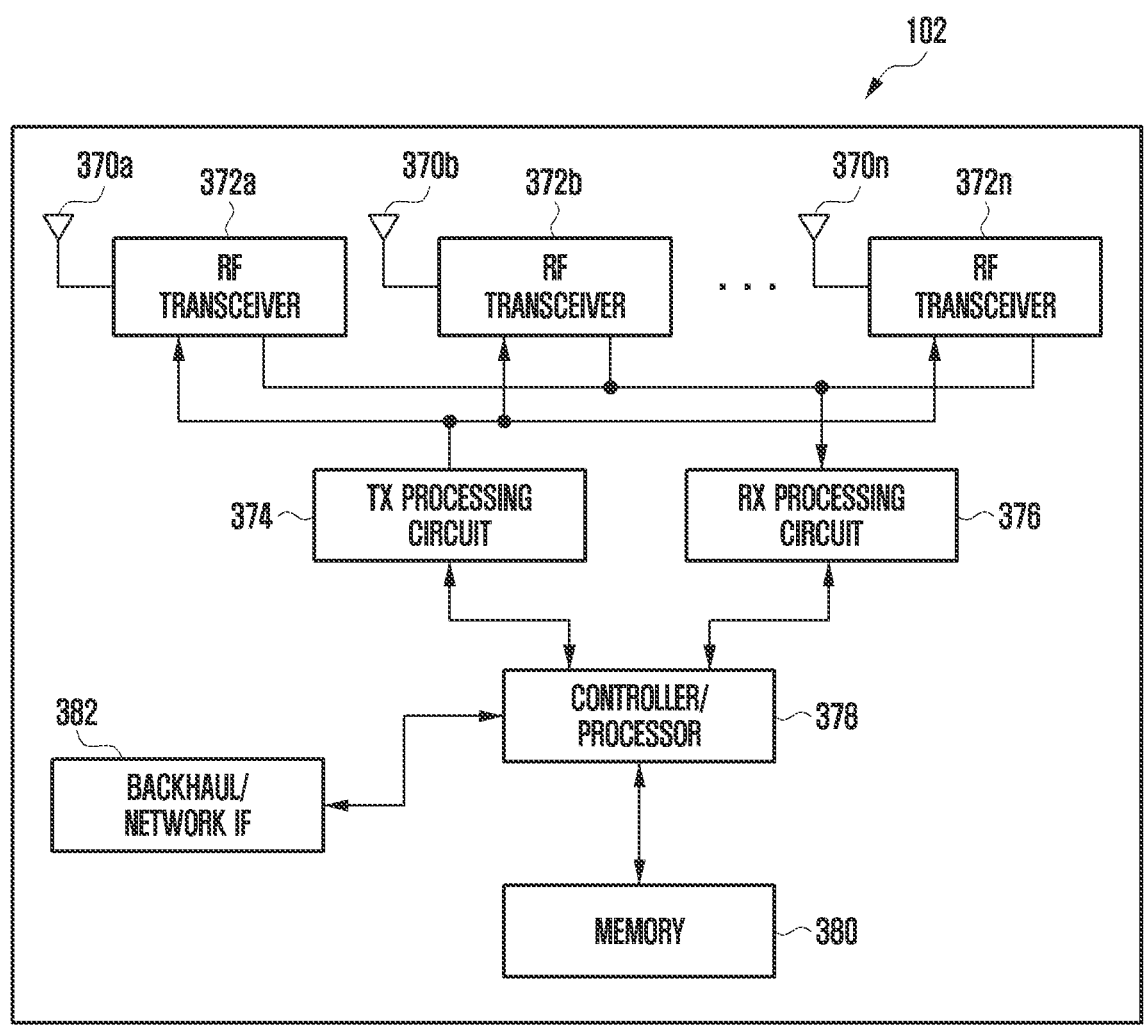
FIG. 3B illustrates an example gNB according to an embodiment of the disclosure.

FIG. 3B illustrates an example gNB 102 according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

Referring to FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Those skilled in the art will understand that, "terminal" and "terminal device" as used herein include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a personal communications service (PCS), which may combine voice, data processing, fax and/or data communication capabilities; a Personal Digital Assistant (PDA), which may include a radio frequency receiver, a pager, an internet/intranet access, a web browser, a notepad, a calendar and/or a Global Positioning System (GPS) receiver; a conventional laptop and/or palmtop computer or other devices having and/or including a radio frequency receiver. "Terminal" and "terminal device" as used herein may be portable, transportable, installed in vehicles (aviation, sea transportation and/or land), or suitable and/or configured to operate locally, and/or in distributed form, operate on the earth and/or any other position in space. "Terminal" and "terminal device" as used herein may also be a communication terminal, an internet terminal, a music/video playing terminal, such as a PDA, a Mobile Internet Device (MID) and/or a mobile phone with music/video playing functions, a smart TV, a set-top box and other devices.

Various embodiments of the disclosure are further described below with reference to the drawings.

With the rapid development of information industry, especially the increasing demand from mobile Internet and internet of things (IoT), it brings unprecedented challenges to the future mobile communication technology. According to the report of International Telecommunication Union (ITU) ITU-R M.[IMT.BEYOND 2020.TRAFFIC], it can be predicted that by 2020, compared with 2010 (4G era), the growth of mobile traffic will be nearly 1000 times, and the number of UE connections will also exceed 17 billion, and the number of connected devices will be even more alarming, with the massive IoT devices gradually infiltrating into the mobile communication network. In order to meet the unprecedented challenges, the communication industry and academia have carried out extensive research on the fifth generation (5G) mobile communication technology to face the 2020s. At present in ITU report ITU-R M.[IMT.VISION], the framework and overall goals of the future 5G has been discussed, in which the demand outlook, application scenarios and important performance indicators of 5G are described in detail. With respect to new requirements in 5G, ITU report ITU-R M.[IMT.FUTURE TECHNOLOGY TRENDS] provides information related to the technology trends of 5G, aiming at solving significant problems such as significantly improved system throughput, consistent user experience, scalability to support IoT, delay, energy efficiency, cost, network flexibility, support of emerging services and flexible spectrum utilization. In 3rd Generation Partnership Project (3GPP), the first stage of 5G is already in progress. To support more flexible scheduling, the 3GPP decides to support variable Hybrid Automatic Repeat request-Acknowledgement (HARQ-ACK) feedback delay in 5G. In existing Long Term Evolution (LTE) systems, a time from reception of downlink data to uplink transmission of HARQ-ACK is fixed. For example, in Frequency Division Duplex (FDD) systems, the delay is 4 subframes. In Time Division Duplex (TDD) systems, a HARQ-ACK feedback delay is determined for a corresponding downlink subframe based on an uplink and downlink configuration. In 5G systems, whether FDD or TDD systems, for a determined downlink time unit (for example, a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined based on factors such as different services or user capabilities.

The 3GPP has defined three directions of 5G application scenarios-eMBB (enhanced mobile broadband), mMTC (massive machine-type communication) and URLLC (ultra-reliable and low-latency communication). The eMBB scenario aims to further improve data transmission rate on the basis of the existing mobile broadband service scenario, so as to enhance user experience and pursue ultimate communication experience between people. mMTC and URLLC are the application scenarios of the Internet of Things, but their respective emphases are different: mMTC being mainly information interaction between people and things, while URLLC mainly reflecting communication requirements between things.

In 5G, eMBB and URLLC will adopt a non-standalone model, that is, both URLLC services and eMBB services are supported in the same cell. Since URLLC services may be sparse services, compared with URLLC with a standalone model, eMBB and URLLC with a non-standalone model can improve the spectrum efficiency of the system. When there are URLLC services in the system, it is preferred to schedule URLLC services, and when there are no URLLC services in the system or the resources occupied by URLLC services are less, eMBB services can be scheduled. At present, when there is a conflict between URLLC services and eMBB services, data and/or control information of URLLC services will be preferentially transmitted, thus losing performance of eMBB services. Therefore, how to optimize the transmission of data and control information of services (e.g., eMBB services) is a problem to be solved urgently.

Communication may include unicast communication, groupcast (or multicast) communication, or broadcast communication. The unicast communication may refer to transmissions between nodes (e.g., between a base station and a terminal), and the groupcast communication or the broadcast communication may refer to transmissions from one node (e.g., a base station) to multiple nodes (e.g., multiple terminals). In general, the broadcast communication is directed from one source component to all sink components in a system, while the multicast communication is directed from one source component to a possible subset of sink components. However, it should be noted that in the embodiments of the disclosure, the term "groupcast/broadcast" may represent at least one of the broadcast communication or the multicast communication. When downlink data received by multiple users is the same, the base station may transmit a groupcast/broadcast Physical Downlink Shared Channel (PDSCH). For periodicity services, the base station may also transmit a groupcast/broadcast Semi-Persistent Scheduling (SPS) PDSCH. Therefore, in these scenarios, how to configure the groupcast/broadcast SPS PDSCH, how to activate/deactivate the groupcast/broadcast SPS PDSCH, how to retransmit the groupcast/broadcast SPS PDSCH, how to produce a HARQ-ACK codebook of the SPS PDSCH, and how to multiplex HARQ-ACK for the SPS PDSCH with other UCI(s) are problems that need to be solved.

In order to solve at least the above technical problems, the embodiments of the disclosure provide a method for transmitting signals in a wireless communication system, a method for receiving signals in a wireless communication system, a terminal, a base station and a non-transitory computer-readable storage medium, thereby improving uplink transmission. Hereinafter, various embodiments of the disclosure will be described in detail with reference to the accompanying drawings.

In the embodiments of the disclosure, the first type of transceiving node may be a base station, and the second type of transceiving node may be a UE. In the following examples, the base station is taken as an example (but not limited thereto) to illustrate the first type of transceiving node, and the UE is taken as an example (but not limited thereto) to illustrate the second type of transceiving node.

Various embodiments of the disclosure are further described below with reference to the drawings.

The text and drawings are provided as examples only to help readers understand the disclosure. They are not intended and should not be interpreted as limiting the scope of the disclosure in any way. Although certain embodiments and examples have been provided, based on the content disclosed herein, it will be apparent to those skilled in the art that changes may be made to the illustrated embodiments and examples without departing from the scope of the disclosure.

Figure 4:
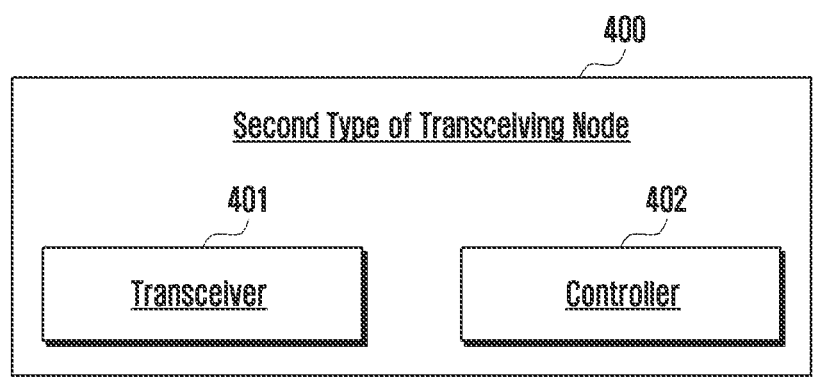
FIG. 4 illustrates a block diagram of the second type of transceiving node according to an embodiment of the disclosure.

FIG. 4 illustrates a block diagram of the second type of transceiving node according to an embodiment of the disclosure.

Referring to FIG. 4, the second type of transceiving node 400 may include a transceiver 401 and a controller 402.

The transceiver 401 may be configured to receive first type of data and/or first type of control signaling from the first type of transceiving node, and transmit second type of data and/or second type of control signaling to the first type of transceiving node in a determined time unit.

The controller 402 may be an application specific integrated circuit or at least one processor. The controller 402 may be configured to control the overall operation of the second type of transceiving node and control the second type of transceiving node to implement the methods proposed in the embodiments of the disclosure. For example, the controller 402 may be configured to determine the second type of data and/or the second type of control signaling and a time unit for transmitting the second type of data and/or the second type of control signaling based on the first type of data and/or the first type of control signaling, and control the transceiver 401 to transmit the second type of data and/or the second type of control signaling to the first type of transceiving node in the determined time unit.

In some implementations, the controller 402 may be configured to perform one or more of methods of various embodiments described below. For example, the controller 402 may be configured to perform one or more of operations in a method 500 to be described later in connection with FIG. 5, and/or a method 700 described in connection with FIG. 7, and/or a method 1100 described in connection with FIG. 11.

In some implementations, the first type of data may be data transmitted by the first type of transceiving node to the second type of transceiving node. In the following examples, downlink data carried by a Physical Downlink Shared Channel (PDSCH) is taken as an example (but not limited thereto) to illustrate the first type of data.

In some implementations, the second type of data may be data transmitted by the second type of transceiving node to the first type of transceiving node. In the following examples, uplink data carried by a Physical Uplink Shared Channel (PUSCH) is taken as an example to illustrate the second type of data, but not limited thereto.

In some implementations, the first type of control signaling may be control signaling transmitted by the first type of transceiving node to the second type of transceiving node. In the following examples, downlink control signaling is taken as an example (but not limited thereto) to illustrate the first type of control signaling. The downlink control signaling may be downlink control information (DCI) carried by a Physical Downlink Control Channel (PDCCH) and/or control signaling carried by a Physical Downlink Shared Channel (PDSCH).

In some implementations, the second type of control signaling may be control signaling transmitted by the second type of transceiving node to the first type of transceiving node. In the following examples, uplink control signaling is taken as an example to illustrate the second type of control signaling, but is not limited thereto. The uplink control signaling may be Uplink Control Information (UCI) carried by a Physical Uplink Control Channel (PUCCH) and/or control signaling carried by a Physical Uplink Shared Channel (PUSCH). A type of UCI may include one or more of: HARQ-ACK information, Scheduling Request (SR), Link Recovery Request (LRR), Chanel State Information (CSI) or Configured Grant (CG) UCI.

In some implementations, a PUCCH carrying SR may be a PUCCH carrying positive SR. The PUCCH carrying SR may be a PUCCH carrying negative SR. The PUCCH carrying SR may be a PUCCH carrying positive SR and/or negative SR.

In some implementations, the first type of time unit is a time unit in which the first type of transceiving node transmits the first type of data and/or the first type of control signaling. In the following examples, a downlink time unit is taken as an example (but not limited thereto) to illustrate the first type of time unit.

In some implementations, the second type of time unit is a time unit in which the second type of transceiving node transmits the second type of data and/or the second type of control signaling. In the following examples, an uplink time unit is taken as an example to illustrate the second type of time unit, but is not limited thereto.

In some implementations, the first type of time unit and the second type of time unit may be one or more slots, one or more sub-slots, one or more Orthogonal Frequency Division Multiplexing (OFDM) symbols, or one or more sub-frames.

In some implementations, for example, the PUSCH may include a dynamically scheduled PUSCH and/or a semi-statically configured PUSCH. In some examples, when a parameter or configuration information is configured for the PUSCH, the parameter or configuration information may be configured for the dynamically scheduled PUSCH and the semi-statically configured PUSCH uniformly. In some examples, when a parameter or configuration information is configured for the PUSCH, the parameter or configuration information may be configured for the dynamically scheduled PUSCH and the semi-statically configured PUSCH separately. The parameters or configuration information may be used for different purposes depending on specific requirements, for example. For example, the parameter or configuration information may be used to indicate whether to transmit the PUCCH and the PUSCH simultaneously. For another example, the parameter or configuration information may be used to indicate whether the PUSCH may be multiplexed with the PUCCH. In various embodiments of the disclosure, when it is needed to configure the PUSCH including the dynamically scheduled PUSCH and the semi-statically configured PUSCH, the above-described example manners may be adopted.

Depending on the network type, the term "base station" or "BS" can refer to any component (or a set of components) configured to provide wireless access to a network, such as a Transmission Point (TP), a Transmission and Reception Point (TRP), an evolved base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio (NR) interface/access, Long Term Evolution (LTE), LTE advanced (LTE-A), High Speed Packet Access (HSPA), Wi-Fi 802.11a/b/g/n/ac, etc. For the sake of convenience, the terms "BS" and "gNB" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," "user device," or simply "terminal." For the sake of convenience, the terms "user equipment" and "UE" are used in this patent document to refer to remote wireless equipment that wirelessly accesses a BS, no matter the UE is a mobile device (such as a mobile telephone or smartphone) or a fixed device (such as a desktop computer or vending machine) that is generally considered.

In describing a wireless communication system and in the disclosure described below, higher layer signaling or higher layer signals are signal transferring methods for transferring information from a base station to a terminal over a downlink data channel of a physical layer or from a terminal to a base station over an uplink data channel of a physical layer, and examples of the signal transferring methods may include signal transferring methods for transferring information via Radio Resource Control (RRC) signaling, Packet Data Convergence Protocol (PDCP) signaling, or a Medium Access Control (MAC) Control Element (MAC CE).

FIG. 5 illustrates a flowchart of a method performed by a UE according to some embodiments of the disclosure. For convenience of description, a one-cycle process including operation S510 to operation S530 shown in FIG. 5 is defined as a downlink-uplink transmission process.

Referring to FIG. 5, in operation S510, the UE receives downlink data and/or downlink control signaling from a base station.

In operation S520, the UE determines uplink data and/or uplink control signaling and an uplink time unit and/or an uplink physical channel used to transmit the uplink data and/or the uplink control signaling based on the downlink data and/or downlink control signaling.

In operation S530, the UE transmits the uplink data and/or the uplink control signaling to the base station in the determined uplink time unit.

In some implementations, the UE may perform multiple downlink-uplink transmission processes, and each of the multiple downlink-uplink transmission processes includes operations S510, S520, and S530. Different downlink-uplink transmission processes may be independent or interrelated.

In some implementations, the downlink control signaling may include DCI carried by a PDCCH and/or control signaling carried by a PDSCH. For example, the DCI may be used to schedule transmission of a PUSCH or reception of the PDSCH. Some examples of uplink transmission timing will be described below with reference to FIGS. 6A to 6C.

Figure 6A:
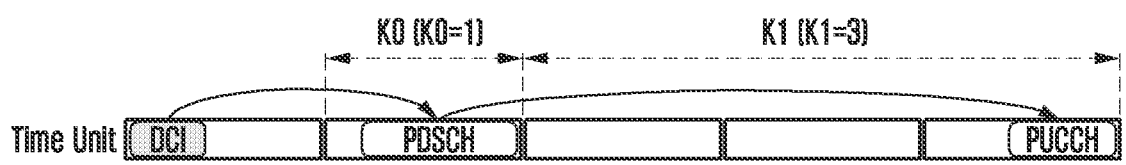
FIGS. 6A, 6B, 6C, and 6D illustrate some examples of uplink transmission timing according to various embodiments of the disclosure.

In an example, the UE receives the DCI and receives the PDSCH based on time domain resources indicated by the DCI. For example, a parameter K0 may be used to represent a time interval between the PDSCH scheduled by the DCI and the PDCCH carrying the DCI, and K0 may be in units of slots. For example, FIG. 6A gives an example in which K0=1. In the example illustrated in FIG. 6A, the time interval from the PDSCH scheduled by the DCI to the PDCCH carrying the DCI is one slot.

Figure 6B:
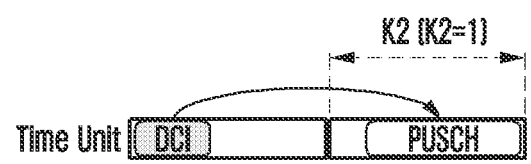

In another example, the UE receives the DCI and transmits the PUSCH based on time domain resources indicated by the DCI. For example, a parameter K2 may be used to represent a time interval between the PUSCH scheduled by the DCI and the PDCCH carrying the DCI, and K2 may be in units of slots. For example, FIG. 6B gives an example in which K2=1. In the example illustrated in FIG. 6B, the time interval between the PUSCH scheduled by the DCI and the PDCCH carrying the DCI is one slot.

In yet another example, the UE receives the PDSCH, and may transmit HARQ-ACK information for the PDSCH in a PUCCH in the uplink time unit. For example, a parameter K1 may be used to represent a time interval between the PUCCH for transmitting the HARQ-ACK information for the PDSCH and the PDSCH, and K1 may be in units of uplink time units, such as slots or sub-slots. In a case where K1 is in units of slots, the time interval is a value of a slot offset between the PUCCH for feeding back the HARQ-ACK information for the PDSCH and the PDSCH. For example, FIG. 6A gives an example in which K1=3. In the example illustrated in FIG. 6A, the time interval between the PUCCH for transmitting the HARQ-ACK information for the PDSCH and the PDSCH is 3 slots.

Figure 6C:
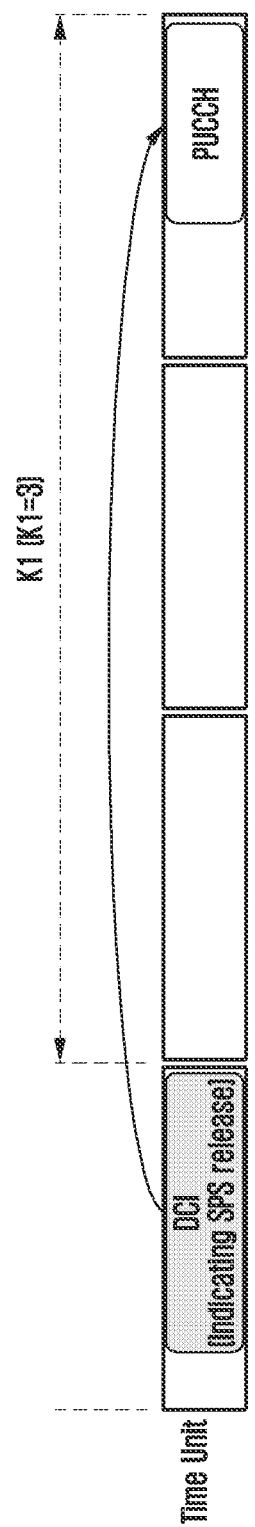

In yet another example, the UE receives the DCI (e.g., DCI indicating SPS (Semi-Persistent Scheduling) release), and may transmit HARQ-ACK information for the DCI in the PUCCH in the uplink time unit. For example, the parameter K1 may be used to represent a time interval between the PUCCH for transmitting the HARQ-ACK information for the DCI and the DCI, and K1 may be in units of uplink time units, such as slots or sub-slots. For example, FIG. 6C gives an example in which K1=3. In the example of FIG. 6C, the time interval between the PUCCH for transmitting the HARQ-ACK information for the DCI and the DCI is 3 slots. For example, the parameter K1 may be used to represent a time interval between of a SPS PDSCH reception and the PUCCH feeding back HARQ-ACK thereof, where K1 is indicated in DCI activating the SPS PDSCH. In some implementations, in operation S520, the UE may report (or transmit) a UE capability to the base station. For example, the UE reports (or transmits) the UE capability to the base station by transmitting the PUSCH. In this case, the UE capability information is included in the PUSCH transmitted by the UE.

In some implementations, the base station may configure higher layer signaling for the UE based on a UE capability previously received from the UE (for example, in operation S510 in the previous downlink-uplink transmission processes). For example, the base station configures the higher layer signaling for the UE by transmitting the PDSCH. In this case, the higher layer signaling configured for the UE is included in the PDSCH transmitted by the base station. It should be noted that the higher layer signaling is higher layer signaling compared with physical layer signaling, and for example, the higher layer signaling may include RRC signaling and/or a MAC CE.

In some implementations, the UE may be configured with two levels of priorities for uplink transmission. For example, the two levels of priorities may include the first priority and the second priority which are different from each other. In an example, the first priority may be higher than the second priority. In another example, the first priority may be lower than the second priority. However, the embodiments of the disclosure are not limited to this, and for example, the UE may be configured with more than two levels of priorities. For the sake of convenience, in the embodiments of the disclosure, description will be made considering that the first priority is higher than the second priority. It should be noted that all embodiments of the disclosure are applicable to situations where the first priority may be higher than the second priority; all embodiments of the disclosure are applicable to situations where the first priority may be lower than the second priority; and all embodiments of the disclosure are applicable to situations where the first priority may be equal to the second priority.

In an example, the two levels of priorities may be indicated by priority numbers or priority indexes (e.g., priority index 1 and priority index 0). For example, a larger priority index may correspond to a higher priority, that is, a priority corresponding to priority index 1 may be higher than a priority corresponding to priority index 0. In this case, a larger priority index (e.g., priority index 1) may be a higher priority (e.g., the first priority), and a smaller priority index (e.g., priority index 0) may be a lower priority (e.g., the second priority). However, the embodiments of the disclosure are not limited to this, for example, other priority indexes or indicators may be used to indicate the two levels of priorities. For the sake of convenience, in the embodiments of the disclosure, description is made considering that a priority corresponding to a larger priority index (e.g., priority index 1) is higher than a priority corresponding to a smaller priority index (e.g., priority index 0). In addition, in the embodiments of the disclosure, priority index 1 may be used interchangeably with the first priority, the larger priority index or the higher priority, and priority index 0 may be used interchangeably with the second priority, the smaller priority index or the lower priority.

In some implementations, the two levels of priorities configured for the UE may be two physical layer priorities. For example, one of the two levels of priorities (the first priority (e.g., priority index 1)) or the second priority (e.g., priority index 0)) may be provided for PUSCH or PUCCH. Specifically, a PUSCH or PUCCH transmission (including a repetition transmission if there is the repetition transmission) may be of (for example, correspond to) priority index 0 or a larger priority index (e.g., priority index 1).

In some implementations, the first priority or higher priority (e.g., the larger priority index (e.g., priority index 1)) may correspond to the first service (e.g., a URLLC service), and the second priority or lower priority (e.g., the smaller priority index (e.g., priority index 0)) may correspond to the second service (e.g., an eMBB service).

In an example, for configured grant PUSCH transmission, the UE may determine the priority index based on a priority parameter (e.g., the parameter of priority in 3GPP) (if configured). For PUCCH transmission with HARQ-ACK information corresponding to SPS PDSCH reception or SPS PDSCH release, the UE may determine the priority index of the PUCCH transmission from a HARQ-ACK codebook priority parameter and/or a HARQ-ACK codebook index parameter (e.g., the parameter of HARQ-CodebookID in 3GPP) (if configured).

In an example, if no priority is configured or indicated for a certain PUSCH or PUCCH transmission of the UE, the priority index of the PUSCH or PUCCH transmission may be 0.

In an example, if the UE monitors a PDCCH to detect DCI format 0_1 and DCI format 1_1 or to detect DCI format 0_2 and DCI format 1_2 in an active DL BWP (Bandwidth Part), the priority index may be provided by a priority indicator field. If the UE indicates that it has the capability to monitor the PDCCH in the active DL BWP to detect DCI format 0_1 and DCI format 1_1 and to detect DCI format 0_2 and DCI format 1_2, DCI format 0_1 or DCI format 0_2 may schedule PUSCH transmission with any priority, and DCI format 1_1 or DCI format 1_2 may schedule PDSCH reception and trigger PUCCH transmission for corresponding HARQ-ACK information with any priority.

In an example, the UE may be configured with a PUCCH configuration list parameter (e.g., the parameter of PUCCH-ConfigurationList in 3GPP), which may include two PUCCH configuration parameters (e.g., the parameter of PUCCH-Config in 3GPP), including the first PUCCH configuration parameter and the second PUCCH configuration parameter. For example, the first PUCCH configuration parameter may correspond to the second priority (e.g., the smaller priority index (e.g., priority index 0)), that is, the priority of the first PUCCH configuration parameter may be the second priority (e.g., the smaller priority index (e.g., priority index 0)). Also, the second PUCCH configuration parameter may correspond to the first priority (e.g., the larger priority index (e.g., priority index 1)), and the priority of the second PUCCH configuration parameter may be the first priority (e.g., the larger priority index (e.g., priority index 1)).

For example, a sub-slot length parameter (e.g., the parameter of subslotLengthForPUCCH in 3GPP) of each PUCCH configuration parameter of the first PUCCH configuration parameter and the second PUCCH configuration parameter may be 7 OFDM symbols or 6 OFDM symbols or 2 OFDM symbols. Sub-slot configuration length parameters in different PUCCH configuration parameters may be configured separately. If no sub-slot length parameter is configured in a PUCCH configuration parameter, a scheduling time unit of this PUCCH configuration parameter is one slot by default. If a sub-slot length parameter is configured in the PUCCH configuration parameter, the scheduling time unit of this PUCCH configuration parameter is a number of OFDM symbols of which the number is the configured sub-slot configuration length (e.g., subslotLengthForPUCCH OFDM symbols).

In some implementations, the UE may be configured with a PDSCH HARQ-ACK codebook list parameter (e.g., the parameter of pdsch-HARQ-ACK-CodebookList in 3GPP). For example, the PDSCH HARQ-ACK codebook list parameter may include two PDSCH HARQ-ACK codebook configuration parameters (e.g., the parameter of pdsch-HARQ-ACK-Codebook in 3GPP), including the first PDSCH HARQ-ACK codebook configuration parameter and the second PDSCH HARQ-ACK codebook configuration parameter. For example, the first PDSCH HARQ-ACK codebook configuration parameter corresponds to the first HARQ-ACK codebook configuration, and the first HARQ-ACK codebook is associated with a PUCCH with the smaller priority index (e.g., priority index 0); the second PDSCH HARQ-ACK codebook configuration parameter corresponds to the second HARQ-ACK codebook configuration, and the second HARQ-ACK codebook is associated with a PUCCH with the larger priority index (e.g., priority index 1). In this case, the priority of the first HARQ-ACK codebook may be the second priority (e.g., the smaller priority index (e.g., priority index 0)), and the priority of the second HARQ-ACK codebook may be the first priority (e.g., the larger priority index (e.g., priority index 1)). A PDSCH HARQ-ACK codebook configuration parameter (e.g., the parameter of pdsch-HARQ-ACK-Codebook) is used to configure the type of the HARQ-ACK codebook, and for example, the PDSCH HARQ-ACK codebook configuration parameter may be semi-static (e.g., semiStatic); for example, the PDSCH HARQ-ACK codebook configuration parameter may be dynamic (e.g., dynamic); and for example, the PDSCH HARQ-ACK codebook configuration parameter may be enhanced dynamic (for example, the parameter of pdsch-HARQ-ACK-Codebook-r16 in 3GPP is enhancedDynamic).

When an uplink physical channel of the UE is configured with multiple priorities, how to improve the possibility and reliability of physical channel transmission with the lower priority on the premise of ensuring the delay and reliability of physical channel transmission with the higher priority is a problem that needs to be solved. For example, if PUCCHs carrying UCIs with different priorities overlap in time domain, multiple PUCCHs may be multiplexed in one PUCCH for transmission; or, the multiple PUCCHs are prioritized, and for example, a PUCCH with the higher priority is transmitted and a PUCCH with the lower priority is not transmitted. Or, multiple PUCCHs with the higher priority are multiplexed in one PUCCH for transmission while one or more PUCCHs with the lower priority are not transmitted. In different scenarios, the UE may adopt different manners.

The method for multiplexing and/or prioritizing UCIs with different priorities in the embodiments of the disclosure may be applicable to UCI(s) for a unicast PDSCH and/or UCI(s) for a groupcast (or multicast)/broadcast PDSCH. For example, UCI(s) with the first priority and UCI(s) with the second priority may be HARQ-ACK, SR, or CSI of the unicast PDSCH. For example, UCI(s) with the first priority and UCI(s) with the second priority may be HARQ-ACK for the groupcast/broadcast PDSCH. For example, UCI(s) with the first priority may be HARQ-ACK, SR, or CSI for the unicast PDSCH, and UCI(s) with the second priority may be HARQ-ACK for the groupcast/broadcast PDSCH.

In the embodiments of the disclosure, unicast may refer to a manner in which a network communicates with one UE, and groupcast/broadcast may refer to a manner in which a network communicates with multiple UEs. For example, the unicast PDSCH may be one PDSCH received by one UE, and the scrambling of the PDSCH may be based on a Radio Network Temporary Identifier (RNTI) specific to the UE, e.g., C-RNTI. The unicast PDSCH may also be a unicast SPS PDSCH. The groupcast/broadcast PDSCH may be one PDSCH received by more than one UE simultaneously, and the scrambling of the groupcast/broadcast PDSCH may be based on a UE-group common RNTI. For example, the UE-group common RNTI for scrambling the groupcast/broadcast PDSCH may include an RNTI (referred to as G-RNTI or first RNTI in the embodiments of the disclosure) for scrambling of a dynamically scheduled groupcast/broadcast transmission (e.g., PDSCH) or an RNTI (referred to as G-CS-RNTI or second RNTI in the embodiments of the disclosure) for scrambling of a groupcast/broadcast SPS transmission (e.g., SPS PDSCH). The G-CS-RNTI and the G-RNTI may be different RNTIs or same RNTI. UCI(s) of the unicast PDSCH may include HARQ-ACK information, SR, or CSI of the unicast PDSCH. UCI(s) of the groupcast (or multicast)/broadcast PDSCH may include HARQ-ACK information for the groupcast/broadcast PDSCH. In the embodiments of the disclosure, "groupcast/broadcast" may refer to at least one of multicast or broadcast. In addition, it should be noted that, although for convenience of description, in the embodiments of the disclosure, the RNTI for dynamically scheduled groupcast/broadcast transmission (e.g., PDSCH) scrambling is referred to as the G-RNTI or the first RNTI, and the RNTI for groupcast/broadcast SPS transmission (e.g., SPS PDSCH) scrambling is referred to as the G-CS-RNTI or the second RNTI. However, this manner of naming RNTI is only an example, and any suitable manner may be adopted to name each RNTI.

In some implementations, the HARQ-ACK codebook may include HARQ-ACK information for one or more PDSCHs and/or DCI. If the HARQ-ACK information for one or more PDSCHs and/or DCI is transmitted in a same uplink time unit, the UE may generate the HARQ-ACK codebook based on a predefined rule. For example, the UE may generate the HARQ-ACK codebook based on the pseudo-code specified by the protocols. In an example, if the UE receives a DCI format that indicates SPS deactivation, the UE transmits HARQ-ACK information for the DCI format. In another example, if the UE receives a DCI format that indicates secondary cell dormancy, the UE transmits the HARQ-ACK information for the DCI format. In yet another example, if the UE receives a DCI format that indicates that HARQ-ACK information of all HARQ-ACK processes (for example, a one-shot HARQ-ACK codebook, and for another example, a Type-3 HARQ-ACK codebook in 3GPP (e.g., TS38.213)) is transmitted, the UE transmits the HARQ-ACK information of all HARQ-ACK processes. In yet another example, if the UE receives a DCI format that schedules the PDSCH, the UE transmits HARQ-ACK information for the PDSCH. In yet another example, the UE receives a SPS PDSCH, and the UE transmits HARQ-ACK information for the PDSCH. In yet another example, if the UE is configured by higher layer signaling to receive a SPS PDSCH, the UE transmits HARQ-ACK information for the PDSCH. If the UE is configured by higher layer signaling to receive a SPS PDSCH, the SPS PDSCH may be cancelled by other signaling. In yet another example, if at least one uplink symbol (e.g., OFDM symbol) in a semi-static frame structure configured by higher layer signaling of the UE overlaps with a symbol of a SPS PDSCH, the UE does not receive the SPS PDSCH. In yet another example, if the UE is configured by higher layer signaling to receive a SPS PDSCH according to a predefined rule, the UE transmits HARQ-ACK information for the PDSCH.

In some implementations, if the HARQ-ACK information transmitted in the same uplink time unit does not include HARQ-ACK information for any DCI format, nor does it include HARQ-ACK information for a dynamically scheduled PDSCH (e.g., a PDSCH scheduled by a DCI format) and/or DCI, or the HARQ-ACK information transmitted in the same uplink time unit only includes HARQ-ACK information for one or more SPS PDSCHs, the UE may generate HARQ-ACK information according to a rule for generating a SPS PDSCH HARQ-ACK codebook.

In some implementations, if the HARQ-ACK information transmitted in the same uplink time unit includes HARQ-ACK information for any DCI format, and/or HARQ-ACK information for a dynamically scheduled PDSCH (e.g., a PDSCH scheduled by one DCI format) and/or DCI, the UE may generate HARQ-ACK information according to a rule for generating a HARQ-ACK codebook of a dynamically scheduled PDSCH and/or DCI. For example, the UE may determine to generate a semi-static HARQ-ACK codebook (e.g., Type-1 HARQ-ACK codebook in 3GPP (e.g., TS 38.213)) or a dynamic HARQ-ACK codebook (e.g., Type-2 HARQ-ACK codebook in 3GPP (e.g., TS 38.213)) or an enhanced dynamic HARQ-ACK codebook (e.g., Type-2 HARQ-ACK codebook based on grouping and HARQ-ACK retransmission in 3GPP (e.g., TS 38.213)) according to a PDSCH HARQ-ACK codebook configuration parameter (e.g., the parameter of pdsch-HARQ-ACK-Codebook in 3GPP).

In some implementations, the dynamic HARQ-ACK codebook and/or the enhanced dynamic HARQ-ACK codebook may determine a size and an order of the HARQ-ACK codebook according to an assignment indicator. For example, the assignment indicator may be a Downlink Assignment Indicator (DAI). In the following embodiments, the assignment indicator as the DAI is taken as an example for illustration. However, the embodiments of the disclosure are not limited thereto, and any other suitable assignment indicator may be adopted.

In some implementations, a DAI field includes at least one of the first type of DAI and the second type of DAI.

In some examples, the first type of DAI may be a Counter-DAI (C-DAI). The first type of DAI may indicate a cumulative count of at least one of a PDSCH scheduled in a current downlink time unit, a DCI indicating SPS PDSCH release, or a DCI indicating secondary cell dormancy. The order of each bit in the HARQ-ACK codebook corresponding to at least one of PDSCH reception(s), DCI(s) indicating SPS PDSCH release, or DCI(s) indicating secondary cell dormancy may be determined by the time when the first type of DAI is received and the first type of DAI information. The first type of DAI may be included in a downlink DCI format.

In some examples, the second type of DAI may be a Total-DAI (T-DAI). The second type of DAI may indicate a total number of at least one of all PDSCH receptions corresponding to an uplink time unit, DCI indicating SPS PDSCH release, or DCI indicating secondary cell dormancy. The second type of DAI may be included in the downlink DCI format and/or an uplink DCI format. The second type of DAI included in the uplink DCI format is also referred to as UL DAI.

In the following examples, the first type of DAI as the C-DAI and the second type of DAI as the T-DAI are taken as an example for illustration, but the examples are not limited thereto.

Tables 1 and 2 show a correspondence between the DAI field and $V_{T\text{-}DAI,m}$ or $V_{C\text{-}DAI,c,m}$. Numbers of bits of the C-DAI and T-DAI are limited. For example, in a case where the C-DAI or T-DAI is represented with 2 bits, the value of the C-DAI or T-DAI in the DCI may be determined by equations in Table 1. $V_{T\text{-}DAI,m}$ is the value of the T-DAI in DCI received in a PDCCH monitoring occasion m, and $V_{C\text{-}DAI,c,m}$ is the value of the C-DAI in DCI for a serving cell c received in the PDCCH monitoring occasion m. Both $V_{T\text{-}DAI,m}$ and $V_{C\text{-}DAI,c,m}$ are related to a number of bits of the DAI field in the DCI. MSB is the Most Significant Bit and LSB is the Least Significant Bit.

TABLE 1

| MSB, LSB of DAI Field | $V_{T\text{-}DAI,m}$ or $V_{C\text{-}DAI,c,m}$ | Y |
|---|---|---|
| 0, 0 | 1 | (Y − 1)mod 4 + 1 = 1 |
| 0, 1 | 2 | (Y − 1)mod 4 + 1 = 2 |

TABLE 1-continued

| MSB, LSB of DAI Field | $V_{T\text{-}DAI,m}$ or $V_{C\text{-}DAI,c,m}$ | Y |
|---|---|---|
| 1, 0 | 3 | (Y − 1)mod 4 + 1 = 3 |
| 1, 1 | 4 | (Y − 1)mod 4 + 1 = 4 |

For example, when the C-DAI or T-DAI is 1, 5 or 9, as shown in Table 1, all of the DAI field are indicated with "00", and the value of $V_{T\text{-}DAI,m}$ or $V_{C\text{-}DAI,c,m}$ is represented as "1" by the equation in Table 1. Y may represent the value of the DAI corresponding to the number of DCIs actually transmitted by the base station (the value of the DAI before conversion by the equation in the table).

For example, in a case where the C-DAI or T-DAI in the DCI is 1 bit, values greater than 2 may be represented by equations in Table 2.

TABLE 2

| DAI field | $V_{T\text{-}DAI,m}$ or $V_{C\text{-}DAI,c,m}$ | Y |
|---|---|---|
| 0 | 1 | (Y − 1)mod 2 + 1 = 1 |
| 1 | 2 | (Y − 1)mod 2 + 1 = 2 |

The following example scenario is considered; for example, there may be multiple DCIs for the UE, where each of the multiple DCIs schedules a same PDSCH (or schedules a same PUSCH). For convenience of description, the scenario is referred to as the first type of scenario; for example, the first type of scenario may mean that "multiple DCIs schedule a same PDSCH (or schedule a same PUSCH)". In an example, there may be multiple DCIs (e.g., DCI #1 and DCI #2) transmitted from multiple TRPs (e.g., TRP #1 and TRP #2) to the UE, where the multiple DCIs (e.g., DCI #1 and DCI #2) all schedule a same PDSCH (e.g., PDSCH #1). In another example, there may be multiple DCIs (e.g., DCI # and DCI #2) transmitted from multiple serving cells (e.g., serving cell #1 and serving cell #2) to the UE, where the multiple DCIs (e.g., DCI #1 and DCI #2) all schedule a same PDSCH (e.g., PDSCH #1). For example, the multiple DCIs (e.g., DCI #1 and DCI #2) may be in different downlink time units. For another example, content of the multiple DCIs (e.g., DCI #1 and DCI #2) may be different. In a case where there are multiple DCIs for the UE, each of which schedules a same PDSCH (or schedules a same PUSCH), it is necessary to clarify behaviors of the UE.

It should be noted that, although in some of the following implementations, it is only described for the multiple DCIs scheduling the same PDSCH, however, those skilled in the art should understand that the method described for the multiple DCIs scheduling the same PDSCH may be applied to the method for the multiple DCIs scheduling the same PUSCH after appropriate modifications.

In some implementations, it may be specified, for example, by protocols that when there are multiple DCIs for a terminal, each of which schedules a same PDSCH or PUSCH, at least one of uplink transmission related to an uplink signal or downlink transmission related to downlink signal(s) is performed based on only one of the multiple DCIs, regardless of remaining DCIs of the multiple DCIs. For example, a scheduled PDSCH or PUSCH may be determined based on only one of the DCIs, regardless of remaining DCIs of the multiple DCIs. For example, HARQ information for the multiple DCIs may be determined based on only one of the DCIs. That is, when the feedback of the HARQ information of the multiple DCIs is performed, it is possible to feedback only HARQ information for the one of the DCIs, regardless of remaining DCIs of the multiple DCIs.

In some implementations, it may be specified, for example, by protocols that the UE only receives one DCI (e.g., a DCI received earlier) of the multiple DCIs, or the UE only retains one of the multiple DCIs and discards other DCIs, or the UE considers the multiple DCIs to be multiple transmissions of a same DCI, or the UE considers the multiple DCIs to be a same DCI. For example, it may be specified by protocols that if the UE receives two DCIs, one DCI of which schedules the same PDSCH and/or PUSCH as the other DCI, the UE discards the previous DCI (e.g., the DCI received earlier) or the latter DCI (e.g., the DCI received later) of the two DCIs. In the embodiments of the disclosure, "retaining a DCI" may mean determining the scheduled PDSCH or PUSCH based on the DCI or feeding back HARQ information for the DCI, and "discarding a DCI" may mean determining the scheduled PDSCH or PUSCH without considering the DCI or not feeding back HARQ information for the DCI.

In some implementations, it may be specified, for example, by protocols that if the UE receives two DCIs, where SPS PDSCH release (for example, the SPS PDSCH release may be one or more SPS PDSCHs release) indicated by each of the two DCIs is the same, the UE discards the previous DCI (e.g., the DCI received earlier) or the latter DCI (e.g., the DCI received later) of the two DCIs. For example, if the two DCIs both indicate same SPS PDSCH release, the UE discards the previous DCI (e.g., the DCI received earlier) or the latter DCI (e.g., the DCI received later) of the two DCIs.

In some implementations, it may be specified, for example, by protocols that if the UE receives two DCIs, where a PUCCH indicated by each of the two DCIs in which a one shot HARQ-ACK codebook is transmitted is the same, the UE discards the previous DCI (e.g., the DCI received earlier) or the latter DCI (e.g., the DCI received later) of the two DCIs. For example, if one DCI of the two DCIs indicates that the one shot HARQ-ACK codebook is transmitted on the PUCCH, and the other DCI of the two DCIs indicates that the one shot HARQ-ACK codebook is also transmitted on the PUCCH, the UE discards the previous DCI (e.g., the DCI received earlier) or the latter DCI (e.g., the DCI received later) of the two DCIs.

In some implementations, it may be specified, for example, by protocols that if the UE receives two DCIs, where a PDSCH and/or PUSCH scheduled by each of the two DCIs is the same, the UE discards previous DCI (e.g., DCI received earlier) or latter DCI (e.g., DCI received later) of the two DCIs. For example, if one DCI of the two DCIs schedules a PDSCH and/or PUSCH and the other DCI of the two DCIs schedules the same PDSCH and/or PUSCH, the UE discards the previous DCI (e.g., the DCI received earlier) or the latter DCI (e.g., the DCI received later) of the two DCIs.

In some implementations, it may be specified, for example, by protocols that if the UE receives multiple DCIs, each of which schedules a same PDSCH, the UE receives the PDSCH and the UE feeds back HARQ-ACK to the PDSCH.

In some implementations, it may be specified, for example, by protocols that if the UE receives two DCIs, and one DCI schedules the same PDSCH as the other DCI and indicates transmission of HARQ-ACK for this PDSCH in a same PUCCH, the UE discards previous DCI (e.g., DCI received earlier) or latter DCI (e.g., DCI received later) of the two DCIs.

In some implementations, a same PDSCH (or PUSCH) may be defined as a PDSCHs (or PUSCHs) with same time-frequency domain resources indicated in DCI. For example, if time-frequency domain resources for a PDSCH indicated by each of multiple DCIs are the same, it may be considered that each of the multiple DCIs is used to schedule a same PDSCH. For example, in a case where two DCIs schedule a same PDSCH, if time-frequency domain resources for a PDSCH indicated by one DCI of the two DCIs is the same as time-frequency domain resources for a PDSCH indicated by the other DCI of the two DCIs, it may be considered that the two DCIs are used to schedule the same PDSCH. In the embodiments of the disclosure, the time-frequency domain resources may include one or more of symbols, Resource Elements (REs), Resource Blocks (RBs), a Resource Element Group (REG) and a Resource Block Group (RBG).

In some implementations, scheduling a same PDSCH by multiple DCIs may mean that one or more of time-frequency domain resources, MCS (Modulation and Coding Scheme), NDI (New Data Indicator), RV (Redundancy Version), K1, and PRI (PUCCH Resource Indicator) indicated by each of the multiple DCIs are the same as those indicated by other DCIs of the multiple DCIs. For example, in a case where two DCIs schedule a same PDSCH, if one or more of time-frequency domain resources, MCS, NDI, RV, K1, and PRI for a PDSCH indicated by one DCI of the two DCIs are the same as those indicated by the other DCI of the two DCIs, it may be considered that the two DCIs are used to schedule the same PDSCH. For example, in a case where two DCIs schedule a same PDSCH, if all of the time-frequency domain resources, MCS, NDI, RV, K1, and PRI for the PDSCH indicated by one DCI of the two DCIs are the same as those indicated by the other DCI of the two DCIs, it may be considered that the two DCIs are used to schedule the same PDSCH.

In some implementations, scheduling a same PDSCH by multiple DCIs may mean that time-frequency domain resources for a PDSCH and HARQ information indicated by each of the multiple DCIs are the same as those indicated by other DCIs of the multiple DCIs. For example, in a case where two DCIs schedule a same PDSCH, if time-frequency domain resources for a PDSCH and HARQ information indicated by one DCI of the two DCIs are the same as time-frequency domain resources for a PDSCH and HARQ information indicated by the other DCI of the two DCIs, it may be considered that the two DCIs are used to schedule the same PDSCH.

In some implementations, scheduling a same PUSCH by multiple DCIs may mean that time-frequency domain resources for a PUSCH and HARQ information indicated by each of the multiple DCIs are the same as those indicated by other DCIs of the multiple DCIs. For example, in a case where two DCIs schedule a same PUSCH, if time-frequency domain resources for a PUSCH and HARQ information indicated by one DCI of the two DCIs are the same as time-frequency domain resources for a PUSCH and HARQ information indicated by the other DCI of the two DCIs, it may be considered that the two DCIs are used to schedule the same PUSCH.

In some implementations, scheduling a same PDSCH by multiple DCIs may mean that time-frequency domain resources for a PDSCH, MCS, NDI, and RV indicated by each of the multiple DCIs are the same as those indicated by other DCIs of the multiple DCIs. For example, in a case where two DCIs schedule a same PUSCH, if time-frequency domain resources for a PDSCH, MCS, NDI, and RV indicated by one DCI of the two DCIs are the same as time-frequency domain resources for a PDSCH, MCS, NDI, and RV indicated by the other DCI of the two DCIs, it may be considered that the two DCIs are used to schedule the same PDSCH.

In some implementations, scheduling a same PUSCH by multiple DCIs may mean that time-frequency domain resources for a PUSCH, MCS, NDI, and RV indicated by each of the multiple DCIs are the same as those indicated by other DCIs of the multiple DCIs. For example, when two DCIs schedule a same PUSCH, if time-frequency domain resources for a PUSCH, MCS, NDI, and RV indicated by one DCI of the two DCIs are the same as time-frequency domain resources for a PUSCH, MCS, NDI, and RV indicated by the other DCI of the two DCIs, it may be considered that the two DCIs are used to schedule the same PDSCH.

The embodiments of the behaviors of the UE in the case of the first type of scenario (that is, there are multiple DCIs (e.g., different DCIs) for the UE that schedule same data or indicate same control information) are described above. These embodiments specify the behaviors of the UE when the UE receives the multiple DCIs (e.g., different DCI's) that schedule the same data or indicate the same control information, thereby reducing the complexity of UE implementation and improving the reliability of network transmission.

The following example scenario is considered; for example, there may be multiple repetition transmissions of a DC for the UE (or multiple repetition transmissions of a PDCCH), that is, multiple repetitions of a DCI transmission for the UE. That is, there may be multiple DCIs for the UE, where the multiple DCIs correspond to the multiple repetitions of the DC transmission and the content of each of the multiple DCIs is the same. For example, the DCI may be repeatedly transmitted multiple times in time domain. Since at least one of K0, K1, or K2 (the embodiments of which have been described above) may be indicated in a DCI, it is necessary to clarify a time interval indicated by at least one of K0, K1, and K2 when the DCI is repeatedly transmitted in time domain. For convenience of description, the scenario is referred to as the second type of scenario, for example, the second type of scenario may mean that "there are multiple repetitions of a DCI transmission for a UE". In this case, it may be understood that each of the multiple repetitions of the DCI transmission schedules a same PDSCH (or PUSCH).

It should be noted that in the following description, the terms "multiple repetitions of a DCI transmission" and "multiple repetitions of a PDCCH transmission" may be used interchangeably, for example, both of the two terms may be used to indicate multiple repetition transmissions of a DCI or a PDCCH carrying the DCI.

In addition, for convenience of description, the following definitions are made. For example, for Np repetitions of a DCI transmission, where Np is an integer equal to or greater than 2, the DCI transmitted for the first time corresponds to the first repetition of the DCI transmission, the DCI transmitted for the second time corresponds to the second repetition of the DCI transmission, and so on, the DC transmitted for the Np time corresponds to the Np-th repetition of the DCI transmission, which is also referred to as the last repetition of the DCI transmission.

In some implementations, it may be specified, for example, by protocols that a condition needs to be satisfied when the multiple repetitions of the DCI transmission schedule a PDSCH, where the condition is that each of the multiple repetitions of the DCI transmission is in a same downlink time unit (for example, a time unit for the PDCCH or a time unit for the PDSCH, such as a slot or a sub-slot). For example, it may be specified by protocols that it is necessary to satisfy that $$\left\lfloor n \cdot \frac{2^{\mu_{PDSCH}}}{2^{\mu_{PDCCH}}} \right\rfloor$$

for each of the multiple repetitions of the DCI transmission is the same, where n is an index of a slot where a corresponding repetition of the multiple repetitions of the DCI transmission is located, and $\mu_{PDSCH}$ and $\mu_{PDCCH}$ are configured subcarrier spacings for the PDSCH and the PDCCH respectively, and $\lfloor \ \rfloor$ represents a round down operation. When $$\left\lfloor n \cdot \frac{2^{\mu_{PDSCH}}}{2^{\mu_{PDCCH}}} \right\rfloor$$

or each of the multiple repetitions of the DCI transmission is the same, it may be considered that the multiple repetitions are in the same downlink time unit.

In some examples, the UE may report a capability to support that each of multiple repetitions of a DCI transmission is in a same downlink time unit (e.g., slot or sub-slot) when the multiple repetitions of the DCI transmission schedule a PDSCH. For example, the UE may report a capability to support that $$\left\lfloor n \cdot \frac{2^{\mu_{PDSCH}}}{2^{\mu_{PDCCH}}} \right\rfloor$$

for each of multiple repetitions of a DCI transmission is the same when the multiple repetitions of the DCI transmission schedule a same PDSCH, where n is an index of a slot where a corresponding repetition of the multiple repetitions of the DCI transmission is located, and $\mu_{PDSCH}$ and $\mu_{PDCCH}$ are configured subcarrier spacings for the PDSCH and the PDCCH respectively.

In some examples, the base station may configure (transmit) configuration information by higher layer signaling, which indicates whether it is satisfied that each of the multiple repetitions of the DC transmission is in a same downlink time unit (e.g., slot or sub-slot) when the multiple repetitions of the DCI transmission schedule the PDSCH. For example, the configuration information may indicate whether it is satisfied that $$\left\lfloor n \cdot \frac{2^{\mu_{PDSCH}}}{2^{\mu_{PDCCH}}} \right\rfloor$$

for each of the multiple repetitions of the DCI transmission is the same, where n is an index of a slot where a corresponding repetition of the multiple repetitions of the DCI transmission is located, and $\mu_{PDSCH}$ and $\mu_{PDCCH}$ are configured subcarrier spacings for the PDSCH and the PDCCH respectively. For example, the configuration information may be determined based on the capability reported by the terminal, where the capability supports that it is satisfied that each of multiple repetitions of a DCI transmission is in a same downlink time unit (e.g., slot or sub-slot) when the multiple repetitions of the DCI transmission schedule a same PDSCH.

In some implementations, when multiple repetitions of a DCI transmission schedule a PDSCH, if it is not satisfied that $$\left\lfloor n \cdot \frac{2^{\mu_{PDSCH}}}{2^{\mu_{PDCCH}}} \right\rfloor$$

for each of the multiple repetitions of the DCI transmission is the same, the UE may determine the PDSCH according to the first repetition or the last repetition of the repetitions of the DCI transmission, where n is an index of a slot where a corresponding repetition of the multiple repetitions of the DCI transmission is located, and $\mu_{PDSCH}$ and $\mu_{PDCCH}$ are configured subcarrier spacings for the PDSCH and the PDCCH respectively. In this case, for example, if the multiple repetitions of the DCI transmission schedule the PDSCH, the UE may determine the PDSCH according to the first repetition or the last repetition of the repetitions of the DCI transmission. It may be convenient for the UE to receive a corresponding PDSCH by clarifying the behaviors of the UE in the case that there are the multiple repetitions of the DCI transmission, and because this implementation does not need to modify the current protocols too much, it may be easily implemented. In addition, with respect to embodiments of determining the PDSCH based on at least one of K0, K1, or K2 indicated by the DCI, reference may be made to the previous description (for example, by referring to FIGS. 6A to 6C).

In some implementations, when multiple repetitions of a DCI transmission schedule a PDSCH, if it is satisfied that $$\left\lfloor n \cdot \frac{2^{\mu} PDSCH}{2^{\mu} PDCCH} \right\rfloor$$

for each of the multiple repetitions of the DCI transmission is the same, the UE may determine the PDSCH according to any one of the repetitions of the DCI transmission, where n is an index of a slot where a corresponding repetition of the multiple repetitions of the DCI transmission is located, and $\mu_{PDSCH}$ and $\mu_{PDCCH}$ are configured subcarrier spacings for the PDSCH and the PDCCH respectively.

In some implementations, it may be specified, for example, by protocols that a condition needs to be satisfied when multiple repetitions of a DCI transmission schedule a PUSCH, where the condition is that each of the multiple repetitions of the DCI transmission is in a same downlink time unit (such as slot or sub-slot). For example, it may be specified by protocols that it is necessary to satisfy that $$\left\lfloor n \cdot \frac{2^{\mu} PUSCH}{2^{\mu} PDCCH} \right\rfloor$$

for each of the multiple repetitions of the DCI transmission is the same, where n is an index of a slot where a corresponding repetition of the multiple repetitions of the DC transmission is located, and $\mu_{PUSCH}$ and $\mu_{PDCCH}$ are configured subcarrier spacings for the PUSCH and the PDCCH respectively. When $$\left\lfloor n \cdot \frac{2^{\mu_{PUSCH}}}{2^{\mu_{PDCCH}}} \right\rfloor$$

for each of the multiple repetitions of the DCI transmission is the same, it may be considered that the multiple repetitions are in the same downlink time unit.

In some examples, the UE may report a capability to support that each of multiple repetitions of a DCI transmission is in a same downlink time unit (e.g., slot or sub-slot) when the multiple repetitions of the DCI transmission schedule a PUSCH. For example, the UE may report a capability to support that $$\left\lfloor n \cdot \frac{2^{\mu_{PUSCH}}}{2^{\mu_{PDCCH}}} \right\rfloor$$

for each of multiple repetitions of a DCI transmission is the same when the multiple repetitions of the DCI transmission schedule a PUSCH, where n is an index of a slot where a corresponding repetition of the multiple repetitions of the DCI transmission is located, and $\mu_{PUSCH}$ and $\mu_{PDCCH}$ are configured subcarrier spacings for the PUSCH and the PDCCH respectively.

In some examples, the base station may configure or transmit configuration information by higher layer signaling, which indicates whether it is satisfied that each of the multiple repetitions of the DCI transmission is in a same downlink time unit (e.g., a slot or sub-slot) when the multiple repetitions of the DCI transmission schedule the PUSCH. For example, the configuration information may indicate whether it is satisfied that $$\left\lfloor n \cdot \frac{2^{\mu_{PUSCH}}}{2^{\mu_{PDCCH}}} \right\rfloor$$

for each of the multiple repetitions of the DCI transmission is the same when the multiple repetitions of the DCI transmission schedule the PUSCH, where n is an index of a slot where a corresponding repetition of the multiple repetitions of the DCI transmission is located, and $\mu_{PUSCH}$ and $\mu_{PDCCH}$ are configured subcarrier spacings for the PUSCH and the PDCCH respectively.

In some implementations, when multiple repetitions of a DCI transmission schedule a PUSCH, if it is not satisfied that $$\left\lfloor n \cdot \frac{2^{\mu_{PUSCH}}}{2^{\mu_{PDCCH}}} \right\rfloor$$

of each of the multiple repetitions of the DCI transmission is the same, the UE may determine the PUSCH according to the first repetition or the last repetition of the repetitions of the DCI transmission, where n is an index of a slot where a corresponding repetition of the multiple repetitions of the DCI transmission is located, and $\mu_{PUSCH}$ and $\mu_{PDCCH}$ are configured subcarrier spacings for the PUSCH and the PDCCH respectively. In this case, for example, if the multiple repetitions of the DCI transmission schedule the PUSCH, the UE may determine the PUSCH according to the first repetition or the last repetition of the repetitions of the DCI transmission. It may be convenient for the UE to receive a corresponding PUSCH by clarifying the behaviors of the UE in the case that there are the multiple repetitions of the DCI transmission, and because this implementation does not need to modify the current protocols too much, it may be easily implemented. In addition, with respect to embodiments of determining the PUSCH based on at least one of K0, K1, or K2 indicated by the DCI, reference may be made to the previous description (for example, referring to FIGS. 6A to 6C).

In some implementations, when multiple repetitions of a DCI transmission schedule a PUSCH, if it is satisfied that $$\left\lfloor n \cdot \frac{2^{\mu_{PUSCH}}}{2^{\mu_{PDCCH}}} \right\rfloor$$

of each of the multiple repetitions of the DCI transmission is the same, the UE may determine the PUSCH according to any one of the repetitions of the DCI transmission, where n is an index of a slot where a corresponding repetition of the multiple repetitions of the DCI transmission is located, and $\mu_{PUCCH}$ and $\mu_{PDCCH}$ are configured subcarrier spacings for the PUSCH and the PDCCH respectively.

In some implementations, it may be specified, for example, by protocols that a condition needs to be satisfied when multiple repetitions of a DCI transmission are used for one or more of indicating SPS PDSCH release, indicating secondary cell dormancy, or triggering one shot HARQ-ACK feedback, where the condition is that each of the multiple repetitions of the DCI transmission is in a same downlink time unit (e.g., slot or sub-slot). For example, it may be specified by protocols that it is necessary to satisfy that $$\left\lfloor n \cdot \frac{2^{\mu_{PUCCH}}}{2^{\mu_{PDCCH}}} \right\rfloor$$

for each of the multiple repetitions of the DCI transmission is the same, where n is an index of a slot where a corresponding repetition of the multiple repetitions of the DCI transmission is located, and $\mu_{PUCCH}$ and $\mu_{PDCCH}$ are configured subcarrier spacings for the PUCCH and the PDCCH respectively. When $$\left\lfloor n \cdot \frac{2^{\mu_{PUCCH}}}{2^{\mu_{PDCCH}}} \right\rfloor$$

for each of the multiple repetitions of the DCI transmission is the same, it may be considered that the multiple repetitions are in the same downlink time unit.

In some examples, the UE may report a capability to support that each of multiple repetitions of a DCI transmission is in a same downlink time unit (e.g., a slot or sub-slot) when the multiple repetitions of the DCI transmission are used for at least one of indicating SPS PDSCH release, indicating secondary cell dormancy, or triggering one shot HARQ-ACK feedback. For example, the UE may report a capability to support that $$\left\lfloor n \cdot \frac{2^{\mu_{PUCCH}}}{2^{\mu_{PDCCH}}} \right\rfloor$$

for each of multiple repetitions of a DCI transmission is the same when the multiple repetitions of the DCI transmission are used for at least one of indicating SPS PDSCH release, indicating secondary cell dormancy, or triggering one shot HARQ-ACK feedback, where n is an index of a slot where a corresponding repetition of the multiple repetitions of the DCI transmission is located, and $\mu_{PUCCH}$ and $\mu_{PDCCH}$ are configured subcarrier spacings for the PUCCH and the PDCCH respectively.

In some examples, the base station may configure or transmit configuration information by higher layer signaling, which indicates whether it is satisfied that each of multiple repetitions of a DCI transmission is in a same downlink time unit (e.g., a slot or sub-slot) when the multiple repetitions of the DCI transmission are used for at least one of indicating SPS PDSCH release, indicating secondary cell dormancy, or triggering one shot HARQ-ACK feedback. For example, the configuration information may indicate whether it is satisfied that $$\left\lfloor n \cdot \frac{2^{\mu}PUCCH}{2^{\mu}PDCCH} \right\rfloor$$

for each of multiple repetitions of a DCI transmission is the same when the multiple repetitions of the DCI transmission are used for at least one of indicating SPS PDSCH release, indicating secondary cell dormancy, or triggering one shot HARQ-ACK feedback, where n is an index of a slot where a corresponding repetition of the multiple repetitions of the DCI transmission is located, and $\mu_{PUCCH}$ and $\mu_{PDCCH}$ are configured subcarrier spacings for the PUCCH and the PDCCH respectively.

In some implementations, when multiple repetitions of a DCI transmission are used for at least one of indicating SPS PDSCH release, indicating secondary cell dormancy, or triggering one shot HARQ-ACK feedback, if it is not satisfied that $$\left\lfloor n \cdot \frac{2^{\mu}PUCCH}{2^{\mu}PDCCH} \right\rfloor$$

of each of the multiple repetitions of the DCI transmission is the same, the UE may determine the PUCCH according to the first repetition or the last repetition of the repetitions of the DC transmission. In this case, for example, if the multiple repetitions of the DCI transmission are used for at least one of indicating SPS PDSCH release, indicating secondary cell dormancy, or triggering one shot HARQ-ACK feedback, the UE may determine the PUCCH according to the first repetition or the last repetition of the repetitions of the DCI transmission. It may be convenient for the UE to receive a corresponding PUCCH by clarifying the behaviors of the UE in the case that there are the multiple repetitions of the DCI transmission, and because this implementation does not need to modify the current protocols too much, it may be easily implemented. In addition, with respect to embodiments of determining the PUCCH based on at least one of K0, K1, or K2 indicated by the DCI, reference may be made to the previous description (for example, referring to FIGS. 6A to 6C).

In some implementations, when multiple repetitions of a DCI transmission are used for at least one of indicating SPS PDSCH release, indicating secondary cell dormancy, or triggering one shot HARQ-ACK feedback, if it is satisfied that $$\left\lfloor n \cdot \frac{2^{\mu}PUCCH}{2^{\mu}PDCCH} \right\rfloor$$

of each of the multiple repetitions of the DCI transmission is the same, the UE may determine the PUCCH according to any one of the repetitions of the DCI transmission, where n is an index of a slot where a corresponding repetition of the multiple repetitions of the DCI transmission is located, and $\mu_{PUCCH}$ and $\mu_{PDCCH}$ are configured subcarrier spacings for the PUCCH and the PDCCH respectively.

A time unit in which the uplink or downlink channel indicated by the DCI is located being determined in the case of the second type of scenario (that is, there are multiple repetitions of the DCI transmission for the UE) are described above. For example, the method according to the embodiments of the disclosure specifies how to determine the time unit in which the PDSCH, PUSCH, or PUCCH is located when the DCI is repeatedly transmitted, thus clarifying the behaviors of the UE and improving the reliability of the network.

Continuing to consider the second type of scenario, for example, in which there are multiple repetition transmissions of a DCI for the UE (or multiple repetition transmissions of a PDCCH), that is, there are multiple repetitions of a DCI transmission for the UE (or multiple repetitions of a PDCCH transmission). For example, the DCI is repeatedly transmitted multiple times in time domain. When the DCI is repeatedly transmitted in time domain, that is, when there are multiple repetitions of a DCI transmission in time domain (multiple repetitions of PDCCH transmission), if time domain resources of the PDSCH is relative to the PDCCH, it is necessary to clarify which PDCCH (which one of the multiple repetitions of the PDCCH transmission) is used as the reference point for the time domain resources of the PDSCH.

In some implementations, the starting symbol S of time domain resource allocation for the PDSCH may be relative to the first repetition of the multiple repetitions of the PDCCH transmission (e.g., the starting symbol of a PDCCH monitoring occasion where the first repetition is located), or the starting symbol S of the time domain resource allocation for the PDSCH may be relative to the last repetition of the multiple repetitions of the PDCCH transmission (e.g., the starting symbol of a PDCCH monitoring occasion where the last repetition is located).

In some examples, the UE may report a capability to support that the starting symbol S of time domain resource allocation for a PDSCH may be relative to the first repetition and/or the last repetition of multiple repetitions of a PDCCH transmission (e.g., the starting symbol of the PDCCH monitoring occasion where the first repetition and/or the last repetition is located).

In some examples, the base station may configure or transmit configuration information by higher layer signaling, where the configuration information is used to indicate that the starting symbol S of time domain resource allocation for a PDSCH may be relative to the first repetition of multiple repetitions of a PDCCH transmission (e.g., the starting symbol of the PDCCH monitoring occasion where the first repetition is located). In another example, the base station may configure or transmit configuration information by higher layer signaling, where the configuration information is used to indicate that the starting symbol S of time domain resource allocation for a PDSCH may be relative to the last repetition of multiple repetitions of a PDCCH transmission (e.g., the starting symbol of the PDCCH monitoring occasion where the last repetition is located).

In some implementations, the time domain resources occupied by a PDSCH may be indicated by a higher layer signaling configuration TDRA (Time Domain Resource Allocation) table. An indexed row in the TDRA table may indicate a number of slot intervals (or a slot offset) K0 between the PDCCH and the PDSCH, and a time domain start and length indicator value (SLIV) for the PDSCH.

In some implementations, the reference point S0 for the starting symbol S may be defined as follows:
  if it is configured to take the starting symbol of the PDCCH monitoring occasion as the reference point for the SLIV (for example, the parameter of ReferenceofSLIV-ForDCIFormat1_2 in 3GPP is configured), and when receiving the PDSCH scheduled by DCI format 1_2 (with CRC scrambled by C-RNTI (Cell Radio Network Temporary Identifier), MCS-C-RNTI (Modulation and Coding Scheme Cell RNTI), CS-RNTI (Configured Scheduling RNTI) (where K0=0) and PDSCH mapping Type B), the starting symbol S is relative to the starting symbol S0 of the PDCCH monitoring occasion where the first (or the last) repetition of multiple repetitions of DCI format 1_2 transmission which correspond to the multiple repetitions of the PDCCH transmission is located;
  otherwise, the starting symbol S is relative to the start of the slot using S0=0.

In some implementations, it may be specified by protocols and/or configured by higher layer signaling that, if multiple repetitions of a DCI transmission schedule a PDSCH, the starting symbol S of time domain resource allocation of this PDSCH is relative to the starting symbol of a slot where this DCI is located. For example, it may be specified by protocols and/or configured by higher layer signaling that, if the multiple repetitions of the DCI transmission schedule the PDSCH, the starting symbol S of the time domain resource allocation of this PDSCH is relative to the starting symbol of a slot where the first (or the last) repetition of the multiple repetitions of this DCI transmission is located.

In some implementations, time domain resources occupied by a PDSCH may be indicated by a higher layer signaling configuration TDRA (Time Domain Resource Allocation) table. An indexed row in the TDRA table may indicate the number of slot intervals K0 between the PDCCH and the PDSCH, and the SLIV of the PDSCH.

In some implementations, the reference point S0 for the starting symbol S may be defined as follows:
  if it is configured to take the starting symbol of the PDCCH monitoring occasion as the reference point for the SLIV (for example, the parameter of ReferenceofSLIV-ForDCIFormat1_2 is configured) and the PDCCH is not configured with repetition transmissions in time domain (i.e., there are no multiple repetitions of the DCI transmission for the UE (or the multiple repetitions of the PDCCH transmission)), and when receiving the PDSCH scheduled by DCI format 1_2 (with the CRC scrambled by C-RNTI, MCS-C-RNTI, CS-RNTI (where K0=0) and PDSCH mapping Type B), the starting symbol S is relative to the starting symbol S0 of the PDCCH monitoring occasion where DCI format 1_2 is detected;
  otherwise, the starting symbol S is relative to the start of the slot using S0=0.

The method for determining the starting symbol S of a PDSCH in the case of the second type of scenario (that is, there are multiple repetitions of a DCI transmission for the UE) according to some embodiments of the disclosure is described above. The method according to the embodiments of the disclosure specifies how to determine the starting symbol S of the PDSCH when the DCI is repeatedly transmitted, which clarifies the behaviors of the UE, thereby improving the reliability of network transmission.

It should be noted that although the embodiments regarding "multiple repetitions of a PDCCH transmission" and "multiple repetitions of a DCI transmission" have been described separately above, this is only for the purpose of illustration. In all embodiments of the disclosure, "multiple repetitions of a PDCCH transmission" may be used interchangeably with "multiple repetitions of a DCI transmission".

In some implementations, the UE is configured with a semi-static HARQ-ACK codebook, for example, Type-1 HARQ-ACK codebook by the 3GPP TS 38.213. For the semi-static HARQ-ACK codebook, a size and order of the HARQ-ACK codebook may be determined according to semi-static configuration parameters.

For a certain serving cell c, on its active BWP (bandwidth part), a number of PDSCHs that need to be fed back in a downlink slot i is determined by a maximum number of PDSCHs that do not overlap in the downlink slot i. The time domain resources occupied by the PDSCH may be indicated by a higher layer signaling configuration TDRA (Time Domain Resource Allocation) table. An indexed row in the TDRA table may indicate the number of slot intervals K0 between the PDCCH and the PDSCH, and the SLIV of the PDSCH.

In some implementations, the reference point S0 for the starting symbol S may be defined as follows:
  if it is configured to take the starting symbol of the PDCCH monitoring occasion as the reference point for the SLIV (for example, the parameter of ReferenceofSLIV-ForDCIFormat1_2 is configured) and the PDCCH is not configured with repetition transmissions in time domain (i.e., there are no multiple repetitions of the DCI transmission for the UE (or the multiple repetitions of the PDCCH transmission)), and when receiving the PDSCH scheduled by DCI format 1_2 (with the CRC scrambled by C-RNTI, MCS-C-RNTI, CS-RNTI (where K0=0) and PDSCH mapping Type B), the starting symbol S is relative to the starting symbol S0 of the PDCCH monitoring occasion where DCI format 1_2 is detected;
  otherwise, the starting symbol S is relative to the start of the slot using S0=0.

When a PDCCH may be repeatedly transmitted, how to determine a PDSCH that may be received in a slot in a semi-static HARQ-ACK codebook is a problem that needs to be solved. At least one of the following methods M1 to M3 may be adopted.

Method M1: it may be specified by protocols and/or configured by higher layer signaling that a PDSCH that may be received in a slot in a semi-static HARQ-ACK codebook may be determined by using all PDCCH monitoring occasions as the reference point for the SLIV, and this method has low implementation complexity and may reuse the existing implementations.

Method M2: it may be specified by protocols and/or configured by higher layer signaling that a PDSCH that may be received in a slot in a semi-static HARQ-ACK codebook may be determined by using the starting symbol of a PDCCH monitoring occasion corresponding to the first (or the last) PDCCH of PDCCH repetition transmissions as the reference point for the SLIV. This method may reduce a number of bits of the HARQ-ACK codebook and improve the reliability of HARQ-ACK codebook transmission. It should be noted that if the protocols specify that the time domain resources of the PDSCH are determined by using the starting symbol of the first (or last) PDCCH of the PDCCH repetition transmissions as the reference point for the SLIV, the PDCCH monitoring occasion corresponding to the last (or first) PDCCH of the PDCCH repetition transmissions may be excluded when determining the PDSCH that may be received in the slot in the semi-static HARQ-ACK codebook.

Method M3: it may be specified by protocols and/or configured by higher layer signaling that, if there are PDCCH repetition transmissions and the UE is configured with a semi-static HARQ-ACK codebook, the SLIV for the PDSCH is relative to the starting symbol of a slot. This method has low implementation complexity and may reuse the existing implementations.

Continuing to consider the second type of scenario, in which there are multiple repetition transmissions of a DCI for the UE (or there are multiple repetition transmissions of a PDCCH), that is, multiple repetitions of a DCI transmission for the UE (or multiple repetitions of PDCCH transmission). For example, the DCI is repeatedly transmitted multiple times in time domain. For example, a PDSCH HARQ-ACK codebook configuration parameter (e.g., the parameter of pdsch-HARQ-ACK-Codebook in 3GPP) may be dynamic (e.g., dynamic) or enhanced dynamic (for example, the parameter of pdsch-HARQ-ACK-Codebook-r16 in 3GPP is enhancedDynamic). Since DAI information in the DCI is related to a PDCCH monitoring occasion, it is necessary to clarify a PDCCH monitoring occasion corresponding to a DAI counting occasion in the multiple repetitions of the DCI transmission (or a DAI counting occasion in the multiple repetitions of the PDCCH transmission). In the embodiments of the disclosure, the determined DAI counting occasion may indicate a position for DAI counting, and may correspond to a corresponding PDCCH monitoring occasion or a slot of the PDCCH.

In some implementations, when the DCI (or PDCCH) is repeatedly transmitted (that is, there are repetitions of the DCI (or PDCCH) transmission), the DAI counting occasion may be the start of the first repetition of the multiple repetitions of the DCI (or PDCCH) transmission (or the earliest repetition of the repetitions of the DCI transmission, or a repetition of the repetitions of the PDCCH transmission for which the starting symbol is the earliest). Or, the DAI counting occasion may be a PDCCH monitoring occasion where the first repetition of the multiple repetitions of the DCI (or PDCCH) transmission (or the earliest repetition of the repetitions of the DCI transmission, or the repetition of the repetitions of the PDCCH transmission for which the starting symbol is the earliest) is located.

In some implementations, when the DCI (or PDCCH) is repeatedly transmitted within a time unit (that is, there are repetitions of DCI (or PDCCH) transmission within the time unit), the DAI counting occasion is the earliest (or latest) PDCCH monitoring occasion within the time unit. Or, the DAI counting occasion is the starting symbol in the time unit (or next time unit). For example, the time unit may be one or more slots. For example, the time unit may be one or more sub-slots.

The method for determining the DAI counting occasion in the case of the second type of scenario (that is, there are multiple repetitions of a DCI transmission for the UE) according to some embodiments of the disclosure is described above. The method according to the embodiments of the disclosure specifies how to determine the DAI counting occasion when the DCI is repeatedly transmitted, which clarifies the behaviors of the UE, improves the reliability of the HARQ-ACK codebook, reduces a size of the HARQ-ACK codebook, and improves the spectrum efficiency of the network.

Considering the following scenario in which multiple transmissions of DCI for the UE (or multiple transmissions of a PDCCH) exist. For example, the DCI is transmitted multiple times in time domain. For convenience of description, the scenario is relative to as a third type of scenario, for example, the third type of scenario may mean "multiple transmissions of DCI (multiple transmissions of a PDCCH)", in which information of the DCI in each transmission may be different or the same. In a case where the information of the DCI in each transmission is the same as each other, the third type of scenario may be equivalent to the above second type of scenario (that is, there are multiple repetitions of a DCI transmission). For example, a PDSCH HARQ-ACK codebook configuration parameter (e.g., the parameter of pdsch-HARQ-ACK-Codebook in 3GPP) may be dynamic (e.g., Dynamic) or enhanced dynamic (for example, the parameter of pdsch-HARQ-ACK-Codebook-r16 in 3GPP is enhancedDynamic). For example, each transmission of the multiple transmissions of the DCI (or multiple transmissions of the PDCCH) may be used to schedule a PDSCH, or each transmission may be used to indicate SPS PDSCH release, or each transmission may be used to indicate secondary cell dormancy. For example, in a case where the multiple transmissions of the DCI are used to schedule a PDSCH, the DCI of each transmission of the multiple transmissions has same information for scheduling the PDSCH (i.e., scheduling a same PDSCH). For another example, in a case where each transmission of the multiple transmissions of the DCI is used to indicate SPS PDSCH release, the DCI of each transmission of the multiple transmissions has same information for indicating SPS PDSCH release. For yet another example, in a case where each transmission of the multiple transmissions of the DCI is used to indicate secondary cell dormancy, the DCI of each transmission of the multiple transmissions has same information for indicating secondary cell dormancy. Since DAI information in the DCI is related to a PDCCH monitoring occasion, it is necessary to clarify a PDCCH monitoring occasion corresponding to a DAI counting occasion in the multiple transmissions of the DCI (or multiple transmissions of the PDCCH).

In some implementations, when the DCI (or PDCCH) is transmitted multiple times, the DAI counting occasion is the start of the transmission occasion of the first transmission of the multiple transmissions of the DCI (or PDCCH) (or the earliest transmission of the multiple transmissions of the DCI or a transmission of the multiple transmissions of the PDCCH for which the starting symbol is the earliest). Or, the DAI counting occasion is a PDCCH monitoring occasion where the transmission occasion of the first transmission of the multiple transmissions of the DCI (or PDCCH) (or the earliest transmission of the multiple transmissions of the DCI or the transmission of the multiple transmissions of the PDCCH for which the starting symbol is the earliest) is located.

In some implementations, when the DCI (or PDCCH) is transmitted multiple times within a time unit (that is, there are multiple transmissions of the DCI (or PDCCH) within the time unit), the DAI counting occasion is the earliest (or the latest) PDCCH monitoring occasion within the time unit. Or, the DAI counting occasion is the starting symbol in the time unit (or next time unit). For example, the time unit may be one or more slots. For example, the time unit may be one or more sub-slots.

In some implementations, multiple search spaces or PDCCH monitoring occasions may be configured into a group by higher layer signaling, where a DAI in DCI scheduling same downlink information in the group is the same within a time unit. Scheduling the same downlink information may mean one of: that each transmission of the multiple transmissions of the DCI schedules a same PDSCH; that each transmission of the multiple transmissions of the DCI indicates SPS PDSCH release with same information; or that each transmission of the multiple transmissions of the DC indicates secondary cell dormancy. The DAI counting occasion in the group may be configured by higher layer signaling or specified by protocols. For example, it may be specified that the DAI counting occasion in the group is the first or last PDCCH monitoring occasion or the first or last search space in the group.

In some implementations, DAI of each transmission of the multiple transmissions of the DC (or PDCCH) is the same, and the UE may determine the DAI counting occasion corresponding to the multiple transmissions of the DCI (or PDCCH) according to one or more of rules defined in the embodiment, and determine the bit positions in the HARQ-ACK codebook. For example, the bit positions in the HARQ-ACK codebook may be determined based on the determined counting occasion. For example, after the counting occasion is determined, the HARQ-ACK codebook may be determined according to the generating method of the Type-2 HARQ-ACK codebook in 3GPP (e.g., TS38.213). The reliability of the HARQ-ACK codebook is improved and a size of the HARQ-ACK codebook is reduced by determining the DAI counting occasion and determining the bit positions in the HARQ-ACK codebook based on the DAI counting occasion.

In some implementations, if the time unit is multiple slots (or sub-slots), a number of slots (or sub-slots) included in the time unit may be configured by higher layer signaling.

The method for determining the DAI counting occasion in the case of the third type of scenario (that is, multiple transmissions of DCI for the UE exist) according to some embodiments of the disclosure is described above. The method according to the embodiments of the disclosure specifies how to determine the DAI counting occasion when the DCI is transmitted multiple times, which clarifies the behaviors of the UE, improves the reliability of the HARQ-ACK codebook, reduces a size of the HARQ-ACK codebook, and improves the spectrum efficiency of the network.

Continuing to consider the third type of scenario, in which there are multiple transmissions of DCI for the UE (or multiple transmissions of a PDCCH). For example, the DC is transmitted multiple times in time domain. For example, a PDSCH HARQ-ACK codebook configuration parameter (e.g., the parameter of pdsch-HARQ-ACK-Codebook) may be dynamic (e.g., Dynamic) or may be enhanced dynamic (for example, the parameter of pdsch-HARQ-ACK-Codebook-r16 in 3GPP is enhancedDynamic). For example, each transmission of the multiple transmissions of the DCI (or multiple transmissions of the PDCCH) may be used to schedule a same PDSCH, or each transmission may be used to indicate SPS PDSCH release, or each transmission may be used to indicate secondary cell dormancy. For example, in a case where the multiple transmissions of the DCI are used to schedule the PDSCH, the DCI of each transmission of the multiple transmissions has same information for scheduling the PDSCH (i.e., scheduling a same PDSCH). For another example, in a case where each transmission of the multiple transmissions of the DCI is used to indicate SPS PDSCH release, the DCI of each transmission of the multiple transmissions has same information for indicating SPS PDSCH release. For yet another example, in a case where each transmission of the multiple transmissions of the DCI is used to indicate secondary cell dormancy, the DC of each transmission of the multiple transmissions has same information for indicating secondary cell dormancy. Since DAI information in the DCI is related to a PDCCH monitoring occasion, it is necessary to clarify a PDCCH monitoring occasion corresponding to a DAI counting occasion in the multiple transmissions of the DCI (or multiple transmissions of the PDCCH).

In some implementations, it may be specified by protocols that respective DAIs in the multiple transmissions of the DCI are counted independently or separately. One transmission of the multiple transmissions of the DCI may correspond to one DAI, and the multiple transmissions of the DCI may correspond to multiple DAIs. For example, the UE may transmit corresponding HARQ-ACK information in a HARQ-ACK bit corresponding to any one of the multiple DAIs. For another example, the UE may transmit the corresponding HARQ-ACK information in all HARQ-ACK bits corresponding to the multiple DAIs. For yet another example, the UE may transmit the corresponding HARQ-ACK information in a HARQ-ACK bit corresponding to the first DAI (for example, the first DAI may correspond to the first transmission of the multiple transmissions of the DCI) (or the last DAI, which corresponds to the last transmission of the multiple transmissions of the DCI) of the multiple DAIs.

In some implementations, it may be specified by protocols that if there are multiple transmissions of DCI (e.g., the multiple transmissions of the DCI in time domain), HARQ-ACK information corresponding to the multiple transmissions of the DCI is transmitted without being multiplexed with other HARQ-ACK information in at least one of the PUCCH or the PUSCH.

The method for determining the DAI counting occasion in the case of the third type of scenario (that is, multiple transmissions of DCI for the UE exist) according to some embodiments of the disclosure is described above. The method according to the embodiments of the disclosure specifies how to determine the DAI counting occasion when the DCI is transmitted multiple times, which clarifies the behaviors of the UE, improves the reliability of the HARQ-ACK codebook, reduces a size of the HARQ-ACK codebook, and improves the spectrum efficiency of the network.

In some implementations, a TRP may also be configured with a priority, for example, the priority index is configured in the parameter of ControlResourceSet in 3GPP. It may also be specified by protocols that when a CORESET (e.g., the parameter of ControlResourceSet in 3GPP) is configured with the lower priority, DCI associated with the CORESET can only schedule data and/or control information with the lower priority. It may also be specified by protocols that when a CORESET (e.g., the parameter of ControlResourceSet in 3GPP) is configured with the higher priority, DCI associated with the CORESET can only schedule data and/or control information with the higher priority; or DCI associated with the CORESET can schedule data and/or control information with the higher priority and/or the lower priority. In this way, bits indicating the priorities explicitly in the DCI may be reduced, thereby reducing the downlink control signaling overhead, and improving the reliability of downlink control information transmission and the spectrum efficiency of the network.

It should be noted that the embodiments in one scenario of the disclosure may also be applied to other scenarios.

When there are PDCCH repetition transmissions, how to determine a PDCCH monitoring occasion corresponding to a dynamic HARQ-ACK codebook is a problem that needs to be solved.

In some implementations, the UE may also determine a set of DAI counting occasions corresponding to the HARQ-ACK codebook transmitted in the uplink time unit based on downlink control signaling. When DCI (or PDCCH) is repeatedly transmitted (that is, there are repetitions of the DCI (or PDCCH) transmission exist), the DAI counting occasion may be the start of the first repetition of the multiple repetitions of the DCI (or PDCCH) transmission (or the earliest repetition of the repetitions of the DCI transmission, or a repetition of the repetitions of the PDCCH transmission for which the starting symbol is the earliest). Or, the DAI counting occasion may be a PDCCH monitoring occasion where the first repetition of the multiple repetitions of the DCI (or PDCCH) transmission (or the earliest repetition of the repetitions of the DCI transmission, or the repetition of the repetitions of the PDCCH transmission for which the starting symbol is the earliest) is located.

Figure 6D:
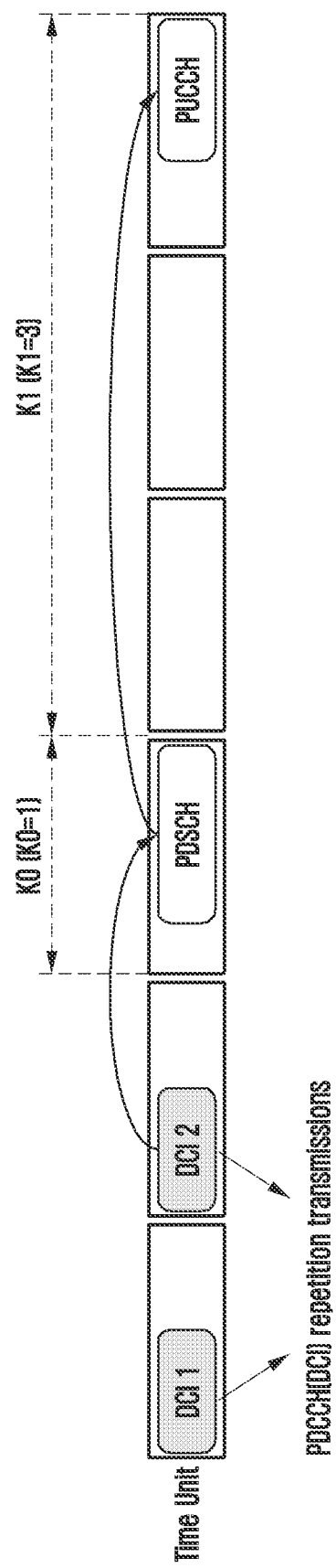

Referring to FIG. 6D, the DAI counting occasion is determined without considering the PDCCH repetition transmissions (DCI repetition transmissions) at present, and the determined DAI counting occasion is the DAI counting occasion corresponding to DCI2 (PDCCH2) at this time, while the actual DAT counting occasion is the DAI counting occasion corresponding to DCI1 (PDCCH1) in the example. To solve this problem, it is necessary to consider a time interval (for example, the time interval may be slots) between the first (the earliest) repetition transmission and the last (the latest) repetition transmission of the PDCCH repetition transmissions when determining the DAI counting occasion.

The DAI counting occasion may be a PDCCH monitoring occasion, and in the following examples, the PDCCH monitoring occasion is taken as an example to illustrate the DAI counting occasion, but the examples are not limited thereto.

In particular, in an implementation, for a PDCCH corresponding to a DCI format that schedules PDSCH reception and/or indicates SPS PDSCH release and/or indicates secondary cell dormancy on an active downlink BWP of a serving cell c, the UE may determine a PDCCH monitoring occasion for which the UE transmits HARQ-ACK information in a same PUCCH in an uplink time unit (e.g., slot) n based on at least one of the following parameters:

a value of the PDSCH-to-HARQ_feedback timing indication field (e.g., K1): the parameter represents a time unit offset of a time unit indicating a PDSCH reception and/or indicating SPS PDSCH release and/or indicating secondary cell dormancy to the time unit n in which a PUCCH transmission with HARQ-ACK information is transmitted.

a value of a slot offset $K_0$: the parameter $K_0$ is indicated by a time domain resource allocation field in DCI.

a number of the PDSCH repetition transmissions. The number of the PDSCH repetition transmissions may be a number of repetition transmissions of a dynamically scheduled PDSCH and/or a number of repetition transmissions of a SPS PDSCH. The number of the PDSCH repetition transmissions may be a number of repetition transmissions of a unicast PDSCH and/or a number of repetition transmissions of a groupcast/broadcast PDSCH. The number of the PDSCH repetition transmissions may be a number of repetition transmissions configured by higher layer signaling and/or a number of repetition transmissions dynamically indicated by DCI. For example, the number of the PDSCH repetition transmissions may be determined by the 3GPP parameter of pdsch-AggregationFactor, and/or the 3GPP parameter of pdsch-AggregationFactor-r16, and/or the 3GPP parameter of repetitionNumber.

a time interval of the PDCCH repetition transmissions. For example, the time interval of the PDCCH repetition transmissions may be 1 slot. Or the time interval of the PDCCH repetition transmissions may be configured by higher layer signaling. Or, the time interval of the PDCCH repetition transmissions may be determined by a time unit interval where a search space associated with the PDCCH repetition transmissions is located.

It should be noted that when the UE generates the HARQ-ACK codebook, if the UE detects the first repetition transmission of the PDCCH repetition transmission, the UE ignores other repetition transmissions of the PDCCH repetition transmissions. Otherwise, if the UE does not detect the first repetition transmission of the PDCCH repetition transmissions, and the UE detects other repetition transmissions (e.g., the second repetition transmission or the last repetition transmission) of the PDCCH repetition transmissions, the UE determines the HARQ-ACK bit positions corresponding to this PDCCH according to the DAT counting occasion of the first repetition transmission of the PDCCH repetition transmissions.

The method clarifies the behaviors of the UE in determining the PDCCH monitoring occasion and improves the reliability of the HARQ-ACK codebook, which may reduce the probability of PDSCH retransmissions, and may improve the spectrum efficiency of the system.

When a PUSCH with the smaller priority index overlaps with a PUCCH with the larger priority index in time domain, the UE will cancel the transmission of a PUSCH with the smaller priority index or not transmit the PUSCH with the smaller priority index. To improve the transmission opportunity of the PUSCH with the smaller priority index, the PUCCH and the PUSCH may be transmitted simultaneously. In this case, it is necessary to consider that the UE reports (or transmits or indicates) capability to support simultaneous transmission of a PUCCH and a PUSCH. Various embodiments in which the UE reports (or transmits or indicates) the capability to support simultaneous transmission of a PUCCH and a PUSCH will be described below.

In some implementations, different types of UEs may have different capabilities to support simultaneous transmission of a PUCCH and a PUSCH. A UE may report supported modes for simultaneous transmission of a PUCCH and a PUSCH.

In some implementations, the UE may report (or transmit) the capability to support simultaneous transmission of a PUCCH and a PUSCH. For example, this capability may be reported (or transmitted) per UE. In this case, if a certain UE reports (or transmits) this capability, this UE may support transmitting a PUCCH and a PUSCH simultaneously.

In some implementations, the capability to support simultaneous transmission of a PUCCH and a PUSCH may be associated with carriers. In an example, the UE may report (or transmit) the capability to support simultaneous transmission of a PUCCH and a PUSCH on different carriers. For example, the capability to support simultaneous transmission of a PUCCH and a PUSCH on different carriers may be reported (or transmitted) per UE. If a certain UE reports (or transmits) this capability, this UE may support transmitting a PUCCH and a PUSCH on different carriers simultaneously.

In some implementations, the capability to support simultaneous transmission of a PUCCH and a PUSCH may be associated with priorities (e.g., physical layer priorities) of the PUCCH and the PUSCH.

In an example, the UE may report (or transmit) the capability to support simultaneous transmission of a PUCCH and a PUSCH with a same priority. For example, the UE may report (or transmit) the capability to support simultaneous transmission of a PUCCH and a PUSCH both with the higher priority (e.g., the larger priority index (e.g., priority index 1)). In this case, if a certain UE reports (or transmits) this capability, this UE may support simultaneously transmitting a PUCCH and a PUSCH both with the higher priority. For another example, the UE may report (or transmit) the capability to support simultaneous transmission of a PUCCH and a PUSCH both with the lower priority (for example, the smaller priority index (for example, priority index 0)). In this case, if a certain UE reports (or transmits) this capability, this UE may support simultaneously transmitting a PUCCH and a PUSCH both with the lower priority.

In another example, the UE may report (or transmit) capability to support simultaneous transmission of a PUCCH and a PUSCH with different priorities. For example, the UE may report (or transmit) the capability to support simultaneous transmission of a PUCCH with the higher priority and a PUSCH with the lower priority. In this case, if a certain UE reports (or transmits) this capability, this UE may support transmitting a PUCCH with the higher priority (e.g., the larger priority index (e.g., priority index 1)) and a PUSCH with the lower priority (e.g., the smaller priority index (e.g., priority index 0)) simultaneously. For another example, the UE may report (or transmit) the capability to support simultaneous transmission of a PUCCH with the lower priority and a PUSCH with the higher priority. In this case, if a certain UE reports (or transmits) this capability, this UE may support transmitting a PUCCH with the lower priority and a PUSCH with the higher priority simultaneously.

In some implementations, the capability to support simultaneous transmission of a PUCCH and a PUSCH may be associated with carriers and priorities (e.g., physical layer priorities) of the PUCCH and the PUSCH.

In an example, the UE may report (or transmit) the capability to support simultaneous transmission of a PUCCH and a PUSCH with a same priority on different carriers. For example, the UE may report (or transmit) the capability to support simultaneous transmission of a PUCCH and a PUSCH both with the higher priority on different carriers. In this case, if a certain UE reports (or transmits) this capability, this UE may support transmitting a PUCCH and a PUSCH both with the higher priority on different carriers simultaneously. For another example, the UE may report (or transmit) the capability to support simultaneous transmission of a PUCCH and a PUSCH both with the lower priority on different carriers. In this case, if a certain UE reports (or transmits) this capability, this UE may support transmitting a PUCCH and a PUSCH both with the lower priority on different carriers.

In another example, the UE may report (or transmit) the capability to support simultaneous transmission of a PUCCH and a PUSCH with different priorities on different carriers. For example, the UE may report (or transmit) the capability to support simultaneous transmission of a PUCCH with the higher priority and a PUSCH with the lower priority on different carriers. In this case, if a certain UE reports (or transmits) this capability, this UE may support transmitting a PUCCH with the higher priority and a PUSCH with the lower priority on different carriers simultaneously. For another example, the UE may report (or transmit) the capability to support simultaneous transmission of a PUCCH with the lower priority and a PUSCH with the higher priority on different carriers. In this case, if a certain UE reports (or transmits) this capability, this UE may support transmitting a PUCCH with the lower priority and a PUSCH with the higher priority on different carriers simultaneously.

In some implementations, the capability to support simultaneous transmission of a PUCCH and a PUSCH may be associated with one or more of bands or band combinations. For example, this capability may be reported (or transmitted) per band combination (BC). If the UE reports (or transmits) the capability to support simultaneous transmission of a PUCCH and a PUSCH for a certain band combination, this UE may support transmitting a PUCCH and a PUSCH within this band combination simultaneously. For another example, this capability may be reported (or transmitted) per band. If a UE reports (or transmits) the capability to support simultaneous transmission of a PUCCH and a PUSCH for a certain band, this UE may support transmitting a PUCCH and a PUSCH within this band simultaneously. For another example, this capability may be reported (or transmitted) per band and BC.

In some implementations, the capability to support simultaneous transmission of a PUCCH and a PUSCH may be associated with one or more of carriers and bands or band combinations.

In an example, the UE may report (or transmit) the capability to support simultaneous transmission of a PUCCH and a PUSCH on different carriers per band. That is, the capability to support simultaneous transmission of a PUCCH and a PUSCH on different carriers may be reported (or transmitted) per band. If a UE reports (or transmits) the capability to support simultaneous transmission of a PUCCH and a PUSCH on different carriers for a certain band, this UE may support that the capability to support simultaneous transmission of a PUCCH and a PUSCH on different carriers may be reported (or transmitted) per band combination within this band. That is, the capability to support simultaneous transmission of a PUCCH and a PUSCH on different carriers may be reported (or transmitted) per band combination. If a UE reports (or transmits) the capability to support simultaneous transmission of a PUCCH and a PUSCH on different carriers for a certain band combination, this UE may support transmitting a PUCCH and a PUSCH on different carriers within this band combination simultaneously.

In some implementations, the capability to support simultaneous transmission of a PUCCH and a PUSCH may be associated with one or more of priorities (e.g., physical layer priorities) of the PUCCH and the PUSCH, and bands or band combinations.

In an example, the UE may report (or transmit) the capability to support simultaneous transmission of a PUCCH and a PUSCH with a same priority per band. That is, the capability to support simultaneous transmission of a PUCCH and a PUSCH with a same priority may be reported (or transmitted) per band. For example, the UE may report (or transmit) the capability to support simultaneous transmission of a PUCCH and a PUSCH both with the higher priority per band. In this case, if a certain UE reports (or transmits) this capability for a certain band, this UE may support transmitting a PUCCH and a PUSCH both with the higher priority within the band simultaneously. For another example, the UE may report (or transmit) the capability to support simultaneous transmission of a PUCCH and a PUSCH both with the lower priority for a certain band. In this case, if a certain UE reports (or transmits) this capability for a certain band, this UE may support transmitting a PUCCH and a PUSCH both with the lower priority within the band simultaneously.

In another example, the UE may report (or transmit) the capability to support simultaneous transmission of a PUCCH and a PUSCH with different priorities per band. That is, the capability to support simultaneous transmission of a PUCCH and a PUSCH with different priorities may be reported (or transmitted) per band. For example, the UE may report (or transmit) the capability to support simultaneous transmission of a PUCCH with the higher priority and a PUSCH with the lower priority per band. In this case, if a certain UE reports (or transmits) this capability for a certain band, this UE may support transmitting the PUCCH with the higher priority and the PUSCH with the lower priority within the band simultaneously. For another example, the UE may report (or transmit) the capability to support simultaneous transmission of a PUCCH with the lower priority and a PUSCH with the higher priority per band. In this case, if a certain UE reports (or transmits) this capability for a certain band, this UE may support transmitting the PUCCH with the lower priority and the PUSCH with the higher priority within the band simultaneously.

In yet another example, the UE may report (or transmit) the capability to support simultaneous transmission of a PUCCH and a PUSCH with a same priority per band combination. That is, the capability to support simultaneous transmission of a PUCCH and a PUSCH with a same priority may be reported (or transmitted) per band combination. For example, the UE may report (or transmit) the capability to support simultaneous transmission of a PUCCH and a PUSCH both with the higher priority per band combination. In this case, if a certain UE reports (or transmits) this capability for a certain band combination, this UE may support transmitting a PUCCH and a PUSCH both with the higher priority within the band combination simultaneously. For another example, the UE may report (or transmit) the capability to support simultaneous transmission of a PUCCH and a PUSCH both with the lower priority for a certain band combination. In this case, if a UE reports (or transmits) this capability for a certain band combination, this UE may support transmitting a PUCCH and a PUSCH both with the lower priority within the band combination simultaneously.

In yet another example, the UE may report (or transmit) the capability to support simultaneous transmission of a PUCCH and a PUSCH with different priorities per band combination. That is, the capability to support simultaneous transmission of a PUCCH and a PUSCH with different priorities may be reported (or transmitted) per band combination. For example, the UE may report (or transmit) the capability to support simultaneous transmission of a PUCCH with the higher priority and a PUSCH with the lower priority per band combination. In this case, if a certain UE reports (or transmits) this capability for a certain band combination, this UE may support transmitting a PUCCH with the higher priority and a PUSCH with the lower priority within the band combination simultaneously. For another example, the UE may report (or transmit) the capability to support simultaneous transmission of a PUCCH with the lower priority and a PUSCH with the higher priority per band combination. In this case, if a certain UE reports (or transmits) this capability for a certain band combination, this UE may support transmitting a PUCCH with the lower priority and a PUSCH with the higher priority within the band combination simultaneously.

In some implementations, the capability to support simultaneous transmission of a PUCCH and a PUSCH may be associated with one or more of carriers, priorities (e.g., physical layer priorities) of the PUCCH and the PUSCH, and bands or band combinations.

In an example, the UE may report (or transmit) the capability to support simultaneous transmission of a PUCCH and a PUSCH with a same priority on different carriers per band. That is, the capability to support simultaneous transmission of a PUCCH and a PUSCH with a same priority on different carriers may be reported (or transmitted) per band. For example, the UE may report (or transmit) the capability to support simultaneous transmission of a PUCCH and a PUSCH both with the higher priority on different carriers per band. In this case, if a certain UE reports (or transmits) this capability for a certain band, this UE may support transmitting a PUCCH and a PUSCH both with the higher priority on different carriers within the band simultaneously. For another example, the UE may report (or transmit) the capability to support simultaneous transmission of a PUCCH and a PUSCH both with the lower priority on different carriers for a certain band. In this case, if a certain UE reports (or transmits) this capability for a certain band, this UE may support transmitting a PUCCH and a PUSCH both with the lower priority on different carriers within the band simultaneously.

In another example, the UE may report (or transmit) the capability to support simultaneous transmission of a PUCCH and a PUSCH with different priorities on different carriers per band. That is, the capability to support simultaneous transmission of a PUCCH and a PUSCH with different priorities on different carriers may be reported (or transmitted) per band. For example, the UE may report (or transmit) the capability to support simultaneous transmission of a PUCCH with the higher priority and a PUSCH with the lower priority on different carriers per band. In this case, if a certain UE reports (or transmits) this capability for a certain band, this UE may support transmitting a PUCCH with the higher priority and a PUSCH with the lower priority on different carriers within the band simultaneously. For another example, the UE may report (or transmit) the capability to support simultaneous transmission of a PUCCH with the lower priority and a PUSCH with the higher priority on different carriers per band. In this case, if a certain UE reports (or transmits) this capability for a certain band, this UE may support transmitting a PUCCH with the lower priority and a PUSCH with the higher priority on different carriers within the band simultaneously.

In another example, the UE may report (or transmit) the capability to support simultaneous transmission of a PUCCH and a PUSCH with a same priority on different carriers per band combination. That is, the capability to support simultaneous transmission of a PUCCH and a PUSCH with a same priority on different carriers may be reported (or transmitted) per band combination. For example, the UE may report (or transmit) the capability to support simultaneous transmission of a PUCCH and a PUSCH both with the higher priority on different carriers per band combination. In this case, if a certain UE reports (or transmits) this capability for a certain band combination, this UE may support transmitting a PUCCH and a PUSCH both with the higher priority on different carriers within the band combination simultaneously. For another example, the UE may report (or transmit) the capability to support simultaneous transmission of a PUCCH and a PUSCH both with the lower priority on different carriers simultaneously for a certain band combination. In this case, if a certain UE reports (or transmits) this capability for a certain band combination, this UE may support transmitting the PUCCH and the PUSCH both with the lower priority on different carriers within the band combination simultaneously.

In yet another example, the UE may report (or transmit) the capability to support simultaneous transmission of a PUCCH and a PUSCH with different priorities on different carriers simultaneously per band combination. That is, the capability to support simultaneous transmission of a PUCCH and a PUSCH with different priorities on different carriers may be reported (or transmitted) per band combination. For example, the UE may report (or transmit) the capability to support simultaneous transmission of a PUCCH with the higher priority and a PUSCH with the lower priority on different carriers per band combination. In this case, if a certain UE reports (or transmits) this capability for a certain band combination, this UE may support transmitting a PUCCH with the higher priority and a PUSCH with the lower priority on different carriers within the band combination simultaneously. For another example, the UE may report (or transmit) the capability to support simultaneous transmission of a PUCCH with the lower priority and a PUSCH with the higher priority on different carriers simultaneously per band combination. In this case, if a certain UE reports (or transmits) this capability for a certain band combination, this UE may support transmitting a PUCCH with the lower priority and a PUSCH with the higher priority on different carriers within the band combination simultaneously.

In some implementations, the PUSCH related to one or more of the UE capabilities described above may be a dynamically scheduled PUSCH and/or a semi-statically configured PUSCH (e.g., a configured grant (CG) Type 1 PUSCH and/or a configured grant Type 2 PUSCH in 3GPP).

In some implementations, one or more of the UE capabilities described above may or may not be distinguished based on FDD/TDD mode. For example, the UE may have one or more of the UE capabilities described above only in FDD mode. For another example, the UE may have one or more of the UE capabilities described above only in TDD mode. For another example, the UE may have one or more of the UE capabilities described above in both FDD mode and TDD mode.

In some implementations, one or more of the UE capabilities described above may be based on a frequency range (FR). In an example, one or more of the UE capabilities described above may or may not be distinguished based on FR1 (e.g., sub-6 GHz (below 6 GHz))/FR2 (e.g., millimeter wave band). For example, the UE may have one or more of the UE capabilities described above only in the frequency range FR1. For another example, the UE may have one or more of the UE capabilities described above only in the frequency range FR2. For another example, the UE may have one or more of the UE capabilities described above in both frequency ranges FR1 and FR2.

In some implementations, when the UE reports (or transmits or indicates) the capability to support simultaneous transmission of a PUCCH and a PUSCH, the UE may be indicated to support simultaneous transmission of a PUCCH and a PUSCH. In this case, when the base station obtains the UE's capability to support simultaneous transmission of a PUCCH and a PUSCH from the UE, the base station may perform scheduling based on the capability, thereby increasing the reliability and flexibility of scheduling by the base station.

The embodiments of the disclosure described above give various methods for the UE to report (or transmit or indicate) the capability to support simultaneous transmission of a PUCCH and a PUSCH. In some embodiments, the base station may know whether the UE supports simultaneous transmission of a PUCCH and a PUSCH in each serving cell by the specific UE capability report. In some implementations, the base station may also know whether the UE supports simultaneous transmission of a PUCCH and a PUSCH with a same priority and/or different priorities in each serving cell. Therefore, various methods according to the embodiments of the disclosure may increase the reliability and flexibility of base station scheduling.

According to the embodiments of the disclosure, the UE may be configured (or indicated) by signaling (e.g., higher layer signaling) whether to transmit a PUCCH and a PUSCH simultaneously. For example, the signaling may include higher layer signaling and/or physical layer signaling. For example, the higher layer signaling may include RRC signaling and/or MAC CE. For example, the physical layer signaling may include DCI. Example implementations in which the UE is configured (or indicated) by signaling (e.g., higher layer signaling) whether to transmit a PUCCH and a PUSCH simultaneously will be described below.

In some implementations, the UE may be configured (or indicated) by signaling (e.g., higher layer signaling) to transmit a PUCCH and a PUSCH simultaneously. In this case, when the UE is scheduled with a PUCCH and a PUSCH that overlap in time domain, the UE transmits the PUCCH and the PUSCH simultaneously.

In some implementations, the UE is not configured (or indicated) by signaling (e.g., higher layer signaling) to transmit a PUCCH and a PUSCH simultaneously, or the UE may be configured (or indicated) by signaling (e.g., higher layer signaling) not to transmit a PUCCH and a PUSCH simultaneously. In this case, when the UE is scheduled with a PUCCH and a PUSCH that overlap in the time domain, when a predefined condition (e.g., timing relationship) is satisfied, the UE may multiplex UCI(s) carried by this PUCCH into this PUSCH, and the UE transmits the PUSCH and does not transmit the PUCCH. Other examples of this condition may refer to various implementations of multiplexing rules of a PUCCH and a PUSCH to be described later.

In some implementations, the UE is not configured (or indicated) by signaling (e.g., higher layer signaling) to transmit a PUCCH and a PUSCH simultaneously, or the UE may be configured (or indicated) by signaling not to transmit a PUCCH and a PUSCH simultaneously. In this case, when the UE is scheduled with a PUCCH and a PUSCH that overlap in time domain, it may be specified by protocols and/or configured by signaling that the UE can multiplex UCI(s) carried by this PUCCH into this PUSCH, and the UE transmits the PUSCH and does not transmit the PUCCH. Or, the UE transmits the PUCCH or the PUSCH with the higher priority, and the UE does not transmit the PUCCH or the PUSCH with the lower priority. Or, it may be specified by protocols and/or configured by signaling that, when a PUCCH and a PUSCH have a same priority, the UE can multiplex the UCI(s) carried by this PUCCH into this PUSCH, and the UE transmits the PUSCH and does not transmit the PUCCH. When a PUCCH and a PUSCH have different priorities, the UE transmits the PUCCH or the PUSCH with the higher priority, and the UE does not transmit the PUCCH or the PUSCH with the lower priority. Or, when a PUCCH and a PUSCH have different priorities, it may be specified by protocols and/or configured by signaling that the UE can multiplex UCI(s) carried by this PUCCH into this PUSCH; it may be specified by protocols and/or configured by signaling that the UE can multiplex UCI(s) carried by the PUCCH with the lower (or higher) priority in the PUSCH with the higher (or lower) priority. It should be noted that the base station may configure whether a dynamically scheduled PUSCH and a semi-statically configured PUSCH may be multiplexed with a PUCCH uniformly, or the base station may configure whether a dynamically scheduled PUSCH and a semi-statically configured PUSCH may be multiplexed with a PUCCH separately. It should be noted that in this scheme, the UE needs to satisfy a certain timing relationship for multiplexing or prioritizing the PUCCH and the PUSCH.

It should be noted that in the embodiments of the disclosure, for a PUCCH and a PUSCH with a same priority that overlap in time domain, if the PUCCH and the PUSCH do not support simultaneous transmission, the UE multiplexes the PUCCH in the PUSCH. For a PUCCH and a PUSCH with different priorities that overlap in time domain, if the PUCCH and the PUSCH do not support simultaneous transmission or multiplexing, the UE transmits the PUCCH or the PUSCH with the higher priority, and the UE does not transmit the PUCCH or the PUSCH with the lower priority.

In some implementations, the UE may be configured (or indicated) by signaling (e.g., higher layer signaling) to transmit a PUCCH and a PUSCH in different serving cells simultaneously. In this case, when the UE is scheduled with the PUCCH (e.g., the PUCCH of the primary serving cell) and a PUSCH on a secondary serving cell that overlap in time domain, the UE transmits this PUCCH and this PUSCH simultaneously.

In some implementations, the UE is not configured (or indicated) by signaling (e.g., higher layer signaling) to transmit a PUCCH and a PUSCH in different serving cells simultaneously, or the UE may be configured (or indicated) by signaling (e.g., higher layer signaling) not to transmit a PUCCH and a PUSCH in different serving cells simultaneously. In this case, when the UE is scheduled with a PUCCH and a PUSCH on a secondary serving cell that overlap in time domain, when a predefined condition (e.g., a timing relationship) is satisfied, the UE multiplexes UCI(s) carried by this PUCCH into this PUSCH, and the UE transmits the PUSCH and does not transmit the PUCCH. Other examples of this condition may refer to various implementations of multiplexing rules of a PUCCH and a PUSCH to be described later.

In some implementations, the UE may be configured (or indicated) by signaling (e.g., higher layer signaling) to transmit a PUCCH and a PUSCH overlapping with the PUCCH in time domain on a serving cell or on a BWP of the serving cell simultaneously. In this case, when the UE is scheduled with a PUCCH (e.g., the PUCCH of the primary serving cell) and a PUSCH on a secondary serving cell or a BWP of the secondary serving cell that overlap in time domain, the UE transmits this PUCCH and this PUSCH simultaneously.

In some implementations, the UE is not configured (or indicated) by signaling (e.g., higher layer signaling) to transmit a PUCCH and a PUSCH overlapping with the PUCCH in time domain on a serving cell or on a BWP of the serving cell simultaneously, or the UE may be configured (or indicated) by signaling (e.g., higher layer signaling) not to transmit the PUCCH and the PUSCH overlapping with the PUCCH in time domain on the serving cell or on the BWP of the serving cell simultaneously. In this case, when the UE is scheduled with a PUCCH (e.g., the PUCCH of the primary serving cell) and a PUSCH on a secondary serving cell or a BWP of the secondary serving cell that overlap in time domain, when a predefined condition (e.g., a timing relationship) is satisfied, the UE may multiplex UCI(s) carried by this PUCCH into this PUSCH, and the UE transmits the PUSCH and does not transmit the PUCCH. Other examples of this condition may refer to various implementations of multiplexing rules of a PUCCH and a PUSCH to be described later.

In some implementations, the UE may be configured (or indicated) by signaling (e.g., higher layer signaling) to transmit a PUCCH and a PUSCH with a same priority in different serving cells simultaneously. For example, the UE may be configured (or indicated) by signaling (e.g., higher layer signaling) to transmit a PUCCH and a PUSCH both with the higher priority in different serving cells simultaneously. For another example, the UE may be configured (or indicated) by signaling (e.g., higher layer signaling) to transmit a PUCCH and a PUSCH both with the lower priority in different serving cells simultaneously.

In some implementations, the UE may be configured (or indicated) by signaling (e.g., higher layer signaling) to transmit a PUCCH and a PUSCH with different priorities in different serving cells simultaneously. For example, the UE may be configured (or indicated) by signaling (e.g., higher layer signaling) to transmit a PUCCH with the higher priority and a PUSCH with the lower priority in different serving cells simultaneously. For another example, the UE may be configured (or indicated) by signaling (e.g., higher layer signaling) to transmit a PUCCH with the lower priority and a PUSCH with the higher priority in different serving cells simultaneously.

In some implementations, the UE may be configured (or indicated) by signaling (e.g., higher layer signaling) to transmit a PUCCH carrying UCI(s) with the higher priority and UCI(s) with the lower priority and a PUSCH with the higher priority and/or lower priority in different serving cells simultaneously.

In some implementations, the UE may be configured (or indicated) by signaling (e.g., higher layer signaling) to transmit a PUCCH and a PUSCH with a same priority and/or different priorities overlapping with the PUCCH in time domain on a serving cell or a BWP of the serving cell simultaneously.

In some implementations, the UE may be indicated by DCI whether to transmit a PUCCH and a PUSCH simultaneously. For example, the DCI may include an uplink DCI format and/or a downlink DCI format. For example, the UE may indicate by a certain new field in the DCI whether to transmit a PUCCH and a PUSCH simultaneously. For another example, the UE may indicate whether to transmit a PUCCH and a PUSCH simultaneously by reusing a certain field in the DCI format. For another example, the UE may indicate whether to transmit a PUCCH and a PUSCH simultaneously by reusing one or more bits in a certain field in the DCI format.

In some implementations, the UE may be indicated by at least one of a downlink DCI format and an uplink DCI format whether to transmit a PUCCH and a PUSCH simultaneously. In this case, the UE may determine whether to transmit a PUCCH and a PUSCH simultaneously according to the at least one of an uplink DCI format or a downlink DCI format. Or, the UE may determine whether to transmit a PUCCH and a PUSCH simultaneously according to a DCI format indicating the higher priority.

In some implementations, the PUSCH described above may include a dynamically scheduled PUSCH and/or a semi-statically configured PUSCH (e.g., a configured grant Type 1 PUSCH and/or a configured grant Type 2 PUSCH in 3GPP).

In some implementations, the PUSCH described above may include a PUSCH with the higher priority and/or a PUSCH with the lower priority.

In some implementations, the PUCCH described above may include a PUCCH with the higher priority and/or a PUCCH with the lower priority.

In some implementations, the PUCCH described above may include a PUCCH obtained by multiplexing a PUCCH with the higher priority with a PUCCH with the lower priority, where the obtained PUCCH may carry UCI(s) with the higher priority and UCI(s) with the lower priority.

In some implementations, a type of the UCI(s) carried by the PUCCH described above may include one or more of: HARQ-ACK information, SR, LRR, CSI, or CG UCI.

In some implementations, a format of the PUCCH described above may include a short PUCCH format and/or a long PUCCH format.

In some implementations, the PUCCH described above may be configured with PUCCH repetition transmission.

In some implementations, the PUSCH described above may be configured with PUSCH repetition transmission. For example, a type of the PUSCH repetition transmission may include PUSCH repetition Type A and/or PUSCH repetition Type B in 3GPP.

The example method for configuring the UE whether to transmit the PUCCH and the PUSCH simultaneously according to the embodiments of the disclosure is described above. The UE may be configured and/or indicated whether to transmit the PUCCH and the PUSCH simultaneously by various methods, which increases the flexibility of configuration, clarifies the behaviors of the UE and improves the reliability of uplink transmission.

If the UE supports transmitting a PUCCH and a PUSCH simultaneously, the multiplexing rules of the PUCCH and the PUSCH may be redefined. For example, when a specific condition is satisfied, the PUCCH is multiplexed in the PUSCH, and the UE transmits the PUSCH and does not transmit the PUCCH. A method 700 for multiplexing of a PUCCH and a PUSCH according to embodiments of the disclosure will be described below in connection with FIG. 7.

FIG. 7 illustrates a flowchart of an example method for multiplexing of a PUCCH and a PUSCH according to an embodiment of the disclosure.

Referring to FIG. 7, in operation S710, a set of PUSCHs satisfying a predefined condition is determined. For example, the PUSCHs satisfying the predefined condition may be selected, and the PUSCHs satisfying the predefined condition may constitute the set.

In operation S720, a PUSCH is selected from the set of PUSCHs satisfying the predefined condition.

Then, in operation S730, UCI(s) in a PUCCH is multiplexed in the selected PUSCH, and a UE transmits the multiplexed selected PUSCH and does not transmit the PUCCH. For example, the UCI(s) in the PUCCH may be multiplexed in the selected PUSCH according to the methods in 3GPP, and the UE transmits the multiplexed selected PUSCH and does not transmit the PUCCH.

In some implementations, the predefined condition in operation S710 may include at least one of the following conditions (conditions COND1~COND10).

Condition COND1: the PUCCH and the PUSCH satisfy a certain scheduling restriction. An example of the scheduling restriction is described below. In the example, if HARQ-ACK information is dynamically scheduled by a downlink DCI format in the PUCCH and the PUSCH is scheduled by an uplink DCI format, then: the downlink DCI format should be earlier than the uplink DCI format, or the end time of the downlink DCI format should be earlier than the end time of the uplink DC format, or the start time of the downlink DCI format should be earlier than the start time of the uplink DCI format, or the start time of the downlink DCI format should be earlier than the end time of the uplink DCI format, or the end time of the downlink DCI format should be earlier than the start time of the uplink DCI format.

For example, the HARQ-ACK information dynamically scheduled by the downlink DCI format may include one or more of: HARQ-ACK of a dynamically scheduled PDSCH, HARQ-ACK information indicating SPS PDSCH deactivation, HARQ-ACK information indicating secondary cell dormancy, and HARQ-ACK information associated with a DCI format.

For example, if a certain PUSCH and PUCCH satisfy one or more of the scheduling restrictions as described above, the PUSCH satisfies Condition COND1.

Condition COND2: the PUSCH is not configured or indicated that it can be transmitted simultaneously with a PUCCH.

For example, if a certain PUSCH is not configured or indicated that it can be transmitted simultaneously with a PUCCH, the PUSCH satisfies Condition COND2.

Condition COND3: the PUSCH with the lower priority does not overlap with any PUSCH with the higher priority in a same serving cell in time domain.

For example, if a certain PUSCH with the lower priority does not overlap with any PUSCH with the higher priority in a same serving cell in time domain, the PUSCH with the lower priority satisfies Condition COND3.

COND4: the PUSCH and the PUCCH are in a same sub-slot.

For example, if a certain PUSCH and PUCCH are in a same sub-slot, the PUSCH satisfies Condition COND4.

COND5: the PUSCH and the PUCCH overlap in time domain.

For example, if a certain PUSCH overlaps with a PUCCH in time domain, the PUSCH satisfies Condition COND5.

Condition COND6: the PUSCH and the PUCCH satisfy a certain timing relationship.

For example, if a certain PUSCH and the PUCCH satisfy a certain timing relationship, the PUSCH satisfies Condition COND6.

Condition COND7: a reliability requirement may be satisfied after UCI(s) carried by the PUCCH is(are) multiplexed in the PUSCH. An example of the reliability requirement is described below. In the example, a lowest code rate of the UCI(s) is greater than a predefined value. For example, this predefined value may be specified by protocols, or configured or dynamically indicated by higher layer signaling.

For example, for a certain PUSCH, the reliability requirement may be satisfied after UCI(s) carried by the PUCCH is(are) multiplexed in the PUSCH, and then the PUSCH satisfies Condition COND7.

Condition COND8: a delay requirement may be satisfied after UCI(s) in the PUCCH is(are) multiplexed in the PUSCH. An example of the delay requirement is described below. In the example, the end symbol of the PUSCH is no later than the end symbol of the PUCCH.

For example, for a certain PUSCH, if the delay requirement may be satisfied after UCI(s) carried by the PUCCH is(are) multiplexed in the PUSCH, the PUSCH satisfies Condition COND8.

Condition COND9: the PUSCH is not indicated to be cancelled by a UL CI (Cancelation Indication).

For example, if a certain PUSCH is not indicated to be cancelled by the UL CI, the PUSCH satisfies Condition COND9.

Condition COND10: in a case where the PUSCH is a CG-PUSCH (i.e., its type is CG Type 1 PUSCH or CG Type 2 PUSCH), any symbol of the CG-PUSCH is not semi-statically indicated as downlink, and/or any symbol of the CG-PUSCH is not indicated as downlink by a dynamic slot format indication (SFI).

For example, if any symbol of a certain CG-PUSCH is not semi-statically indicated as downlink, and/or any symbol of the CG-PUSCH is not indicated as downlink by a dynamic SFI, the CG-PUSCH satisfies Condition COND10.

The method according to the embodiments of the disclosure specifies the multiplexing rules of a PUCCH and a PUSCH. The transmission probability of uplink data and control information is improved and multiplexing of uplink control information to a PUSCH which may be cancelled is avoided by multiplexing the PUCCH and the PUSCH by the method according to the embodiments of the disclosure. The transmission reliability of uplink data and control information is improved.

An example of Condition COND1 for multiplexing a PUCCH and a PUSCH according to embodiments of the disclosure will be described below in connection with FIG. 8.

Figure 8:
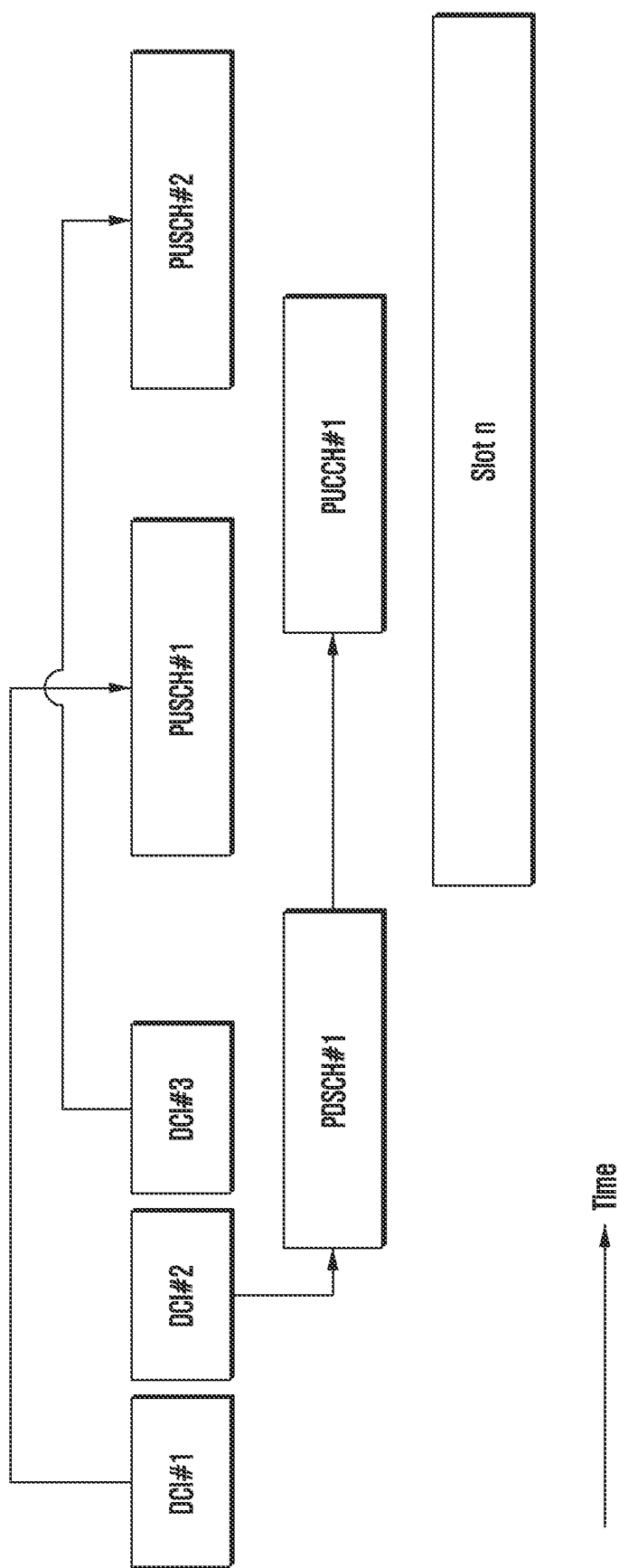
FIG. 8 is an example of a condition for multiplexing of a PUCCH and a PUSCH according to an embodiment of the disclosure.

FIG. 8 is an example of a condition for multiplexing of a PUCCH and a PUSCH according to an embodiment of the disclosure.

A scenario shown in FIG. 8 is considered as an example. Referring to FIG. 8, a UE receives first uplink DCI (e.g., DCI #1) in the first downlink time unit, and the first uplink DCI (e.g., DCI #1) schedules the first PUSCH (e.g., PUSCH #1) which is within a slot n. The UE receives downlink DCI (e.g., DCI #2) in the second downlink time unit, which schedules a PDSCH (e.g., PDSCH #1) and indicates that HARQ-ACK of the PDSCH is transmitted on a PUCCH (e.g., PUCCH #1) within the slot n. The UE receives second uplink DCI (e.g., DCI #2) in the second downlink time unit, and the second uplink DCI schedules the second PUSCH (e.g., PUSCH #2) which is within the slot n. In the embodiments described in connection with FIG. 8, the UE is not configured to transmit a PUCCH and a PUSCH simultaneously.

In some implementations, it may be specified by protocols or configured by higher layer signaling that, if the downlink DCI associated with HARQ-ACK information is after the uplink DCI scheduling the PUSCH (that is, the uplink DCI scheduling the PUSCH is before the downlink DCI scheduling the HARQ-ACK information), the UE does not multiplex the HARQ-ACK information in the PUSCH. The following example is given in connection with FIG. 8. For example, if the starting symbol or start time of a PDCCH carrying downlink DCI (e.g., DCI #2) is later than the starting symbol or start time of a PDCCH carrying uplink DCI (e.g., DCI #1), the UE does not multiplex HARQ-ACK in the PUCCH #1 in the PUSCH #1. For another example, if the end symbol or end time of a PDCCH carrying downlink DCI (e.g., DCI #2) is later than the starting symbol or start time of a PDCCH carrying uplink DCI (e.g., DCI #1), the UE does not multiplex HARQ-ACK in the PUCCH #1 in the PUSCH #1. For yet another example, if the starting symbol or start time of a PDCCH carrying downlink DCI (e.g., DCI #2) is later than the end symbol or end time of a PDCCH carrying uplink DCI (e.g., DCI #1), the UE does not multiplex HARQ-ACK in the PUCCH #1 in the PUSCH #1. For yet another example, if the end symbol or end time of a PDCCH carrying downlink DCI (e.g., DCI #2) is later than the end symbol or end time of a PDCCH carrying the uplink DCI (e.g., DCI #1), the UE does not multiplex HARQ-ACK in the PUCCH #1 in the PUSCH #1.

In some implementations, if downlink DCI associated with HARQ-ACK information is before uplink DCI scheduling a PUSCH (i.e., the uplink DCI scheduling the PUSCH is after the downlink DCI scheduling the HARQ-ACK information), the scheduling restriction is satisfied, and the PUSCH satisfies Condition COND1. An example of the scheduling restriction is given in connection with FIG. 8. For example, if the starting symbol or start time of a PDCCH carrying downlink DCI (e.g., DCI #2) is earlier than the starting symbol or start time of a PDCCH carrying uplink DCI (e.g., DCI #3), the PUSCH #2 satisfies the scheduling restriction and the UE may multiplex the HARQ-ACK in the PUCCH #1 in the PUSCH #2. For another example, if the end symbol or end time of a PDCCH carrying downlink DCI (e.g., DCI #2) is earlier than the starting symbol or start time of a PDCCH carrying uplink DCI (e.g., DCI #3), the PUSCH #2 satisfies the scheduling restriction and the UE may multiplex the HARQ-ACK in the PUCCH #1 in the PUSCH #2. For yet another example, if the starting symbol or start time of a PDCCH carrying downlink DCI (e.g., DCI #2) is earlier than the end symbol or end time of a PDCCH carrying uplink DCI (e.g., DCI #3), the PUSCH #2 satisfies the scheduling restriction and the UE may multiplex the HARQ-ACK in the PUCCH #1 in the PUSCH #2. For yet another example, if the end symbol or end time of a PDCCH carrying downlink DCI (e.g., DCI #2) is earlier than the end symbol or end time of a PDCCH carrying uplink DCI (e.g., DCI #3), the PUSCH #2 satisfies the scheduling restriction and the UE may multiplex the HARQ-ACK in the PUCCH #1 in the PUSCH #2. For example, the DCI associated with the HARQ-ACK information may include one of: DCI scheduling the PDSCH; DCI indicating SPS release; DCI indicating one shot HARQ-ACK feedback; or DCI indicating secondary cell dormancy.

Referring to FIG. 8 again, since the downlink DCI (e.g., DCI #2) associated with the HARQ-ACK information is before the uplink DCI (e.g., DCI #3) scheduling the PUSCH (e.g., PUSCH #2), the PUSCH #3 satisfies Condition COND1, and the UE may multiplex the HARQ-ACK in the PUCCH #1 in the PUSCH #2.

The example of Condition COND1 according to the embodiments of the disclosure is described above. By multiplexing the PUCCH and the PUSCH based on the condition, the timing relationship of multiplexing of the HARQ-ACK on the PUSCH is clarified, which increases the flexibility of scheduling, reduces the feedback delay of the HARQ-ACK and improves the spectrum efficiency of the system.

Example of Condition COND3 for multiplexing a PUCCH and a PUSCH according to embodiments of the disclosure will be described below in connection with FIG. 9.

Figure 9:
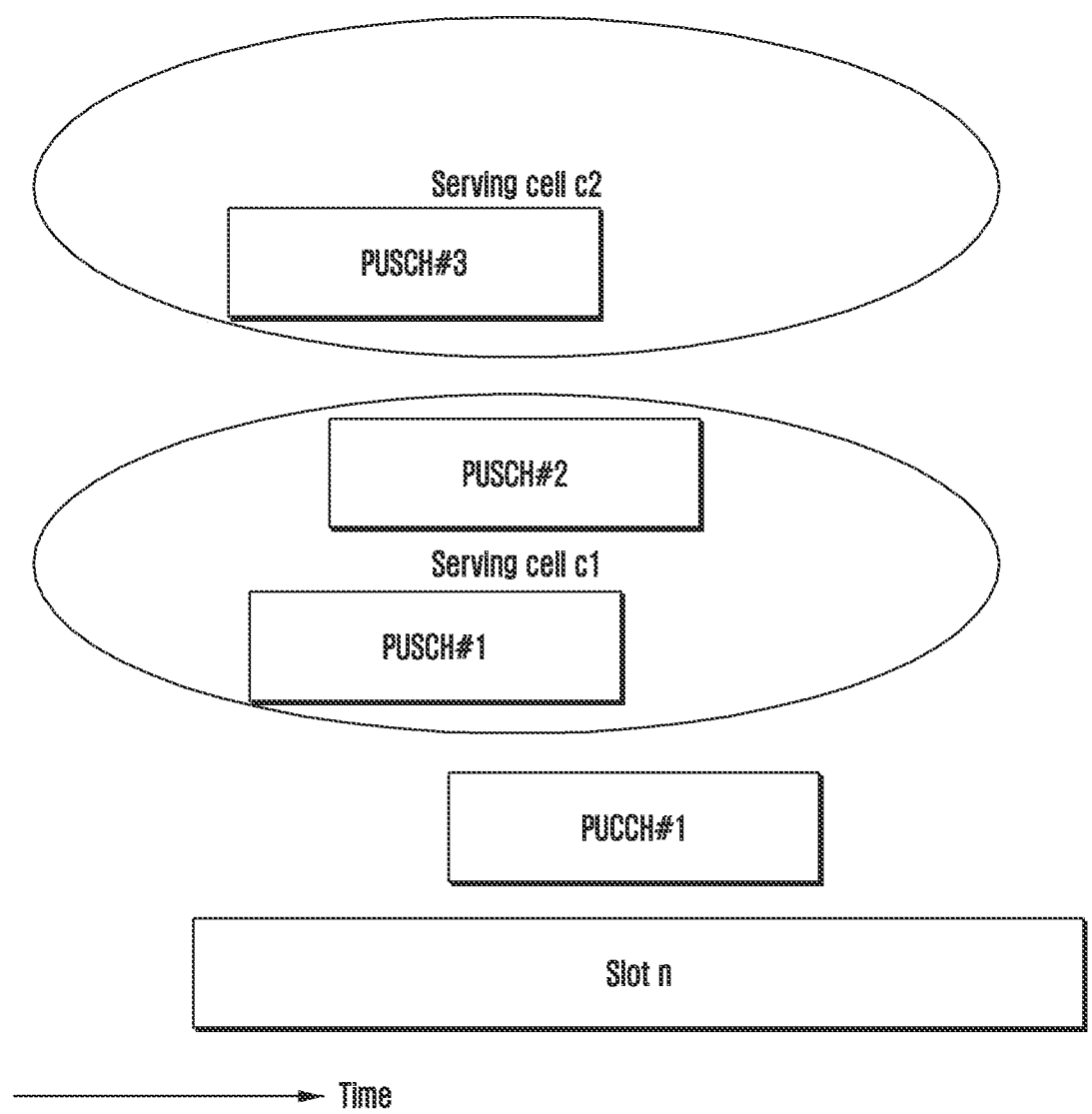
FIG. 9 is an example of a condition for multiplexing of a PUCCH and a PUSCH according to an embodiment of the disclosure.

FIG. 9 is an example of a condition for multiplexing of a PUCCH and a PUSCH according to an embodiment of the disclosure.

A scenario shown in FIG. 9 is considered as an example. Referring to FIG. 9, in a slot n, a UE is scheduled with a PUCCH (e.g., a PUCCH with the lower priority, such as PUCCH #1). In the slot n on a serving cell c1 (for example, an index of the serving cell is 2), the UE is scheduled with a PUSCH (e.g., PUSCH #1) with the lower priority (e.g., priority index 0) and a PUSCH (e.g., PUSCH #2) with a higher priority (e.g., priority index 1), where the two PUSCHs overlap in time domain. In the slot n on a serving cell c2 (e.g., an index of the serving cell is 2), the UE is scheduled with a PUSCH (e.g., PUSCH #3) with the lower priority (e.g., priority index 0). In the embodiment described in connection with FIG. 9, the UE is not configured to transmit a PUCCH and a PUSCH simultaneously.

In some implementations, it may be specified by protocols or configured by higher layer signaling that, if a PUSCH with the lower priority (e.g., priority index 0) overlaps with another PUSCH with the higher priority (e.g., priority index 1) in a same serving cell in time domain, the UE does not multiplex UCI(s) carried in the PUCCH in the PUSCH with the lower priority (e.g., priority index 0). Referring to FIG. 9, since the PUSCH #1 overlaps with the PUSCH #2 with the higher priority in a same serving cell in time domain, the UE does not multiplex UCI(s) in the PUCCH #1 in the PUSCH #1.

In some implementations, as described above, if a certain PUSCH with the lower priority does not overlap with any PUSCH with the higher priority in a same serving cell in time domain, the PUSCH with the lower priority satisfies Condition COND3. Referring to FIG. 9, since the PUSCH #3 does not overlap with any PUSCH with the higher priority in a same serving cell in time domain, the UE may multiplex UCI(s) in the PUCCH #1 in the PUSCH #3.

For example, the UE may multiplex the UCI(s) in the PUCCH in the PUSCH with the same priority as the priority of the PUCCH, or the UE may preferentially multiplex the UCI(s) in the PUCCH in the PUSCH with the same priority as the priority of the PUCCH.

The example of Condition COND3 according to the embodiments of the disclosure is described above. By multiplexing the PUCCH and the PUSCH based on the condition, the condition of multiplexing the PUCCH and the PUSCH is clarified, and multiplexing of the UCI(s) in the PUCCH in the PUSCH with the lower priority overlapping with the PUSCH with the high priority in the same serving cell is avoided, which increases the transmission probability of the UCI(s), reduces the feedback delay of the HARQ-ACK, and improves the spectrum efficiency of the system.

Examples of Condition COND6 for multiplexing a PUCCH and a PUSCH according to an embodiment of the disclosure will be described below in connection with FIG. 10.

Figure 10:
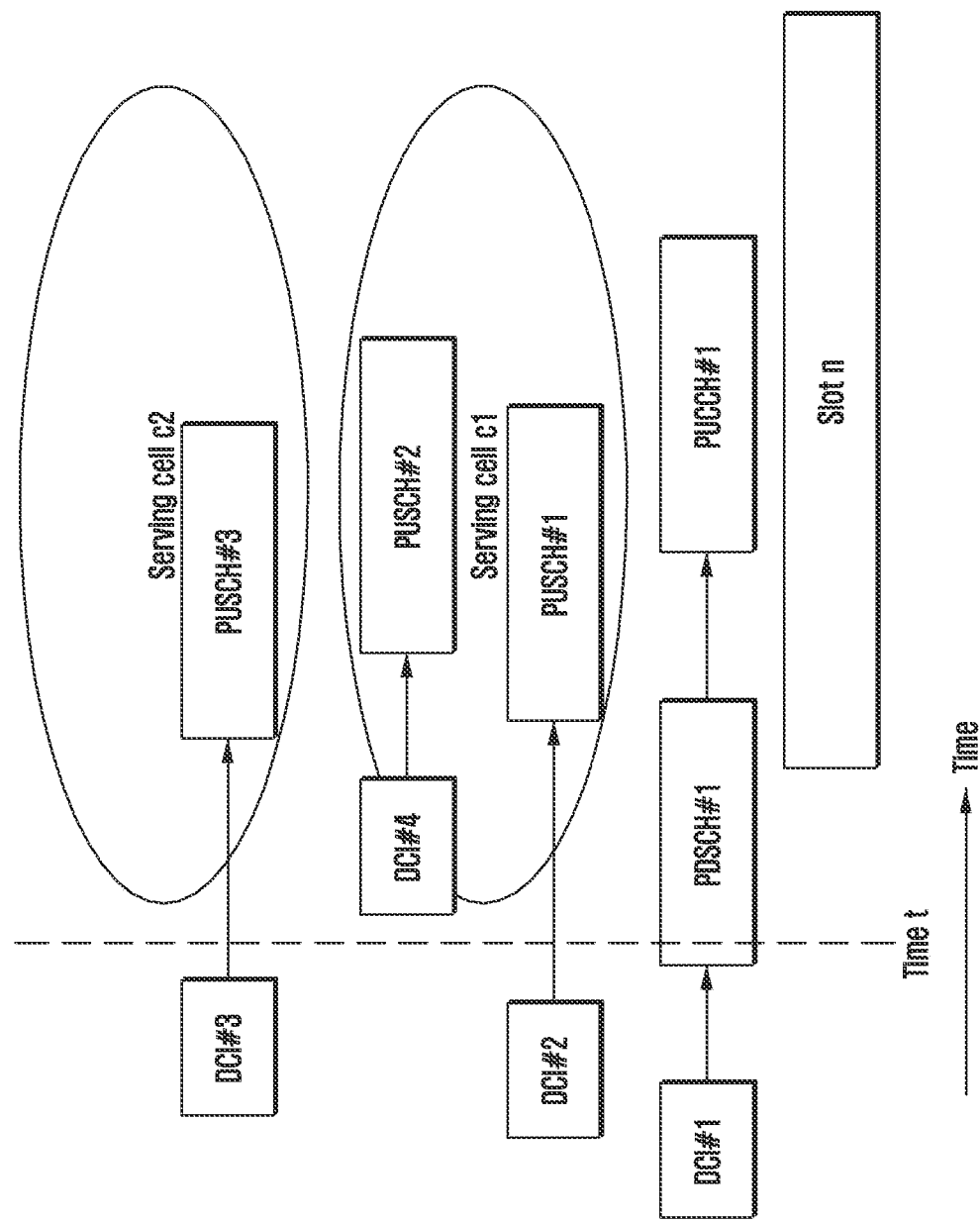
FIG. 10 is an example of a condition for multiplexing of a PUCCH and a PUSCH according to an embodiment of the disclosure.

FIG. 10 is an example of a condition for multiplexing of a PUCCH and a PUSCH according to an embodiment of the disclosure.

A scenario shown in FIG. 10 is considered as an example. Referring to FIG. 10, a UE receives downlink DCI (e.g., DCI #1) in a downlink time unit u1, which schedules a PDSCH (e.g., PDSCH #1) and indicates that HARQ-ACK of the PDSCH is transmitted on a PUCCH (e.g., a PUCCH with the lower priority, such as PUCCH #1) within a slot n. The UE receives first uplink DCI (e.g., DCI #2) in a downlink time unit u2, which schedules the first PUSCH (e.g., a PUSCH with the lower priority (e.g., priority index 0), such as PUSCH #1) on a serving cell c1 (e.g., an index of the serving cell is 1) within the slot n. The UE receives second uplink DCI (e.g., DCI #3) in a downlink time unit u3, which schedules the second PUSCH (e.g., a PUSCH with the lower priority (e.g., priority index 0), such as PUSCH #3) on the serving cell c1 within the slot n. The UE receives third uplink DCI (e.g., DCI #4) in a downlink time unit u4, which schedules a third PUSCH (e.g., a PUSCH with a higher priority (e.g., priority index 1), such as PUSCH #2) on a serving cell c2 (e.g., an index of the serving cell is 2) in the slot n. The third PUSCH overlaps with the first PUSCH in time domain.

An example of a timing relationship in Condition COND6 is described below. For example, the UE determines which PUSCH the PUCCH is multiplexed with at time t. As shown in FIG. 10, the DCI #2 and DCI #3 are before time t, and the DCI #4 is after time t. At time t, the UE does not receive the DCI #4; at this time, the PUSCH #1 does not overlap with another PUSCH with the higher priority (e.g., priority index 1) in a same serving cell in time domain. In addition, an index of a serving cell where the PUSCH #1 is located is smaller than that of a serving cell where the PUSCH #3 is located. In this case, at time t, the PUCCH #1 satisfies the timing condition and the UE may multiplex UCI(s) in the PUCCH #1 in the PUSCH #1.

In some implementations, the time t may be determined according to the downlink DCI and/or time domain resources of the PDSCH and/or time domain resources of the PUCCH. For example, the time t may be a time that is N4 symbols before the starting symbol of the PUCCH. For another example, the time t may be a time that is N4 symbols before the starting symbol of a slot where the PUCCH is located. For another example, the time t may be a time that is N4 symbols after the end symbol of the PDSCH. For another example, the time t may be a time that is N4 symbols after the end symbol of a PDCCH (e.g., a PDCCH carrying the downlink DCI). In an example, N4 may be specified by protocols and/or configured by higher layer signaling. For example, a value of N4 may be configured or specified for different subcarrier spacings. For example, subcarrier spacings for N4 (i.e., subcarrier spacings corresponding to N4) may be subcarrier spacings for the PUCCH. For another example, subcarrier spacings for N4 may be subcarrier spacings for the PDSCH. For yet another example, the subcarrier spacings for N4 may be subcarrier spacings for the PDCCH (e.g., the PDCCH carrying the downlink DCI). For yet another example, subcarrier spacings for N4 may be a minimum value of the subcarrier spacings for the PUCCH, PDSCH and PDCCH.

The example of Condition COND6 according to the embodiments of the disclosure is described above. By multiplexing a PUCCH and a PUSCH based on the condition, the timing relationship of multiplexing of the PUCCH and the PUSCH is clarified, and the behaviors of the UE are clarified, thereby improving the reliability of uplink transmission.

The following example scenario is considered; for example, a period of SPS PDSCH configurations is P, and the SPS PDSCH may be activated by a DCI format, which may indicate a number of SPS PDSCH repetition transmissions (e.g., repetition transmissions between slots). If a duration of the SPS PDSCH repetition transmissions is greater than the period of the SPS PDSCH configurations, a problem that two SPS PDSCHs overlap may occur. To solve this problem, the following example implementations may be adopted.

In some implementations, it may be specified by protocols that a duration of SPS PDSCH repetition transmissions is not greater than a period of the SPS PDSCH configurations. For example, it may be specified by protocols that a duration of slots in which the SPS PDSCH repetition transmissions are located is no greater than the period of the SPS PDSCH configurations. For another example, for the SPS PDSCH, UE does not expect to be configured that a duration of N repetition transmissions received is greater than a duration of the period P obtained from a corresponding SPS PDSCH configuration parameter (e.g., the parameter of sps-Config in 3GPP), where N may be dynamically indicated by active DCI (for example, repetitionNumber-r16 indicated in the DCI) or configured by higher layer signaling (e.g., the parameter of sps-Config in 3GPP). For another example, for the SPS PDSCH, UE does not expect to be configured or indicated that a duration of repetitionNumber-r16 repetition transmissions received is greater than the duration of the period P obtained from the corresponding SPS PDSCH configuration parameter (e.g., the parameter of sps-Config in 3GPP), where the repetitionNumber-r16 may be dynamically indicated by the active DCI.

The method specifies the configuration limit of the SPS PDSCH repetition transmissions, which avoids overlapping of repetition transmissions of two different data in time domain, and improves the reliability of the system.

The following scenario is considered; for example, the UE may be configured with multiple SPS PDSCH configurations. A TRP associated with a SPS PDSCH may be indicated in DCI when the SPS PDSCH is activated by the DCI. For example, the UE may be configured with the 3GPP parameter of CORESETPoolIndex. If the UE reports a capability to support a maximum number of unicast PDSCHs per CORESETPoolIndex per slot, the UE determines the SPS PDSCH received in a corresponding slot for each CORESETPoolIndex, respectively.

For example, if a certain CORESETPoolIndex within a certain slot on a certain serving cell has more than one PDSCHs each of which has no associated PDCCH transmission, after overlapping with uplink symbols in this slot indicated by higher layer semi-static signaling (e.g., the 3GPP parameter of tdd-UL-DL-ConfigurationCommon or tdd-UL-DL-ConfigurationDedicated) is solved, the UE may receive one or more PDSCHs each of which has no associated PDCCH transmission in this slot according to the following example rule. For example, the example rule may include operations a0 to a3 described below.

Operation a0: let j=0, where j is a number of selected PDSCH(s) that are to be decoded. Q is a set of SPS PDSCHs (for example, the SPS PDSCHs may be PDSCHs without PDCCH transmission associated therewith) that have been activated in this slot.

Operation a1: receive a PDSCH with a smallest SPS PDSCH index in Q by the UE, and let j=j+1. The received PDSCH is designated as a survivor PDSCH.

Operation a2: exclude the survivor PDSCH in operation a1 and other PDSCHs overlapping (including partial overlapping and complete overlapping) with the survivor PDSCH from Q.

Operation a3: repeat operations a1 and a2 until Q is empty or j is equal to the maximum number of the unicast PDSCHs for CORESETPoolIndex within a slot that is supported by the UE.

If the UE does not report the capability to support the maximum number of the unicast PDSCHs per CORESETPoolIndex per slot, the UE may determine the SPS PDSCH received in the corresponding slot according to the following example implementations.

In some implementations, if there are more than one PDSCHs within a certain slot on a certain serving cell each of which has no associated PDCCH transmission, after overlapping with uplink symbols in this slot indicated by higher layer semi-static signaling (e.g., the 3GPP parameter of tdd-UL-DL-ConfigurationCommon or tdd-UL-DL-ConfigurationDedicated) is solved, the UE receives one or more PDSCHs of which has no associated PDCCH transmission in this slot according to the following example rule. For example, the example rule may include the following operations b0 to b3.

Operation b0: let j=0, where j is a number of selected PDSCH(s) that are to be decoded. Q is a set of SPS PDSCHs (for example, the SPS PDSCHs may be PDSCHs without PDCCH transmission associated therewith) that have been activated in this slot.

Operation b1: receive a PDSCH with a smallest SPS PDSCH index in Q by the UE, and let j=j+1. The received PDSCH is designated as a survivor PDSCH.

Operation b2: exclude the survivor PDSCH in operation b1 and other PDSCHs overlapping (including partial overlapping and complete overlapping) with the survivor PDSCH from Q.

Operation b3: repeat operations b1 and b2 until Q is empty or j is equal to the maximum number of the unicast PDSCHs within a slot that is supported by the UE.

If the UE does not report the capability to support the maximum number of the unicast PDSCHs per CORESETPoolIndex per slot, the UE may also determine the SPS PDSCH received in the corresponding slot according to the following example implementations.

In some implementations, if a certain CORESETPoolIndex within a certain slot on a certain serving cell has more than one PDSCHs each of which has no associated PDCCH transmission, after overlapping with uplink symbols in this slot indicated by higher layer semi-static signaling (e.g., the 3GPP parameter of tdd-UL-DL-ConfigurationCommon or tdd-UL-DL-ConfigurationDedicated) is solved, the UE may receive one or more PDSCHs each PDSCH of which has no associated PDCCH transmission in this slot according to the following example rule. For example, the example rule may include the following operations c0 to c3.

Operation c0: let j=0, where j is a number of selected PDSCHs that are to be decoded. Q is a set of SPS PDSCHs (for example, the SPS PDSCHs may be PDSCHs without PDCCH transmission associated therewith) that have been activated in this slot.

Operation c1: receive a PDSCH with a smallest SPS PDSCH index in Q by the UE, and let j=j+1. The received PDSCH is designated as a survivor PDSCH.

Operation c2: exclude the survivor PDSCH in c1 and other PDSCHs overlapping (including partial overlapping and complete overlapping) with the survivor PDSCH from Q.

Operation c3: repeat operations c1 and c2 until Q is empty or j is equal to the maximum number of the unicast PDSCHs within a slot that is supported by the UE.

In some implementations, if a sum of numbers of PDSCHs received on all CORESETPoolIndex is greater than a maximum number Nmax of unicast PDSCHs within a slot that is supported by the UE, the PDSCHs received by the UE are Nmax PDSCHs with smaller indexes.

The following scenario is considered, for example, if there are more than one PDSCHs within a certain slot on a certain serving cell each of which has no associated PDCCH transmission, after overlapping with uplink symbols in this slot indicated by higher layer semi-static signaling (e.g., the 3GPP parameter of tdd-UL-DL-ConfigurationCommon or tdd-UL-DL-ConfigurationDedicated) is solved, the UE may receive one or more PDSCHs for CORESETPoolIndex within this slot according to the following example rule, where each of the one or more PDSCHs has no associated PDCCH transmission. For example, the example rule may include operations d0 to d3 described below.

Operation d0: let j=0, where j is a number of selected PDSCHs that are to be decoded. Q is a set of SPS PDSCHs (for example, the SPS PDSCHs may be PDSCHs without PDCCH transmission associated therewith) that have been activated in this slot.

Operation d1: receive a PDSCH with a smallest SPS PDSCH index in Q by the UE, and let j=j+1. The received PDSCH is designated as a survivor PDSCH.

Operation d2: exclude the survivor PDSCH in operation d1 and other PDSCHs overlapping (including partial overlapping and complete overlapping) with the survivor PDSCH from Q.

Operation d3: repeat operations d1 and d2 until Q is empty or j is equal to N, where N is the maximum number of the unicast PDSCHs for CORESETPoolIndex within a slot that is supported by the UE if the UE is configured that a value of CORESETPoolIndex (which may be 1) or if the UE reports the capability to support the maximum number of the unicast PDSCHs for CORESETPoolIndex within a slot or if the UE reports the capability to support multi-TRP based on multi-DCI, otherwise N is the maximum number of the unicast PDSCHs within the slot that is supported by the UE.

In some implementations, if the UE reports a capability to support a maximum number of repetition transmissions of a unicast PDSCH per slot, a number of SPS PDSCH receptions may be determined according to the maximum number of the repetition transmissions of the unicast PDSCH within a slot. For example, a number of the SPS PDSCH repetition transmissions received by the UE within a slot is not greater than the maximum number of the repetition transmissions of the unicast PDSCH within the slot that is supported by the capability reported by the UE.

In some implementations, if the UE reports the capability to support the maximum number of the repetition transmissions of the unicast PDSCH per CORESETPoolIndex per slot, the number of SPS PDSCH receptions may be determined according to the maximum number of the repetition transmissions of the unicast PDSCH for CORESETPoolIndex within a slot. For example, the number of the SPS PDSCH repetition transmissions received by the UE for CORESETPoolIndex within a slot is not greater than the maximum number of the repetition transmissions of the unicast PDSCH for CORESETPoolIndex within the slot that is supported by the capability reported by the UE.

The above various implementations specify the method for the UE to determine to receive the SPS PDSCH, and clarify the behaviors of the UE according to the corresponding UE capability, which increases the flexibility of scheduling and improves the reliability of network transmission. In all or some of the implementations described above, if the UE reports the capability to support multi-TRP based on multi-DCI, but the base station may only configure one TRP for the UE, in operation d3, the UE may receive more PDSCHs in the case where N is the maximum number of the unicast PDSCHs within a slot, compared with the case where N is the maximum number of the unicast PDSCHs of CORESETPoolIndex within a slot, thereby increasing the transmission probability of downlink data, reducing the transmission delay of downlink data and improving the spectrum efficiency of the network.

Figure 11:
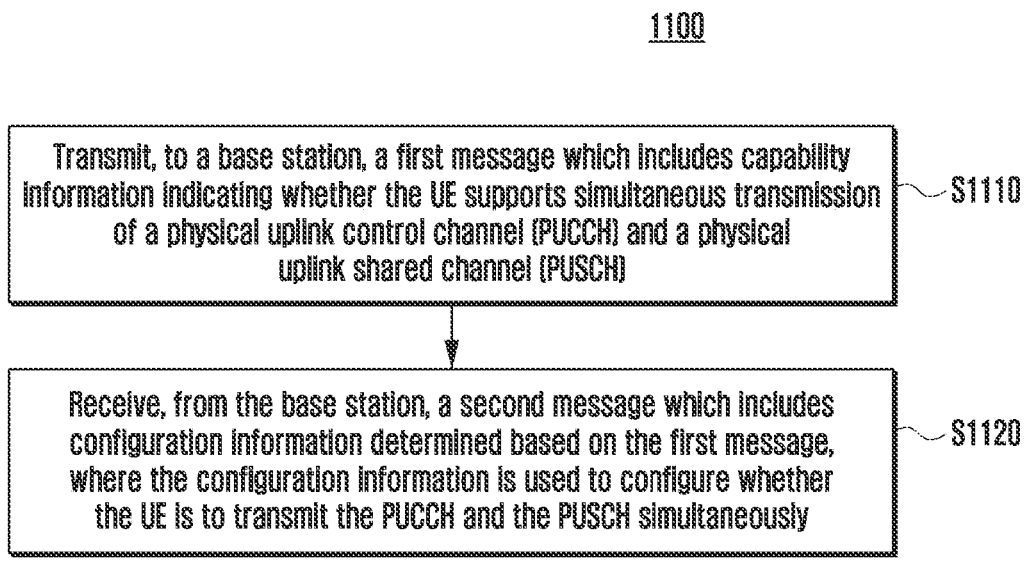
FIG. 11 illustrates a flowchart of a method performed by a UE according to an embodiment of the disclosure.

FIG. 11 illustrates a flowchart of a method 1100 performed by a UE according to an embodiment of the disclosure.

Referring to FIG. 11, in operation S1110, the UE may transmit, to a base station, the first message which includes capability information indicating whether the UE supports simultaneous transmission of a physical uplink control channel (PUCCH) and a physical uplink shared channel (PUSCH).

Next, in operation S1120, the UE receives, from the base station, the second message which includes configuration information determined based on the first message, where the configuration information is used to configure whether the UE is to transmit the PUCCH and the PUSCH simultaneously.

With respect to types of the capability information and various implementations of reporting methods, reference may be made to the previously described various embodiments in which the UE reports (or transmits or indicates) the capability to support simultaneous transmission of a PUCCH and a PUSCH.

In some implementations, for example, the capability information may include a capability of the UE to support simultaneous transmission of a PUCCH and a PUSCH, which is associated with one or more of a carrier, priorities of the PUCCH and the PUSCH, a band, or a band combination.

In some implementations, for example, the capability information may correspond to at least one of a duplex mode or a frequency range.

In some implementations, for example, when the UE is configured by the configuration information to transmit the PUCCH and the PUSCH simultaneously, the PUCCH and the PUSCH may be transmitted simultaneously when the scheduled PUCCH and the PUSCH overlap in time domain.

In some implementations, for example, when the UE is not configured by the configuration information to transmit the PUCCH and the PUSCH simultaneously, or is configured by the configuration information not to transmit the PUCCH and the PUSCH simultaneously, uplink control information (UCI) carried by the PUCCH may be multiplexed in the PUSCH when a predefined condition is satisfied, when the scheduled PUCCH and the PUSCH overlap in time domain, and the multiplexed PUSCH is transmitted and the PUCCH is not transmitted.

In some implementations, for example, the predefined condition may include one or more of: that a PUCCH and a PUSCH satisfy a scheduling restriction; that a PUSCH is not configured to be transmitted simultaneously with a PUCCH; that a PUSCH with a lower priority does not overlap with any PUSCH with a higher priority in a same serving cell in time domain; that a PUSCH and a PUCCH are in a same sub-slot; a PUSCH and a PUCCH overlap in time domain; that a PUSCH and a PUCCH satisfy a timing relationship; a reliability requirement is satisfied after UCI(s) carried by a PUCCH is(are) multiplexed in a PUSCH; that a delay requirement is satisfied after UCI(s) carried by a PUCCH is(are) multiplexed in a PUSCH; that a PUSCH is not indicated to be cancelled by a UL CI; or that in a case where a PUSCH is a configured grant (CG)-PUSCH, any symbol of the CG-PUSCH is not semi-statically indicated as a downlink symbol, and/or any symbol of the CG-PUSCH is not indicated as a downlink symbol by a dynamic slot format indication (SFI).

In some implementations, for example, the second message may be transmitted via at least one of RRC signaling or MAC CE.

In some implementations, for example, the PUSCH may include a dynamically scheduled PUSCH and/or a semi-statically configured PUSCH.

In some implementations, for example, the PUSCH may include a PUSCH with a higher priority and/or a PUSCH with a lower priority.

In some implementations, for example, the PUCCH may include a PUCCH with a higher priority and/or a PUCCH with a lower priority.

In some implementations, for example, the PUCCH may include a PUCCH obtained by multiplexing the PUCCH with the higher priority and the PUCCH with the lower priority.

In some implementations, for example, a type of the UCI(s) carried by the PUCCH may include one or more of: Hybrid Automatic Repeat request-Acknowledgement HARQ-ACK information, scheduling request SR, link recovery request LRR, channel state information CSI, or configured grant (CG) UCI.

In some implementations, for example, the PUCCH may be configured with PUCCH repetition transmission.

In some implementations, for example, the PUSCH may be configured with PUSCH repetition transmission.

Figure 12:
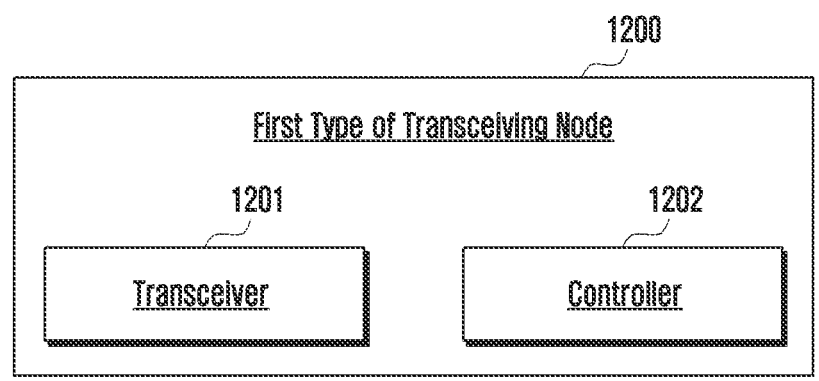
FIG. 12 illustrates a block diagram of the first type of transceiving node according to an embodiment of the disclosure.

FIG. 12 illustrates a block diagram of the first type of transceiving node 1200 according to an embodiment of the disclosure.

Referring to FIG. 12, the first type of transceiving node 1200 may include a transceiver 1201 and a controller 1202.

The transceiver 1201 may be configured to transmit first type of data and/or first type of control signaling to the second type of transceiving node and receive second type of data and/or second type of control signaling from the second type of transceiving node in a time unit.

The controller 1202 may be an application specific integrated circuit or at least one processor. The controller 1202 may be configured to control the overall operation of the first type of transceiving node, including controlling the transceiver 1201 to transmit the first type of data and/or the first type of control signaling to the second type of transceiving node and receive the second type of data and/or the second type of control signaling from the second type of transceiving node in a determined time unit, where this second type of data and/or second type of control signaling and the time unit are determined by the second type of transceiving node based on received first type of data and/or first type of control signaling.

In some implementations, the controller 1202 may be configured to perform one or more of operations in the methods of various embodiments described above and/or the methods of various embodiments described below. For example, the controller 1202 may be configured to perform one or more of operations in the method 1300 described in connection with FIG. 13 and/or the method 1400 described in connection with FIG. 14.

In the following description, a base station is taken as an example (but not limited thereto) to illustrate the first type of transceiving node, a UE is taken as an example (but not limited thereto) to illustrate the second type of transceiving node, a downlink time unit (but not limited thereto) is used to illustrate the first type of time unit, and an uplink time unit (but not limited thereto) is used to illustrate the time unit.

Downlink data and/or downlink control signaling (but not limited thereto) are used to illustrate the first type of data and/or the first type of control signaling. A HARQ-ACK codebook may be included in the second type of control signaling, and uplink control signaling (but not limited thereto) is used to illustrate the second type of control signaling.

Figure 13:
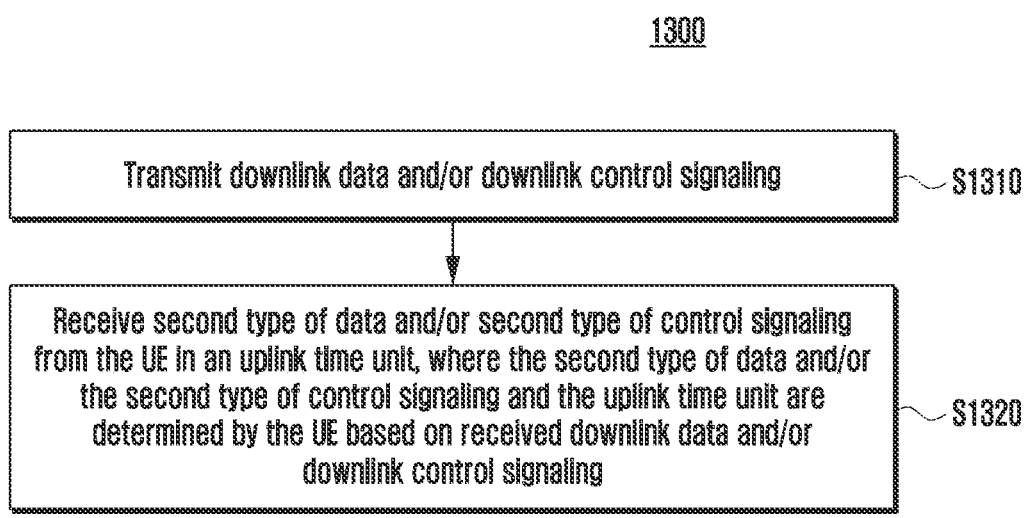
FIG. 13 illustrates a flowchart of a method performed by a base station according to an embodiment of the disclosure.

FIG. 13 illustrates a flowchart of a method 1300 performed by a base station according to an embodiment of the disclosure.

Referring to FIG. 13, in operation S1310, the base station transmits downlink data and/or downlink control signaling to a UE.

Next, in operation S1320, the base station receives second type of data and/or second type of control signaling from the UE at an uplink time unit, where the second type of data and/or the second type of control signaling and the uplink time unit are determined by the UE based on received downlink data and/or downlink control signaling.

For example, the method 1300 may include one or more of the operations performed by the base station described in various embodiments (including the embodiments described previously and embodiments described later) of the disclosure.

Those skilled in the art will understand that the base station may decode the second type of data and/or the second type of control signaling based on a method corresponding to the method performed by the UE in the above embodiments.

In some implementations, an uplink channel may include a PUCCH or a PUSCH.

Figure 14:
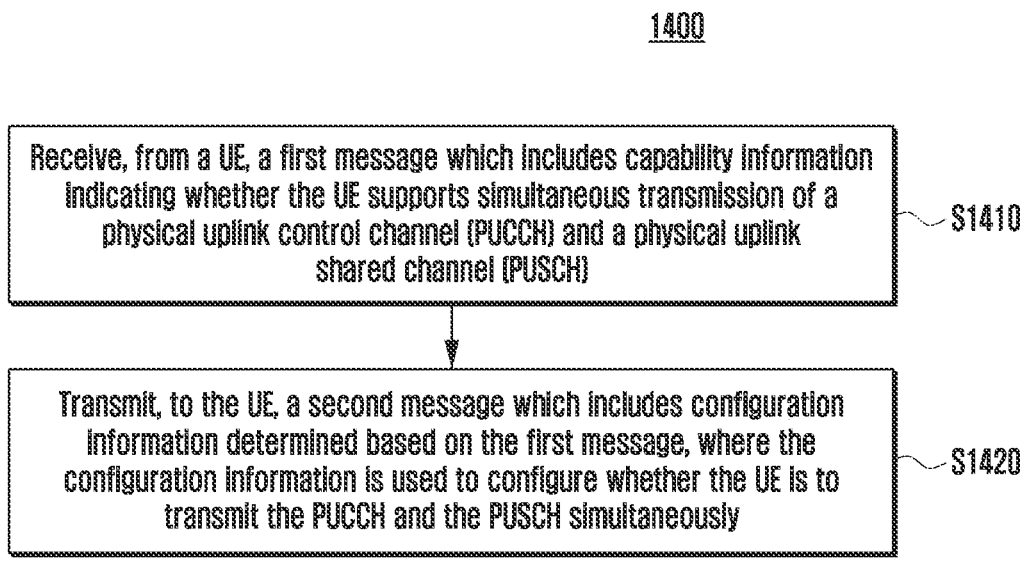
FIG. 14 illustrates a flowchart of a method performed by a base station according to an embodiment of the disclosure.

FIG. 14 illustrates a flowchart of a method 1400 performed by a base station according to an embodiment of the disclosure.

Referring to FIG. 14, in operation S1410, the base station receives, from a UE, the first message which includes capability information indicating whether the UE supports simultaneous transmission of a physical uplink control channel (PUCCH) and a physical uplink shared channel (PUSCH).

Next, in operation S1420, the base station transmits, to the UE, the second message which includes configuration information determined based on the first message, where the configuration information is used to configure whether the UE is to transmit the PUCCH and the PUSCH simultaneously.

In some implementations, for example, the capability information may include a capability of the UE to support simultaneous transmission of a PUCCH and a PUSCH, which is associated with one or more of a carrier, priorities of the PUCCH and the PUSCH, a band, or a band combination.

In some implementations, for example, the capability information may correspond to at least one of a duplex mode or a frequency range.

In some implementations, for example, when the UE is configured by the configuration information to transmit the PUCCH and the PUSCH simultaneously, the PUCCH and the PUSCH are transmitted simultaneously when the scheduled PUCCH and the PUSCH overlap in time domain.

In some implementations, for example, when the UE is not configured by the configuration information to transmit the PUCCH and the PUSCH simultaneously, or is configured by the configuration information not to transmit the PUCCH and the PUSCH simultaneously, uplink control information (UCI) carried by the PUCCH may be multiplexed in the PUSCH when a predefined condition is satisfied, when the scheduled PUCCH and the PUSCH overlap in time domain, and the multiplexed PUSCH is transmitted and the PUCCH is not transmitted.

In some implementations, for example, the predefined condition may include one or more of: that a PUCCH and a PUSCH satisfy a scheduling restriction; that a PUSCH is not configured to be transmitted simultaneously with a PUCCH; that a PUSCH with a lower priority does not overlap with any PUSCH with a higher priority in a same serving cell in time domain; that a PUSCH and a PUCCH are in a same sub-slot; that a PUSCH and a PUCCH overlap in time domain; that a PUSCH and a PUCCH satisfy a timing relationship; that a reliability requirement is satisfied after UCI(s) carried by a PUCCH is(are) multiplexed in a PUSCH; that a delay requirement is satisfied after UCI(s) carried by a PUCCH is(are) multiplexed in a PUSCH; that a PUSCH is not indicated to be cancelled by a UL CI; or that in a case where a PUSCH is a configured grant (CG)-PUSCH, any symbol of the CG-PUSCH is not semi-statically indicated as a downlink symbol, and/or any symbol of the CG-PUSCH is not indicated as a downlink symbol by a dynamic slot format indication (SFI).

In some implementations, for example, the second message may be transmitted via at least one of RRC signaling or MAC CE.

In some implementations, for example, the PUSCH may include a dynamically scheduled PUSCH and/or a semi-statically configured PUSCH.

In some implementations, for example, the PUSCH may include a PUSCH with a higher priority and/or a PUSCH with a lower priority.

In some implementations, for example, the PUCCH may include a PUCCH with a higher priority and/or a PUCCH with a lower priority.

In some implementations, for example, the PUCCH may include a PUCCH obtained by multiplexing the PUCCH with the higher priority and the PUCCH with the lower priority.

In some implementations, for example, a type of UCI(s) carried by the PUCCH may include one or more of: Hybrid Automatic Repeat request-Acknowledgement HARQ-ACK information, scheduling request SR, link recovery request LRR, channel state information CSI, or configured grant CG UCI.

In some implementations, for example, the PUCCH may be configured with PUCCH repetition transmission.

In some implementations, for example, the PUSCH may be configured with PUSCH repetition transmission.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the disclosure as generally described herein and shown in the drawings may be arranged, replaced, combined, separated and designed in various different configurations, all of which are contemplated herein.

Those skilled in the art will understand that the various illustrative logical blocks, modules, circuits, and operations described in this application may be implemented as hardware, software, or a combination of both. To clearly illustrate this interchangeability between hardware and software, various illustrative components, blocks, modules, circuits, and operations are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

The various illustrative logic blocks, modules, and circuits described in this application may be implemented or performed by a general purpose processor, a Digital Signal Processor (DSP), an Application Specific Integrated Circuit (ASIC), a Field Programmable Gate Array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The operations of the method or algorithm described in this application may be embodied directly in hardware, in a software module executed by a processor, or in a combination thereof. The software module may reside in RAM memory, flash memory, ROM memory, EPROM memory, EEPROM memory, register, hard disk, removable disk, or any other form of storage medium known in the art. A storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a terminal in a wireless communication system, the method comprising:
   receiving, from a base station, a plurality of physical downlink control channels (PDCCHs), each PDCCH including downlink control information (DCI) that schedules a physical downlink shared channel (PDSCH);
   identifying a reference point associated with a starting symbol allocated for the PDSCH;
   identifying the starting symbol allocated for the PDSCH, that is relative to the reference point; and receiving, from the base station, the PDSCH based on the starting symbol allocated for the PDSCH, wherein in case that information associated with the reference point is configured, the reference point is a starting symbol of a PDCCH monitoring occasion where a latest received PDCCH among the plurality of PDCCHs is located.

2. The method of claim 1, wherein the plurality of PDCCHs is received in a same slot.

3. The method of claim 2, wherein $$\left\lfloor n \cdot \frac{2^{\mu} PDSCH}{2^{\mu} PDCCH} \right\rfloor$$

is the same for each of the plurality of PDCCHs, where n is an index of a slot where scheduling DCI is located, and $\mu_{PDSCH}$ and $\mu_{PDCCH}$ are configured subcarrier spacings for the PDSCH and a PDCCH respectively.

4. The method of claim 1,
wherein the DCI with same information is repeatedly received based on the plurality of PDCCHs, and
wherein a downlink assignment indicator (DAI) counting occasion for counting DAIs is determined based on a PDCCH monitoring occasion where a first repetition of multiple repetitions of the DCI is located.

5. The method of claim 4, further including:
transmitting, to the base station, an uplink signal,
wherein the uplink signal includes a Hybrid Automatic Repeat request-Acknowledgement (HARQ-ACK) codebook including HARQ-ACK information for the PDSCH, and
wherein bit positions in the HARQ-ACK codebook are determined based on the DAI counting occasion.

6. The method of claim 1,
wherein a DAI counting occasion for counting DAIS is determined based on a PDCCH monitoring occasion where a transmission occasion of a first transmission of multiple transmissions of the DCI is located.

7. The method of claim 1, further comprising:
receiving, from the base station, the information associated with the reference point,
wherein the information indicates whether the starting symbol of the PDCCH monitoring occasion is used as the reference point for a time domain start and length indicator value (SLIV) for the PDSCH.

8. The method of claim 1,
wherein in case that the information is not configured, the starting symbol allocated for the PDSCH is relative to a start of a slot allocated for the PDSCH.

9. The method of claim 1,
wherein a mapping type of the PDSCH is set to a type B.

10. The method of claim 1,
wherein a cyclic redundancy check (CRC) of the DCI is scrambled by a cell-Radio Network Temporary Identifier (C-RNTI), a Modulation and Coding Scheme-C-RNTI (MCS-C-RNTI), or a Configured Scheduling-RNTI (CS-RNTI).

11. A method performed by a base station in a wireless communication system, the method comprising:
transmitting, to a terminal, a plurality of physical downlink control channels (PDCCHs), each PDCCH including downlink control information (DCI) that schedules a physical downlink shared channel (PDSCH); and
transmitting, to the terminal, the PDSCH, wherein a starting symbol allocated for the PDSCH is identified based on a reference point associated with the starting symbol allocated for the PDSCH,
wherein the starting symbol allocated for the PDSCH is relative to the reference point, and
wherein in case that information associated with the reference point is configured, the reference point is a starting symbol of a PDCCH monitoring occasion where a latest transmitted PDCCH among the plurality of PDCCHs is located.

12. The method of claim 11, wherein the plurality of PDCCHs is transmitted in a same slot.

13. The method of claim 12, wherein $$\left\lfloor n \cdot \frac{2^{H_{POSCH}}}{2^{H_{POCCH}}} \right\rfloor$$

is the same for each of the plurality of PDCCHs, where n is an index of a slot where scheduling DCI is located, and $\mu_{PDSCH}$ and $\mu_{PDCCH}$ are configured subcarrier spacings for the PDSCH and a PDCCH respectively.

14. The method of claim 11,
wherein the DCI with same information is repeatedly transmitted based on the plurality of PDCCHs, and
wherein a downlink assignment indicator (DAI) counting occasion for counting DAIs is determined based on a PDCCH monitoring occasion where a first repetition of multiple repetitions of the DCI is located.

15. The method of claim 14, further comprising:
receiving, from the terminal, a uplink signal,
wherein the uplink signal includes a Hybrid Automatic Repeat request-Acknowledgement (HARQ-ACK) codebook including HARQ-ACK information for the PDSCH, and
wherein bit positions in the HARQ-ACK codebook are determined based on the DAI counting occasion.

16. A terminal in a wireless communication system, the terminal comprising:
a transceiver; and
a controller coupled with the transceiver and configured to:
receive, from a base station, a plurality of physical downlink control channels (PDCCHs), each PDCCH including downlink control information (DCI) that schedules a physical downlink shared channel (PDSCH),
identify a reference point associated with a starting symbol allocated for the PDSCH,
identify the starting symbol allocated for the PDSCH, that is relative to the reference point,
receiving, from the base station, the PDSCH based on the starting symbol allocated for the PDSCH,
wherein in case that information associated with the reference point is configured, the reference point is a starting symbol of a PDCCH monitoring occasion where a latest received PDCCH among the plurality of PDCCHs is located.

17. A base station in a wireless communication system, the base station comprising:
a transceiver; and
a controller coupled with the transceiver and configured to:
transmit, to a terminal, a plurality of physical downlink control channels (PDCCHs), each PDCCH including downlink control information (DCI) that schedules a physical downlink shared channel (PDSCH), and
transmit, to the terminal, the PDSCH,
wherein a starting symbol allocated for the PDSCH is identified based on a reference point associated with the starting symbol allocated for the PDSCH,
wherein the starting symbol allocated for the PDSCH is relative to the reference point, and
wherein in case that information associated with the reference point is configured, the reference point is a starting symbol of a PDCCH monitoring occasion where a latest transmitted PDCCH among the plurality of PDCCHs is located.

* * * * *